United States Patent
Jordan et al.

(10) Patent No.: US 11,821,557 B2
(45) Date of Patent: Nov. 21, 2023

(54) LOW-EMISSION NOZZLE AND RECEPTACLE COUPLING FOR CRYOGENIC FLUID

(71) Applicant: Engineered Controls International, LLC, Elon, NC (US)

(72) Inventors: Kevin Jordan, Gibsonville, NC (US); John Grenaway, Huntersville, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 17/804,484

(22) Filed: May 27, 2022

(65) Prior Publication Data
US 2022/0381385 A1 Dec. 1, 2022

Related U.S. Application Data

(60) Provisional application No. 63/202,162, filed on May 28, 2021.

(51) Int. Cl.
*F16L 37/244* (2006.01)
*F17C 13/00* (2006.01)
*F16L 37/35* (2006.01)

(52) U.S. Cl.
CPC .......... *F16L 37/244* (2013.01); *F17C 13/00* (2013.01); *F16L 37/35* (2013.01); *F17C 2205/037* (2013.01); *F17C 2221/012* (2013.01)

(58) Field of Classification Search
CPC ............ F17C 13/00; F17C 2205/037; F17C 2221/012; F17C 2205/0326;
(Continued)

(56) References Cited

U.S. PATENT DOCUMENTS 4,907,630 A * 3/1990 Kulikowski ............. B67D 7/46
141/346
5,765,610 A * 6/1998 Brown .................... B64D 37/16
141/346

(Continued)

FOREIGN PATENT DOCUMENTS

| EP | 3374591 | 9/2018 | |
| GB | 2584867 | 12/2020 | |
| GB | 2584867 A * | 12/2020 | .............. F16L 37/00 |

OTHER PUBLICATIONS

International Search Report and Written Opinion for PCT/US2022/072628 dated Oct. 6, 2022, 11 pages.

*Primary Examiner* — Timothy P. Kelly
*Assistant Examiner* — Stephanie A Shrieves
(74) *Attorney, Agent, or Firm* — NEAL, GERBER & EISENBERG LLP

(57) ABSTRACT

Methods and apparatus are disclosed for a low-emission nozzle and receptacle coupling for cryogenic fluid. An example nozzle includes a body defining a chamber through which cryogenic fluid is to flow. The body includes an outer shell that includes an outer shell surface. The nozzle includes a locking assembly configured to securely couple the nozzle to a receptacle. The locking assembly includes an inner sleeve fixedly coupled to the outer shell surface and an outer sleeve extending over and rotatably coupled to the inner sleeve. One or more locking teeth are fixedly coupled to the outer sleeve and configured to be slidably received by respective one or more coupling slots of the receptacle. The one or more locking teeth are configured to rotatably slide within the respective one or more coupling slots to couple the nozzle to the receptacle as the outer sleeve rotates relative to the inner sleeve.

25 Claims, 65 Drawing Sheets

(58) Field of Classification Search
CPC ........ F17C 2250/0478; F17C 2250/075; F16L 37/244; F16L 37/35; F16L 37/248; F16L 37/252; Y02E 60/32; B67D 7/42; B67D 7/04; B67D 2007/545
USPC ..... 141/346, 383–387, 392; 285/86, 361, 38
See application file for complete search history.

(56) References Cited

U.S. PATENT DOCUMENTS

| | | | | |
|---|---|---|---|---|
| 6,106,026 | A * | 8/2000 | Smith, III | ............... F16L 37/35 285/85 |
| 7,117,892 | B2 * | 10/2006 | Krywitsky | ............ F16L 37/252 137/614.04 |
| 7,988,200 | B2 * | 8/2011 | Krywitsky | ............ F16L 37/113 285/91 |
| 8,539,997 | B2 * | 9/2013 | Driftmeyer | ............... B67D 7/42 137/554 |
| 9,791,081 | B2 * | 10/2017 | Cosse | ..................... F16L 37/18 |
| 10,883,665 | B2 | 1/2021 | Thomas et al. | |
| 11,262,012 | B2 * | 3/2022 | Jordan | ..................... F16L 37/47 |
| 2004/0050450 | A1 | 3/2004 | Lambert et al. | |
| 2007/0289650 | A1 * | 12/2007 | Krywitsky | ........... B67D 7/3218 137/798 |
| 2011/0017318 | A1 * | 1/2011 | Pisot | ...................... F16L 37/32 137/317 |
| 2018/0252052 | A1 * | 9/2018 | Attiwell | .................. F16D 1/112 |
| 2020/0408331 | A1 | 12/2020 | Kopplin | |

* cited by examiner

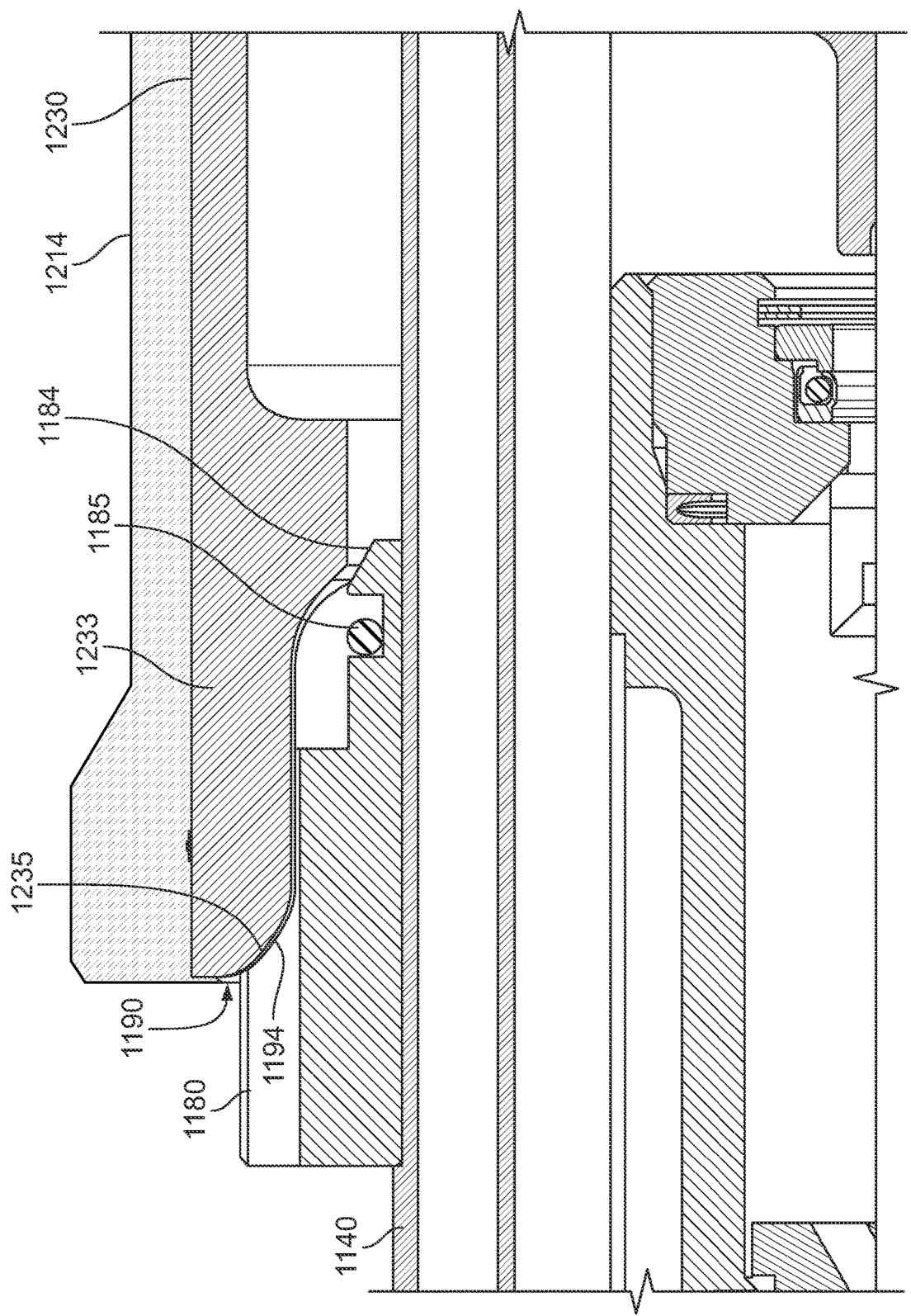

LOW-EMISSION NOZZLE AND RECEPTACLE COUPLING FOR CRYOGENIC FLUID

CROSS-REFERENCE TO RELATED APPLICATION

This application claims the benefit of U.S. Provisional Patent Application No. 63/202,162, which was filed on May 28, 2021 and is incorporated by reference herein in its entirety.

TECHNICAL FIELD

The present disclosure generally relates to cryogenic fluid and, more specifically, to a low-emission nozzle and receptacle coupling for cryogenic fluid.

BACKGROUND

Receptacles are designed to receive fluid from nozzles. Receptacles transfer the received fluid into a connected storage tank. One example of a receptacle is a car gasoline port. One example of a nozzle is a gasoline dispenser at a gas station. One example of a connected storage tank is a car gas tank.

Cryogenic fluids, such as liquid hydrogen (LH2), also may be transferred between storage tanks via specialized nozzles and receptacles. For instance, a nozzle may be connected to a storage tank of a filling station for liquid hydrogen, and a receptacle may be connected to a storage rank of a vehicle that will subsequently transport the liquid hydrogen. Liquid hydrogen is stored in liquid form at cryogenic temperatures, which may make it difficult to comfortably and securely transfer between storage tanks.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 56 depicts a third stage of the receptacle of FIG. 49 coupling to the nozzle of FIG. 50 with an outer sleeve of the locking assembly depicted as translucent for illustrative purposes.

DETAILED DESCRIPTION OF EXAMPLE EMBODIMENTS

Figure 1:
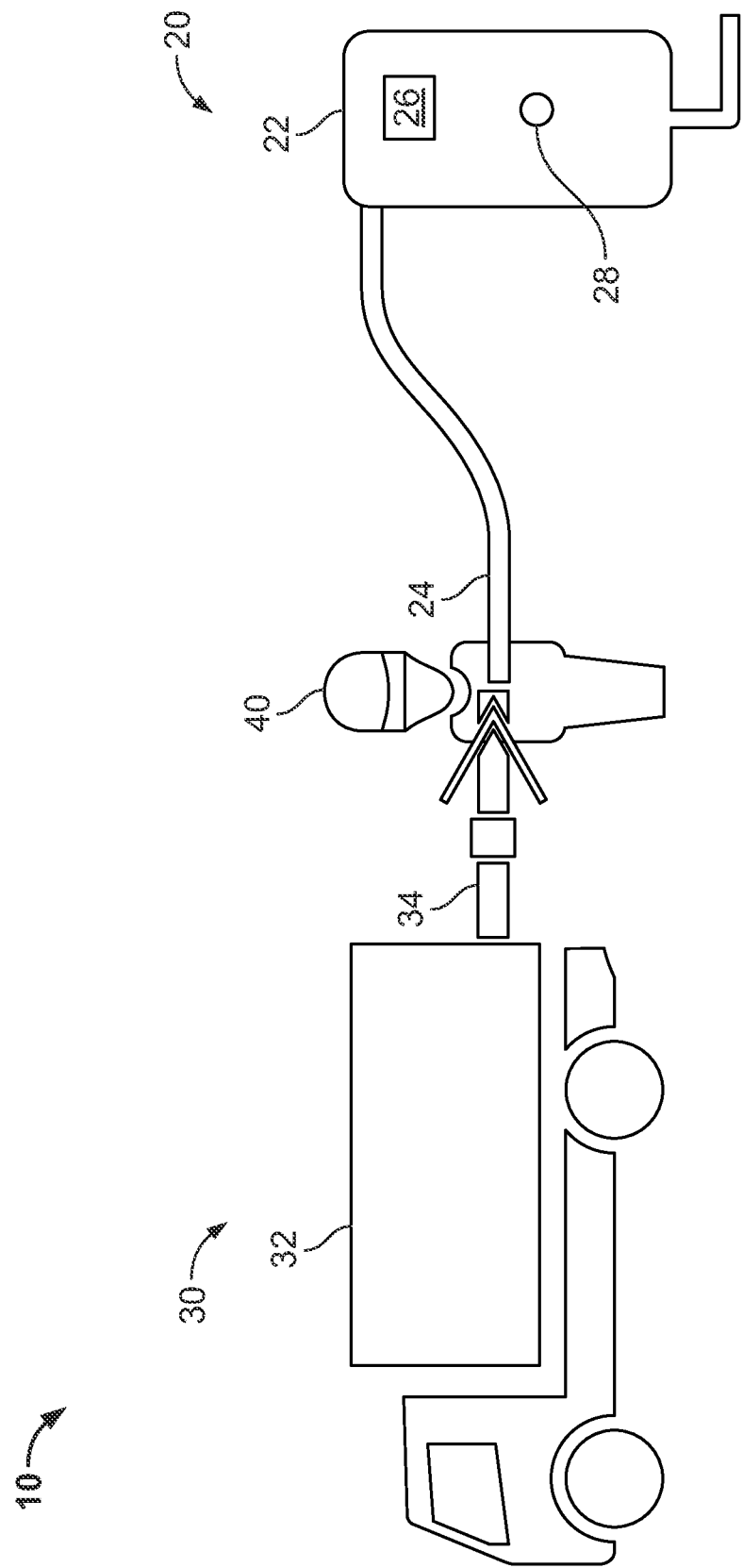
FIG. 1 illustrates an example system for filling a fill tank with cryogenic fluid in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Example systems and methods of use disclosed herein include a nozzle and a receptacle for transferring cryogenic fluid, such as liquid nitrogen, from a storage tank to a fill tank. For example, the nozzle and the receptacle are configured to impede the cryogenic fluid from being emitted into the atmosphere when the nozzle is coupled to and decoupled from the receptacle. The nozzle and the receptacle also are configured facilitate an operator in safely transferring the cryogenic fluid during a fill event.

Example nozzles and methods of use are disclosed herein for safely transferring cryogenic fluid, such as liquid nitrogen, from a storage tank to a fill tank. The nozzles are configured to fluidly couple to one or more types of receptacles to fluidly connect a fill tank to a storage tank. The example nozzles are configured to impede cryogenic fluid from being emitted into the atmosphere when coupled to a receptacle.

Example receptacles and methods of use are disclosed herein for safely transferring cryogenic fluid, such as liquid nitrogen, from a storage tank to a fill tank. The receptacles are configured to fluidly couple to one or more types of receptacles to fluidly connect a storage tank to a fill tank. The example receptacles are configured to impede cryogenic fluid from being emitted into the atmosphere when coupled to a nozzle.

Turning to the figures, FIG. 1 illustrates an example system 10 for transferring cryogenic fluids, such as liquid hydrogen, in accordance with the teachings herein. The system 10 includes a filling station 20 and a vehicle 30 for transporting cryogenic fluid.

The filling station 20 of the illustrated example includes a storage tank 22, a hose 24 connected to and extending from the storage tank 22, a nozzle (such as a nozzle 200 of FIGS. 2-3, 5-15, and 17-24, a nozzle 300 of FIG. 25, a nozzle 400 of FIG. 26, a nozzle 500 of FIG. 27, a nozzle 600 of FIG. 28, a nozzle 700 of FIG. 29, and a nozzle 800 of FIG. 30, a nozzle 1000 of FIGS. 33 and 37) at a distal end of the hose 24, a controller 26 for controlling the filling process in an safe and secure manner, and a button 28. The controller 26 of the filling station 20 includes hardware with circuitry to provide monitoring and control capabilities. The vehicle 30 includes a fill tank 32, a hose 34 connected to and extending from the fill tank 32, and a receptacle (such as a receptacle 100 of FIGS. 2-4, 6-16, and 18-24, a receptacle 900 of FIGS. 31 and 35) at a distal end of the hose 34. In other examples, the receptacle is mounted directly to the fill tank 32 (e.g., via a flange 112 of FIG. 4) without an external intermediate hose.

In the illustrated example, the storage tank 22 of the filling station 20 is configured to store cryogenic fluid, and the fill tank 32 of the vehicle 30 is configured to receive the cryogenic fluid from the storage tank 22 via the hoses 24, 34, the nozzle, and the receptacle. In order to transfer cryogenic fluid from the storage tank 22 to the fill tank 32, an operator 40 is to couple the nozzle to the receptacle to fluidly connect the fill tank 32 to the storage tank 22. Once the operator 40 securely couples the nozzle to the receptacle, the operator 40 initiates the transfer of cryogenic fluid from a remote location. For example, the operator 40 presses the button 28 at the filling station 20 to instruct the controller 26 to begin the filling sequence.

Figure 22:
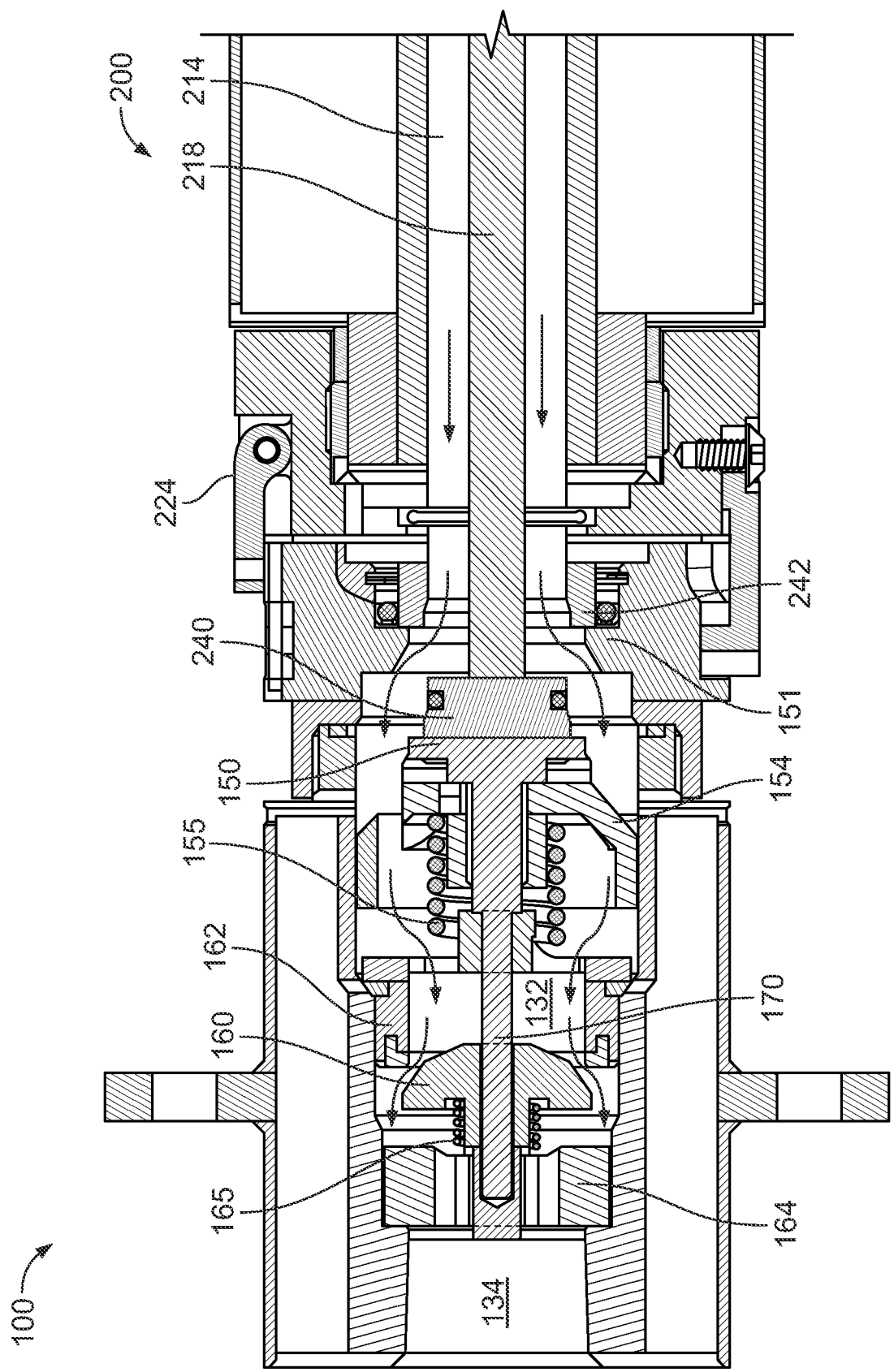
FIG. 22 is a magnified side cross-sectional view of the receptacle and the nozzle of FIG. 2 in the coupled state when the plug of the nozzle and a plug of the receptacle are in respective open positions.
Figure 23:
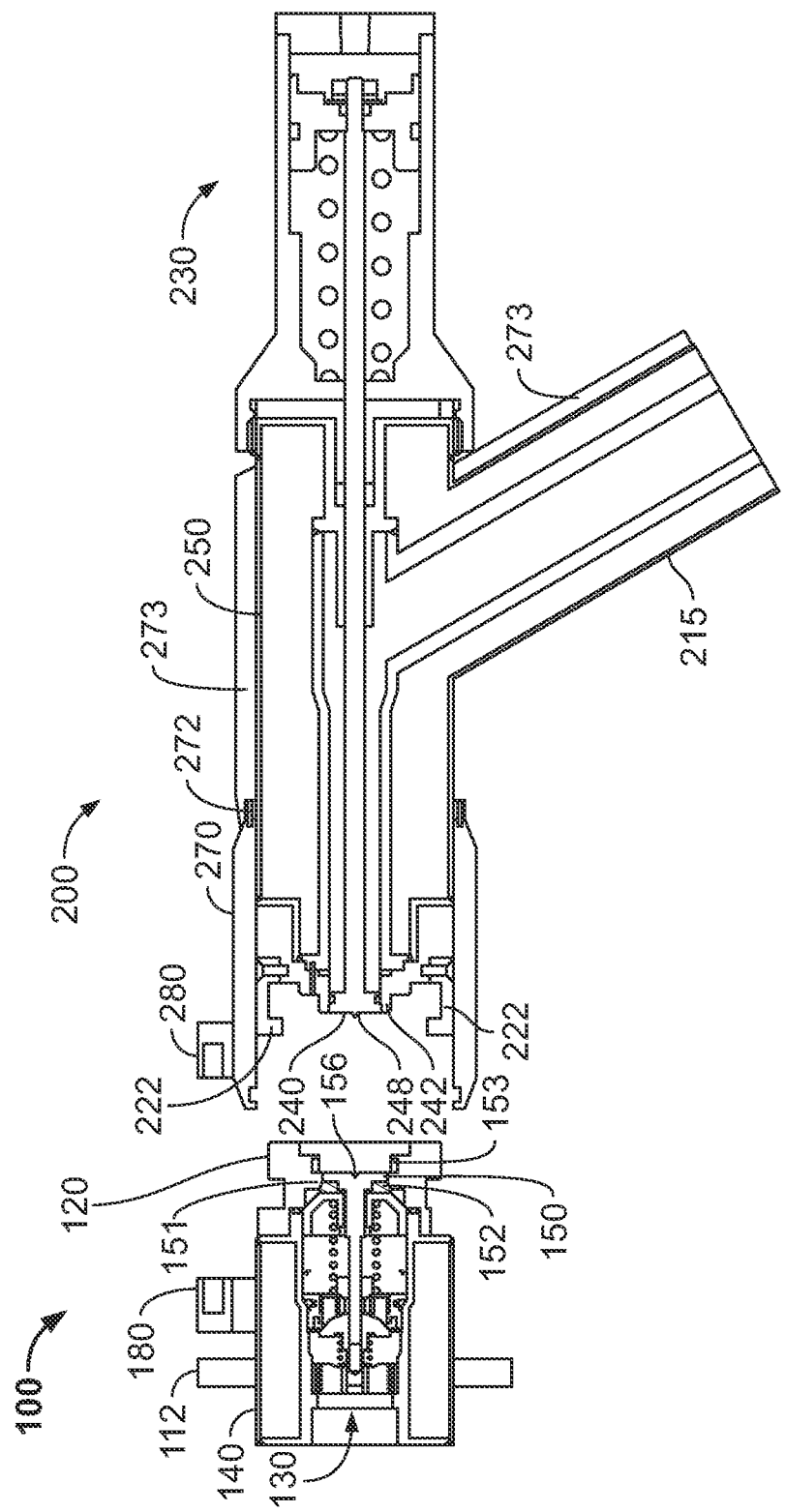
FIG. 23 depicts a sensor assembly for detecting a coupling state of the nozzle and the receptacle of FIG. 2 when the nozzle and the receptacle are decoupled.
Figure 24:
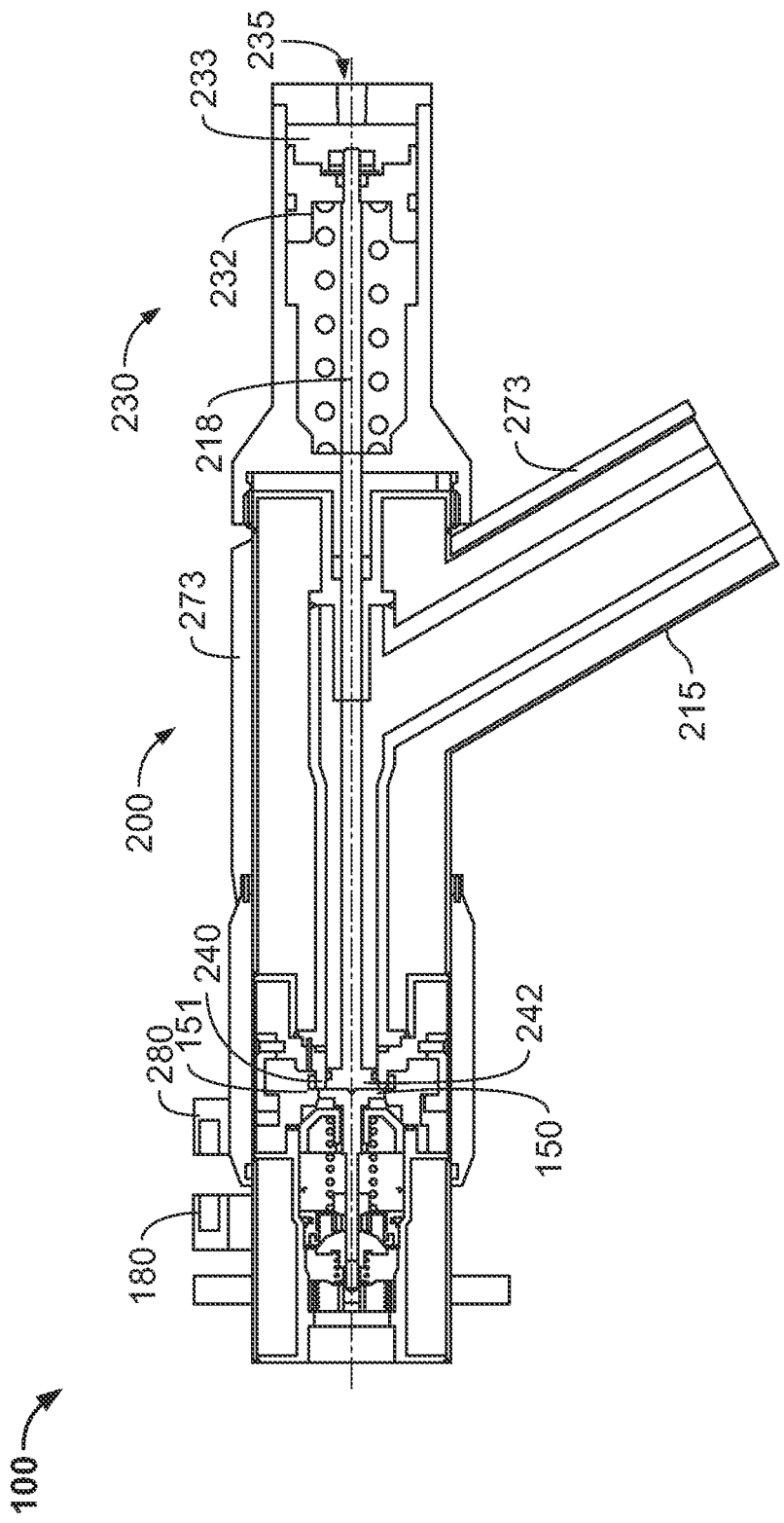
FIG. 24 depicts the sensor assembly of FIG. 25 when the nozzle and the receptacle of FIG. 2 are in the coupled state.

FIGS. 2-24 depict an example receptacle 100 and an example nozzle 200 in accordance with the teachings herein. More specifically, FIGS. 2-14 illustrate mechanisms for securely coupling the nozzle 200 to the receptacle 100. FIGS. 15-22 illustrate internal components of the nozzle 200 to the receptacle 100 that control the flow of cryogenic fluid between the storage tank 22 and the fill tank 32. FIGS. 23-24 illustrate a sensor assembly configured to detect when the nozzle 200 is securely coupled to the receptacle 100.

Figure 2:
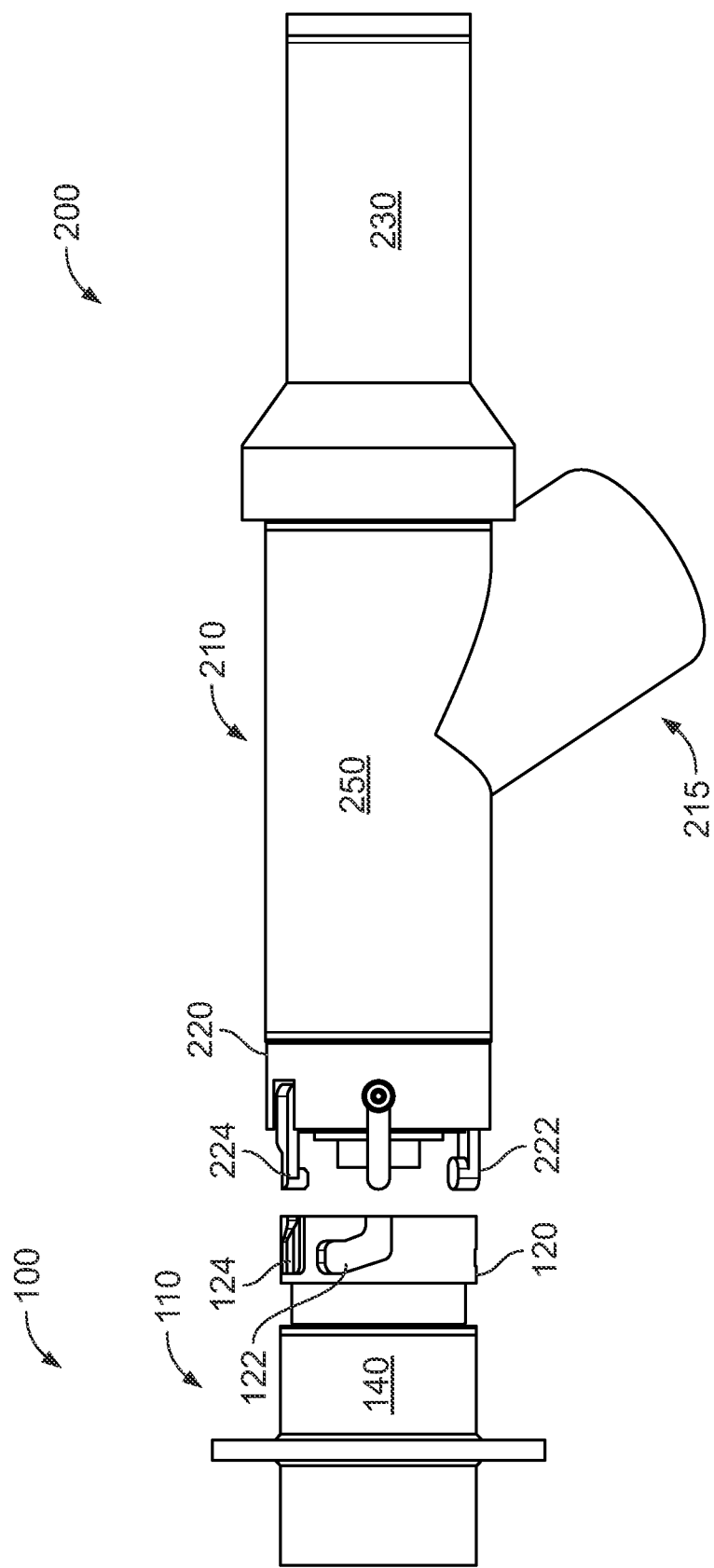
FIG. 2 is a side view of an example nozzle and an example receptacle for transferring cryogenic fluid in accordance with the teachings herein.
Figure 3:
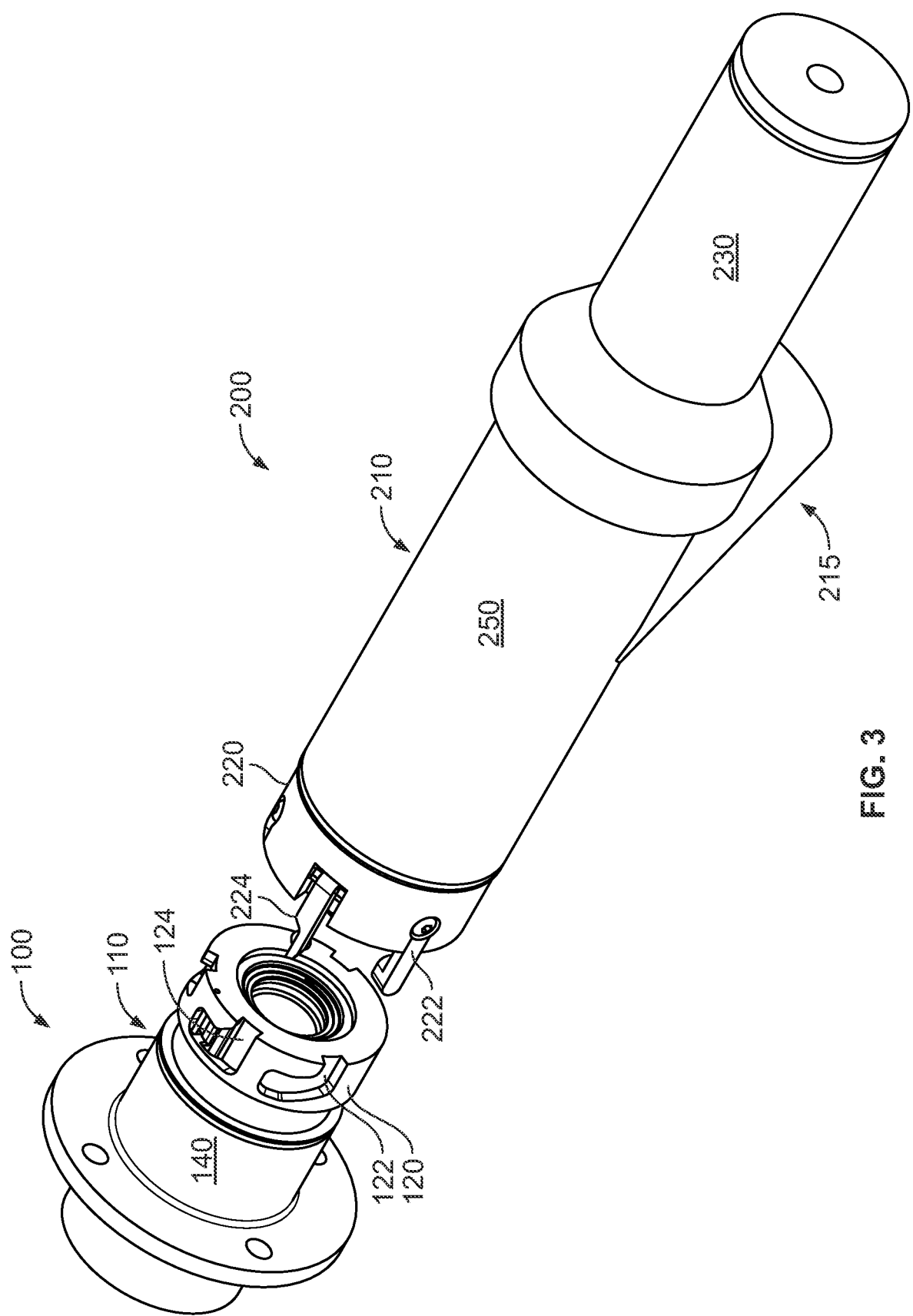
FIG. 3 is a perspective view of the nozzle and the receptacle of FIG. 2.
Figure 4:
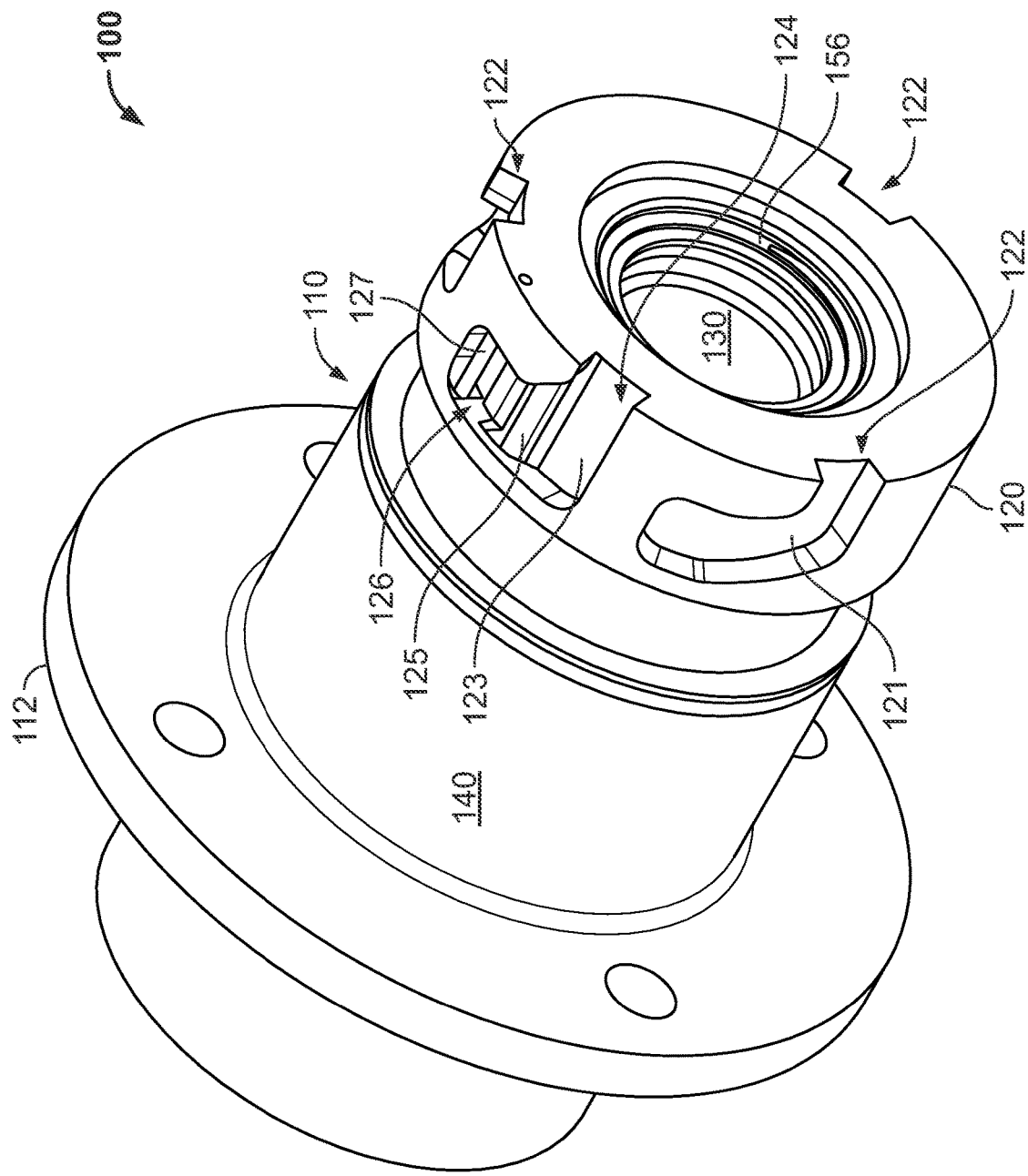
FIG. 4 is a magnified perspective view of the receptacle of FIG. 2.

As illustrated in FIGS. 2-4, the receptacle 100 includes a body 110 and a head 120 (also referred to as a "bonnet") coupled to and extending from a front end of the body 110. A flange 112 extends radially outward from the body 110 and is configured to couple the receptacle 100 to a wall, such as a wall of the fill tank 32. A chamber 130 of the receptacle 100 is defined by the head 120 and an inner wall 111 (FIG. 16) of the body 110. Additionally, as shown in FIGS. 23-24, the receptacle 100 of includes a sensing device 180.

Returning to FIGS. 2-4, the head 120 includes an outer surface that defines coupling slots 122, 124. For example, the head 120 defines one or more coupling slots 122 (also referred to as "primary slots" or "primary coupling slots") and one or more coupling slot 124 (also referred to as "secondary slots" or "secondary coupling slots").

Each of the coupling slots 122, 124 are generally L-shaped and bend or curl in a particular direction. In the illustrated example, the coupling slots 122, 124 bend or curl in a clockwise direction. In other examples, the coupling slots 122, 124 may bend in a counter-clockwise direction. Additionally, each of the coupling slots 122, 124 has an open, proximal end along an outer edge of the head 120 of the receptacle 100. The open end of each of the coupling slots 122, 124 enables respective coupling arms 222, 224 of the nozzle 200 to slide into the coupling slots 122, 124 to securely couple the nozzle 200 to the receptacle 100.

As most clearly shown in FIG. 4, each of the coupling slots 122 is defined by a surface 121 that is cylindrical. The coupling slot 124 is defined by a surface 123 that is cylindrical and extends axially along the head 120 of the receptacle 100. The surface 123 extends to a sloped surface 125 adjacent to the bend or curl of the coupling slot 124. For example, the sloped surface 125 in a radially outward spiral direction away from the surface 123 of the coupling slot 124. The sloped surface 125 extends to a cavity 126 at a distal end of the coupling slot 124. The coupling slot 124 also includes a shelf 127 that extends along a width of the cavity 126 of the coupling slot 124.

Figure 5:
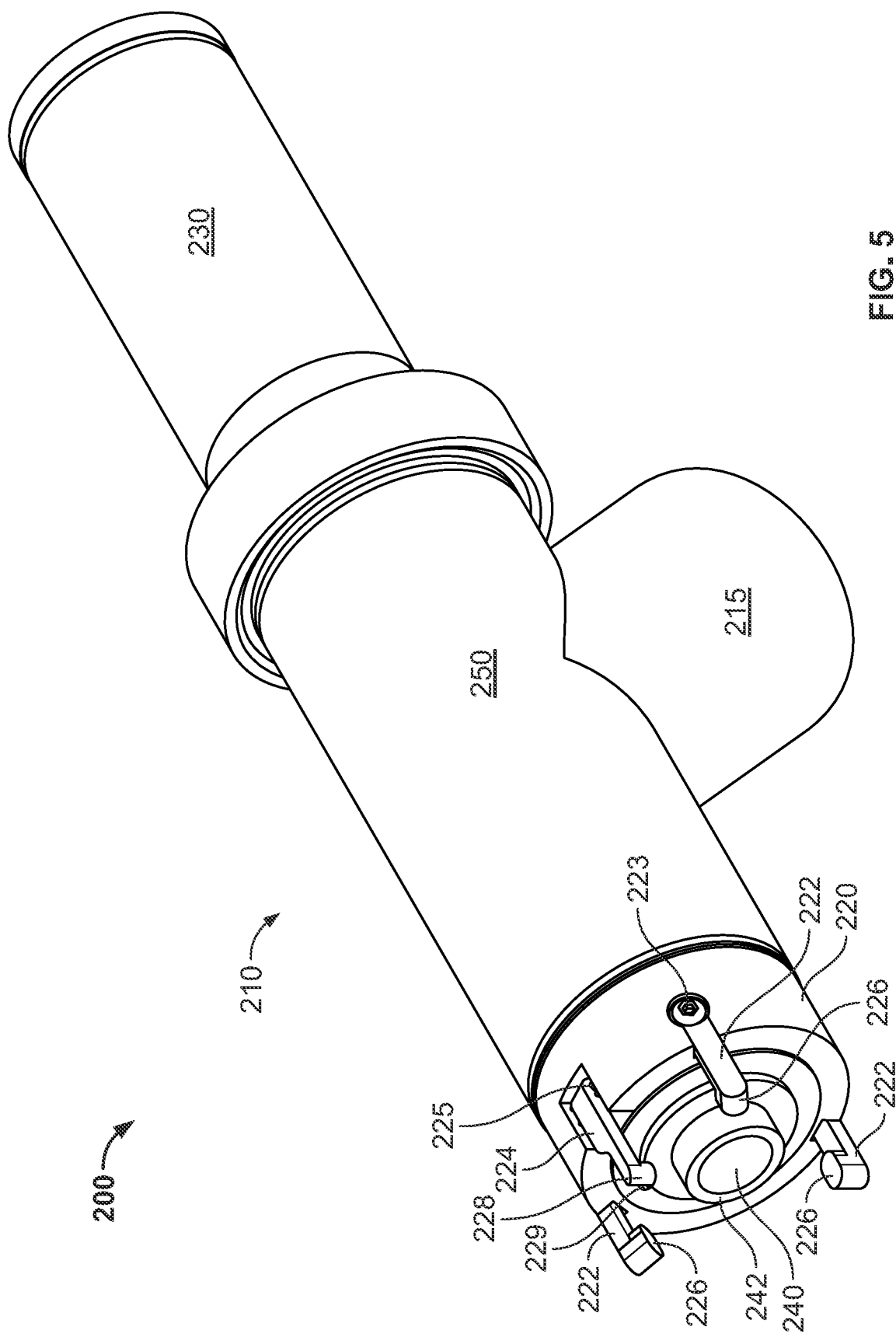
FIG. 5 is a magnified perspective view of the nozzle of FIG. 2.

As illustrated in FIGS. 2-3 and 5, the nozzle 200 includes a body 210, a head 220, and an actuator 230. The head 220 (also referred to as a "bonnet") is coupled to and extends from a front end of the body 210, and the actuator 230 is coupled to and extends from an opposing back end of the body 210. An extension 215 of the body 210 extends outward and is configured to connect to the hose 24 to fluidly connect the nozzle 200 to the storage tank 22. As disclosed below in greater detail, the nozzle 200 includes a poppet 240 and a poppet seat 242 that extend from the front end of the body 210 of the nozzle 200 and are configured to control the flow of cryogenic fluid from the nozzle 200. Additionally, as shown in FIGS. 23-24, the nozzle 200 includes a sleeve 270 and a sensing device 280.

Returning to FIGS. 2-3 and 5, the nozzle 200 includes one or more coupling arms 222 (also referred to as "primary arms" or "primary coupling arms") and one or more coupling arms 224 (also referred to as "secondary arms" or "secondary coupling arms"). Each of the coupling arms 222, 224 extend axially outward from the head 220 in a direction away from the body 210 of the nozzle 200. In the illustrated example, the head 220 includes three coupling arms 222 and one coupling arm 224. In other examples, the head 220 may include more or fewer coupling arms 222 and/or more or fewer coupling arms 224 that enable the nozzle 200 to securely couple to the receptacle 100.

Each of the coupling arms 222 is fixedly coupled to the head 220. In the illustrated example, each of the coupling arms 222 is coupled to the head 220 via a respective fastener 223. Each of the fasteners couples a proximal end of a respective one of the coupling arms 222. In other examples, the coupling arms 222 are integrally formed with the head 220 (e.g., the coupling arms 222 are machined into the head 220). Additionally, a protrusion 226 extends radially inward from each of the respective coupling arms 222. The protrusions 226 of the coupling arms 222 are configured to be received by and slide within the coupling slots 122 to facilitate the securely coupling of the nozzle 200 to the receptacle 100.

A proximal end of the coupling arm 224 is hingedly coupled to the head 220 via a hinge 225. In the illustrated example, the hinge 225 is a spring-biased hinge that biases the coupling arm 224 radially inward. Additionally, a protrusion 228 extends radially inward from the coupling arm 224, and the protrusion 228 defines a ledge 229. As disclosed below in greater detail, the protrusion 228 of the coupling arm 224 is configured to be received by and slide within the coupling slot 124 to facilitate the securely coupling of the nozzle 200 to the receptacle 100. The ledge 229 of the protrusion 228 is configured to engage the shelf 127 within the cavity 126 of the coupling slot 124 to lock the nozzle 200 in place relative to the receptacle 100.

In the illustrated example, the nozzle 200 includes three of the coupling arms 222 that are equidistantly spaced apart from each other about the outer circumference of the head 220, and the receptacle 100 includes three of the coupling slots 122 that are equidistantly spaced apart from each other about the outer circumference of the head 120. The coupling arm 224 of the nozzle 200 is positioned (e.g., centrally) between two of the coupling arms 222, and the coupling slot 124 of the receptacle 100 is positioned (e.g., centrally) between two of the coupling slots 122 to facilitate alignment of coupling arms 222, 224 to the respective coupling slots 122, 124. In other examples, the head 120 of the receptacle 100 may define any number of coupling slots 122 and/or coupling slots 124 and the nozzle 200 may include any number of coupling arms 222 and/or coupling arms 224 that enable the nozzle 200 to securely couple to the receptacle 100. Additionally or alternatively, the coupling arms 224 and the coupling slots 124 may be positioned at any location relative to the coupling arms 222 and the coupling slots 122, respectively, that facilitates alignment between the coupling arms 222, 224 and the coupling slots 122, 124.

FIGS. 6-15 depict the nozzle 200 and the receptacle 100 as the nozzle 200 is securely coupled to the receptacle via the coupling arms 222, 224 and the coupling slots 122, 124.

Figure 6:
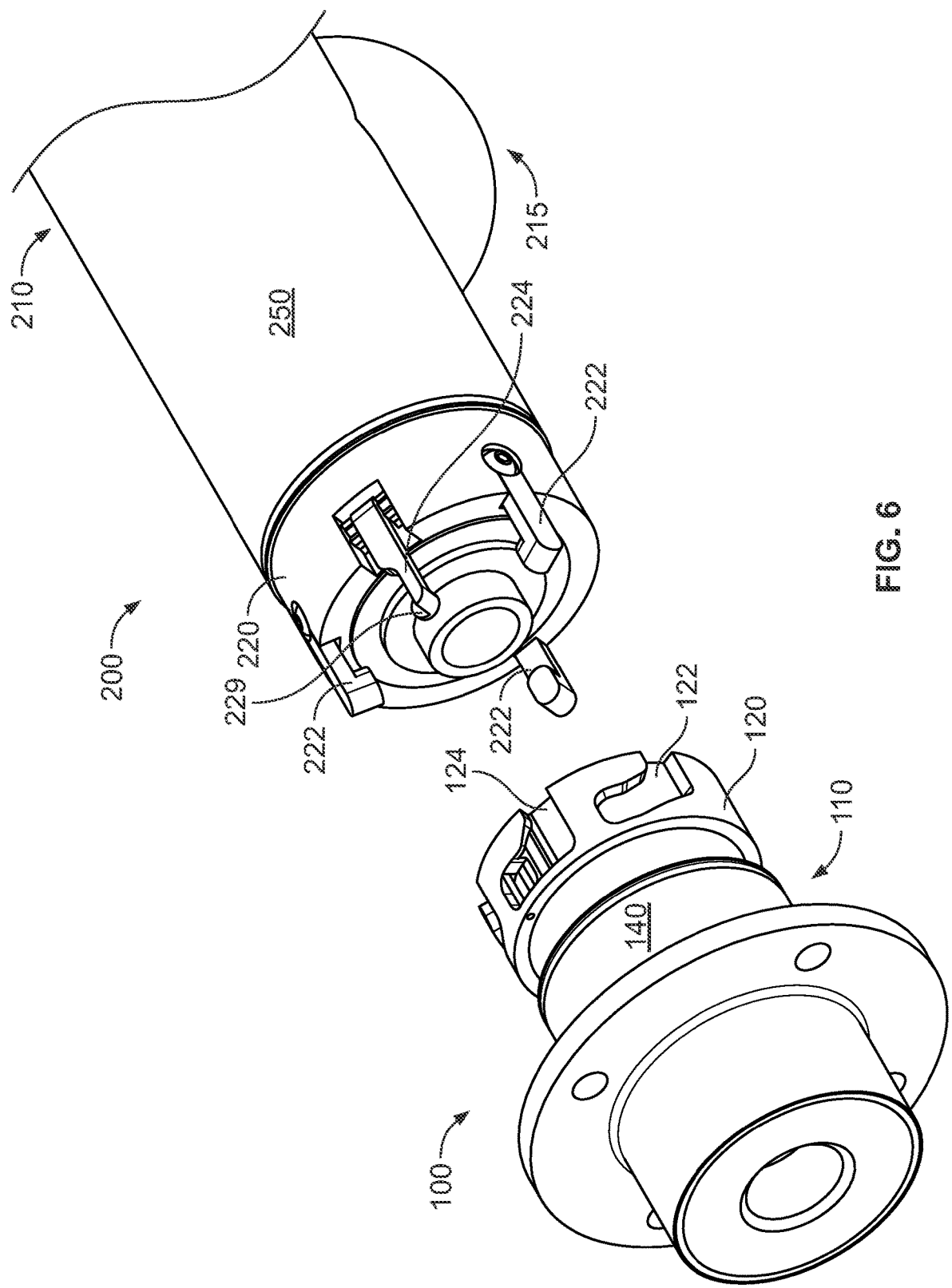
FIG. 6 is a magnified perspective view of the receptacle and a portion of the nozzle of FIG. 2.

FIG. 6 depicts a preliminary stage of the coupling process in which the nozzle 200 is spaced apart from the receptacle 100. The nozzle 200 is positioned relative to the receptacle 100 such that the coupling arms 222 are aligned axially with coupling slots 122 and the coupling arm 224 is aligned axially with the coupling slot 124.

Figure 7:
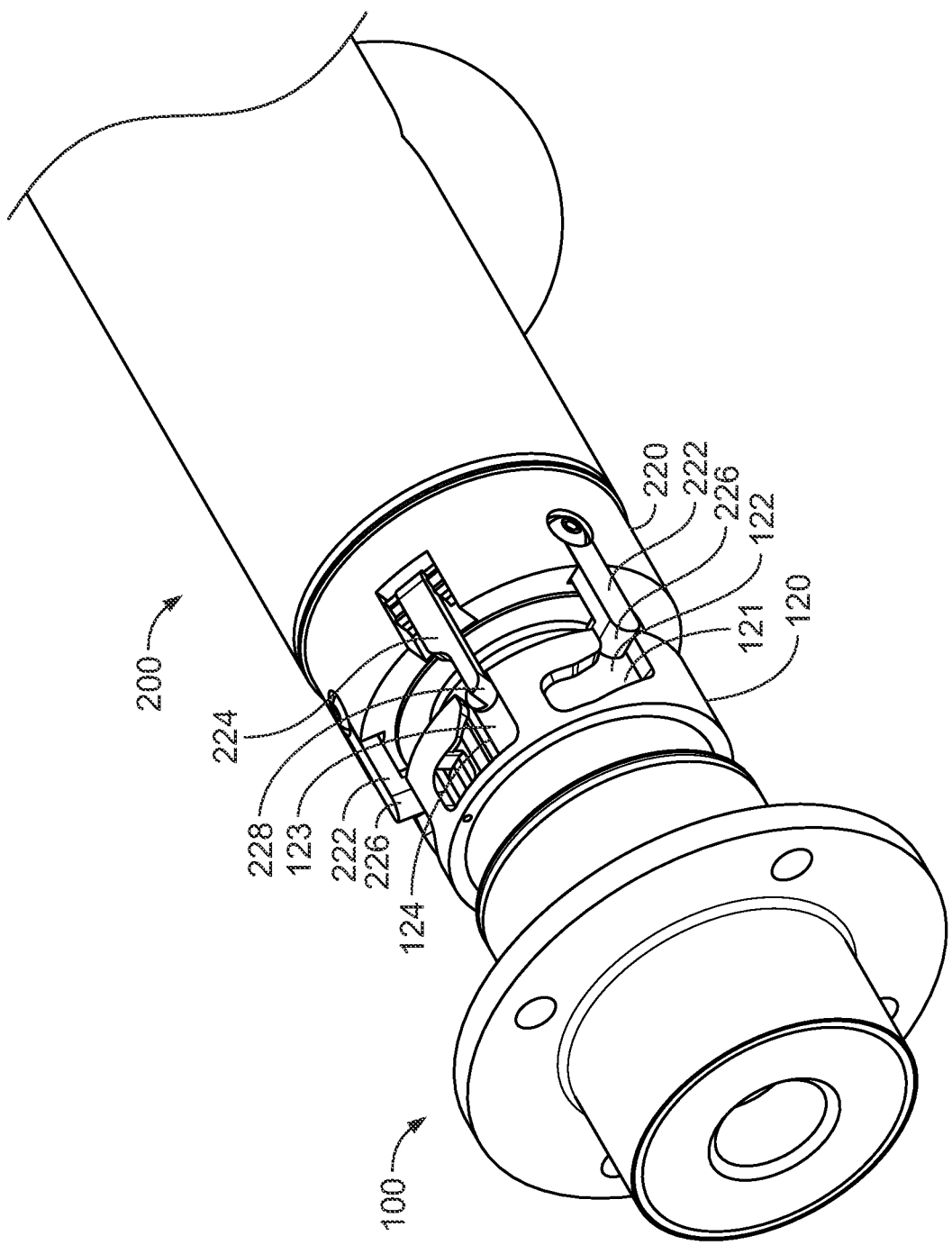
FIG. 7 is a magnified perspective view of the receptacle and a portion of the nozzle of FIG. 2 in a first stage of a coupling sequence.

FIG. 7 depicts a first stage in the coupling process in which the coupling arms 222, 224 are positioned at the open end of the respective coupling slots 122, 124. The protrusion 226 of each of the coupling arms 222 engages and/or is adjacent to the surface 121 of the respective one of the coupling slots 122, and the protrusion 228 of the coupling arm 224 engages and/or is adjacent to the surface 123 of the coupling slot 124.

Figure 8:
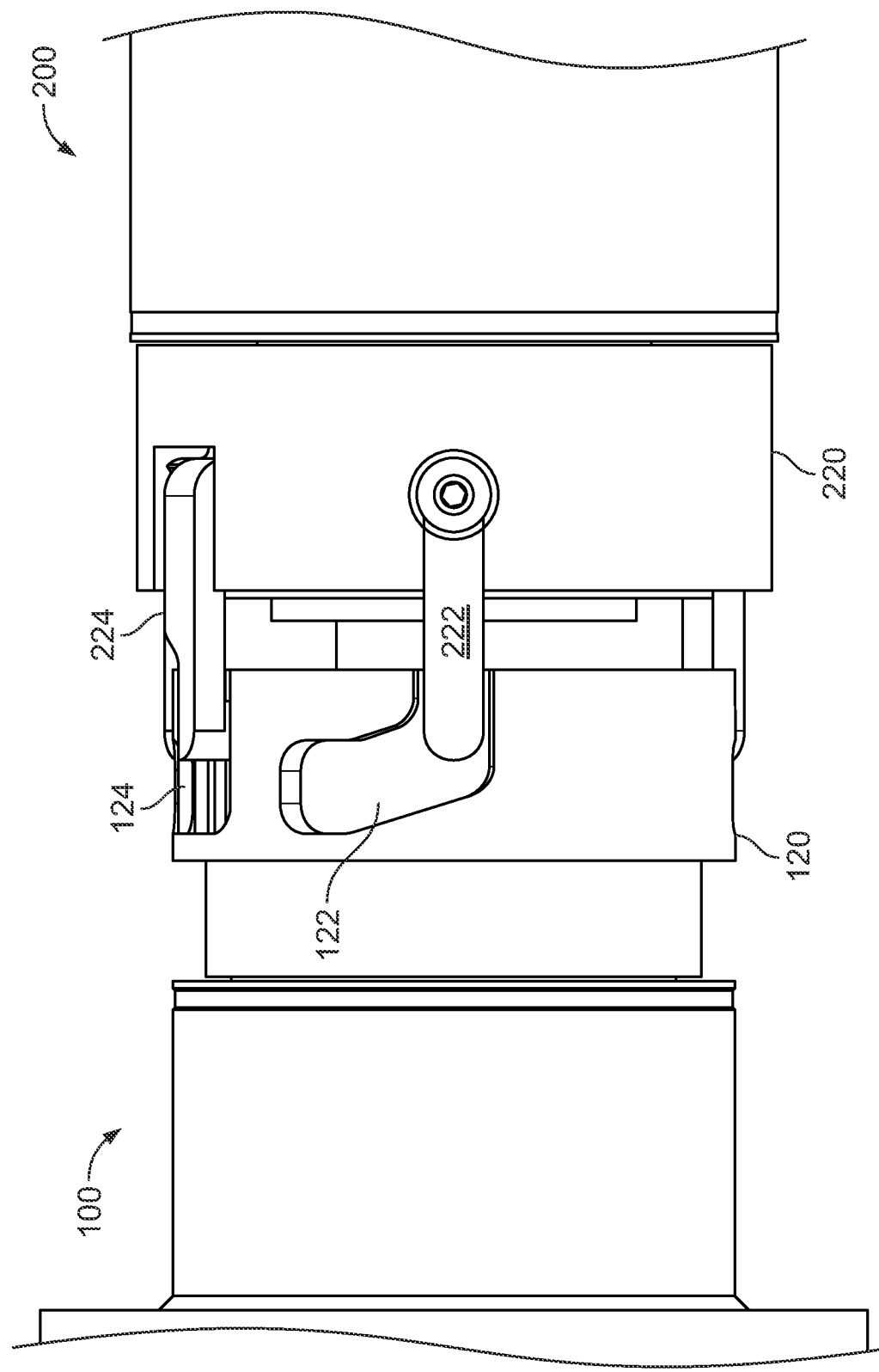
FIG. 8 is a magnified side view of a portion of the receptacle and the nozzle of FIG. 2 in a second stage of a coupling sequence.

FIG. 8 depicts a subsequent second stage of the coupling process after the nozzle 200 is pushed axially by the operator 40 toward the body 110 of the receptacle 100. The protrusion 226 of each of the coupling arms 222 is positioned farther inward within the respective one of the coupling slots 122 away from the open end, and the protrusion 228 of the coupling arm 224 is positioned farther inward within the coupling slot 124 away from the open end. Each of the protrusions 226 continues to engage and/or be adjacent to the surface 121 of the respective one of the coupling slots 122, and the protrusion 228 continues to engage and/or be adjacent to the surface 123 of the coupling slot 124.

Figure 9:
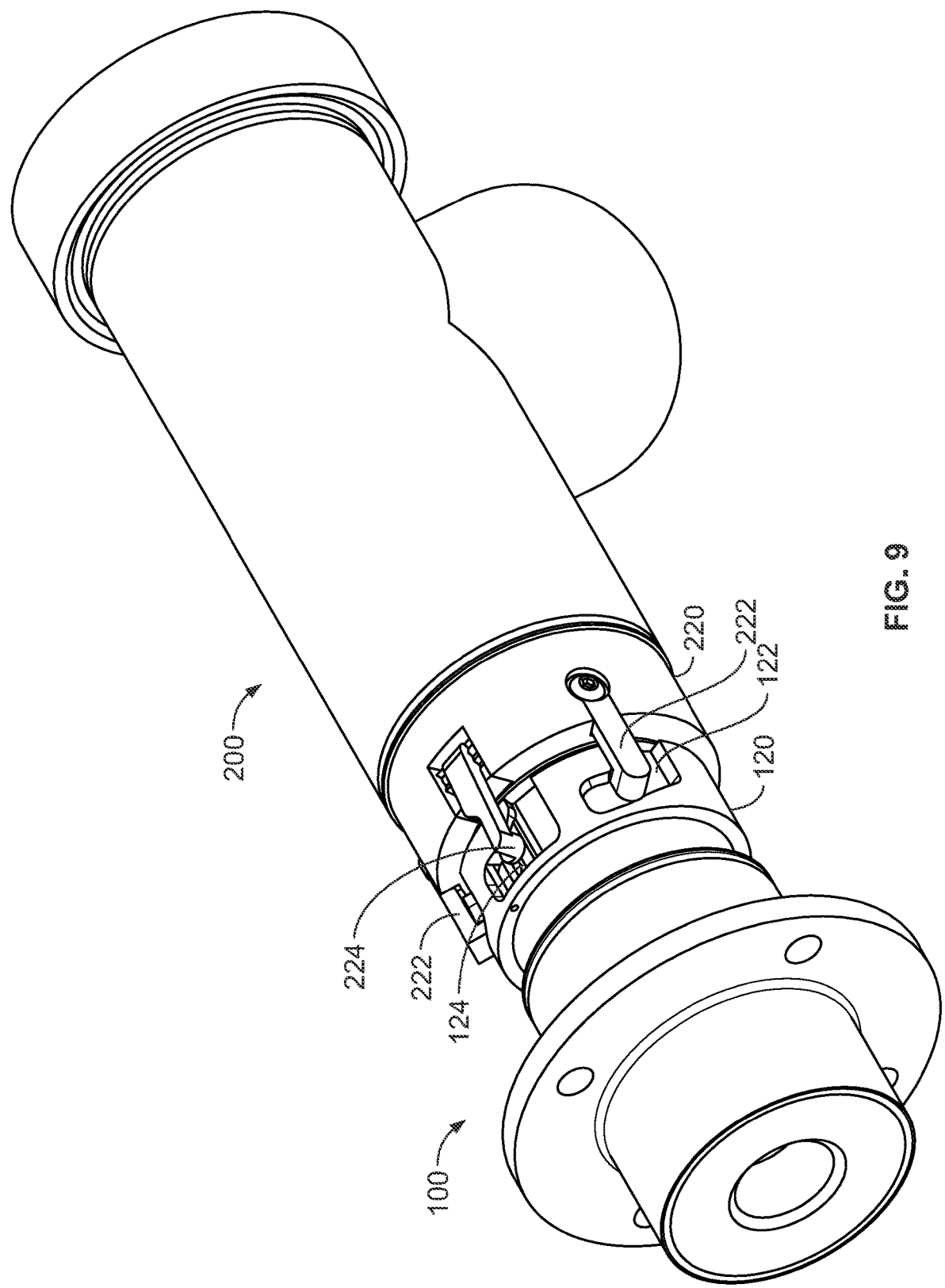
FIG. 9 is a magnified perspective view of the receptacle and a portion of the nozzle of FIG. 2 in a third stage of the coupling sequence.
Figure 10:
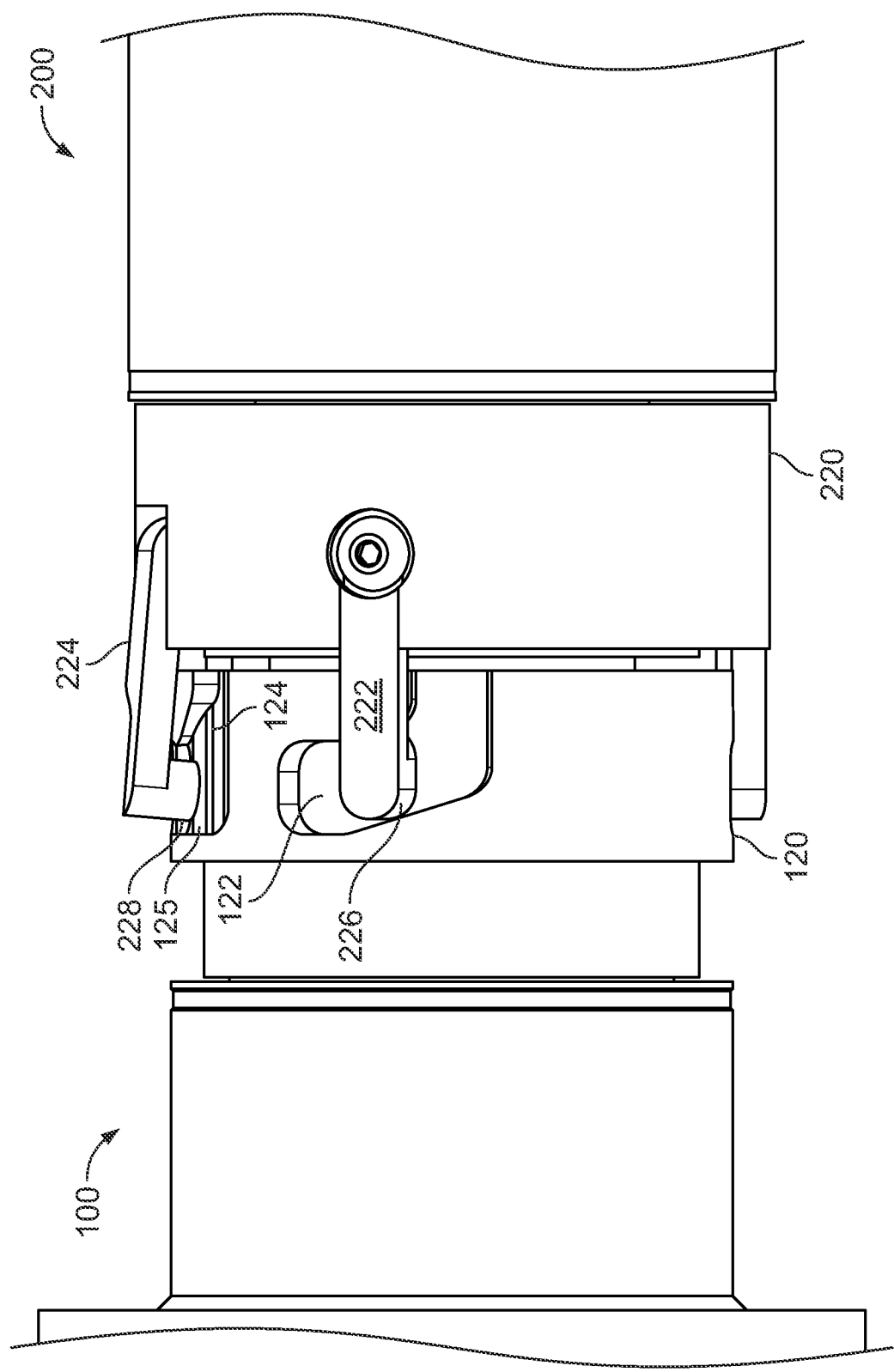
FIG. 10 is a magnified side view of a portion of the receptacle and the nozzle of FIG. 2 in the third stage of FIG. 9.

FIGS. 9-10 depicts a subsequent third stage of the coupling process after the nozzle 200 is rotated by the operator 40 relative to the receptacle 100 to couple the nozzle 200 to the receptacle 100. The protrusion 226 of each of the coupling arms 222 is positioned farther inward within and adjacent to the bend or curl of the respective one of the coupling slots 122. Each of the protrusions 226 continues to engage and/or be adjacent to the surface 121 of the respective one of the coupling slots 122. Additionally, the protrusion 228 of the coupling arm 224 is positioned farther inward within and adjacent to the bend or curl of the coupling slot 124. The protrusion 228 of the coupling arm 224 engages the sloped surface 125 of the coupling slot 124. The sloped surface 125 pushes the coupling arm 224 to rotate radially outward about the hinge 225.

Figure 11:
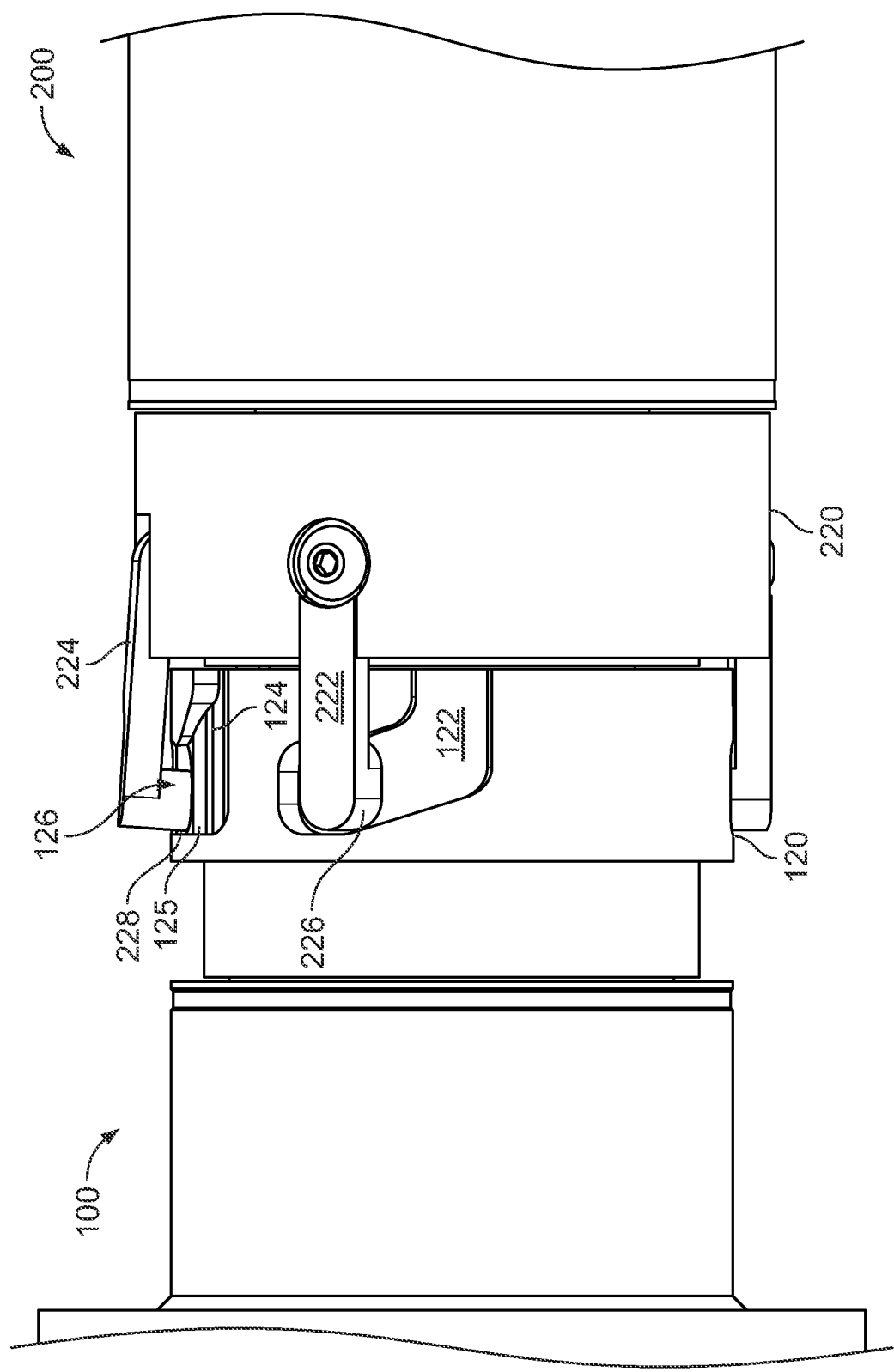
FIG. 11 is a magnified side view of a portion of the receptacle and the nozzle of FIG. 2 in a fourth stage of the coupling sequence.

FIG. 11 depicts a subsequent fourth stage of the coupling process after the nozzle 200 has been further rotated by the operator 40 relative to the receptacle 100. The protrusion 226 of each of the coupling arms 222 is positioned between the bend or curl and the distal end of the respective one of the coupling slots 122. Each of the protrusions 226 continues to engage and/or be adjacent to the surface 121 of the respective one of the coupling slots 122. Additionally, a portion of the protrusion 228 of the coupling arm 224 remains engaged to a portion of the sloped surface 125, and another portion of the protrusion 228 is positioned over the cavity 126 of the coupling slot 124. The sloped surface 125 continues to push the coupling arm 224 radially outward about the hinge 225.

Figure 12:
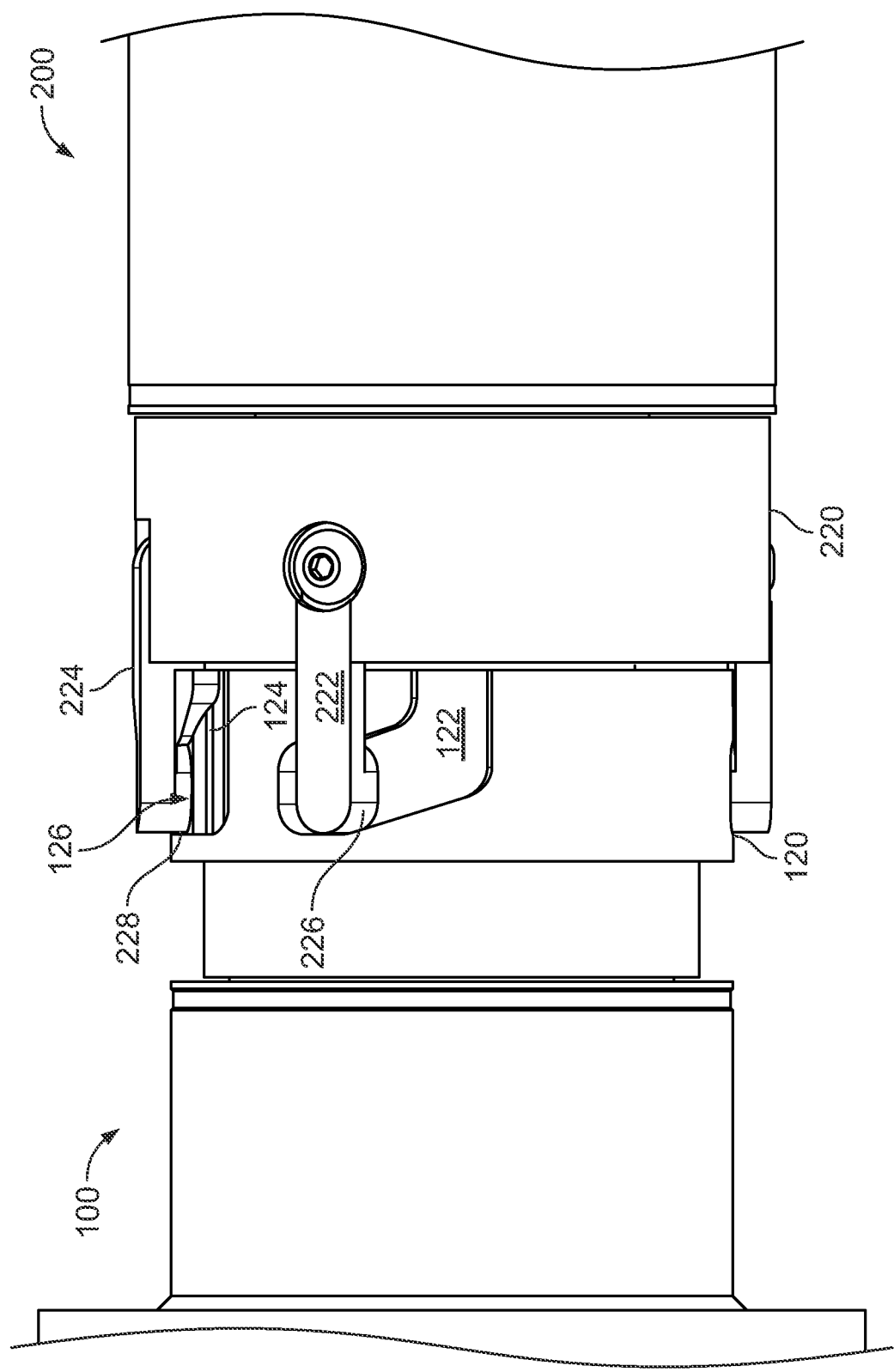
FIG. 12 is a magnified side view of a portion of the receptacle and the nozzle of FIG. 2 in a fifth stage of the coupling sequence.

FIG. 12 depicts a subsequent fifth stage of the coupling process after the nozzle 200 has been further rotated by the operator 40 relative to the receptacle 100. The protrusion 226 of each of the coupling arms 222 is positioned closer to the distal end of the respective one of the coupling slots 122 and continues to engage and/or be adjacent to the surface 121 of the respective one of the coupling slots 122. The protrusion 228 of the coupling arm 224 has disengaged from the sloped surface 125. In turn, the hinge 225 that is biased radially inward has caused the coupling arm 224 to rotate radially inward back to a radial rest position at which the protrusion 228 extends into the cavity 126 of the coupling slot 124.

Figure 13:
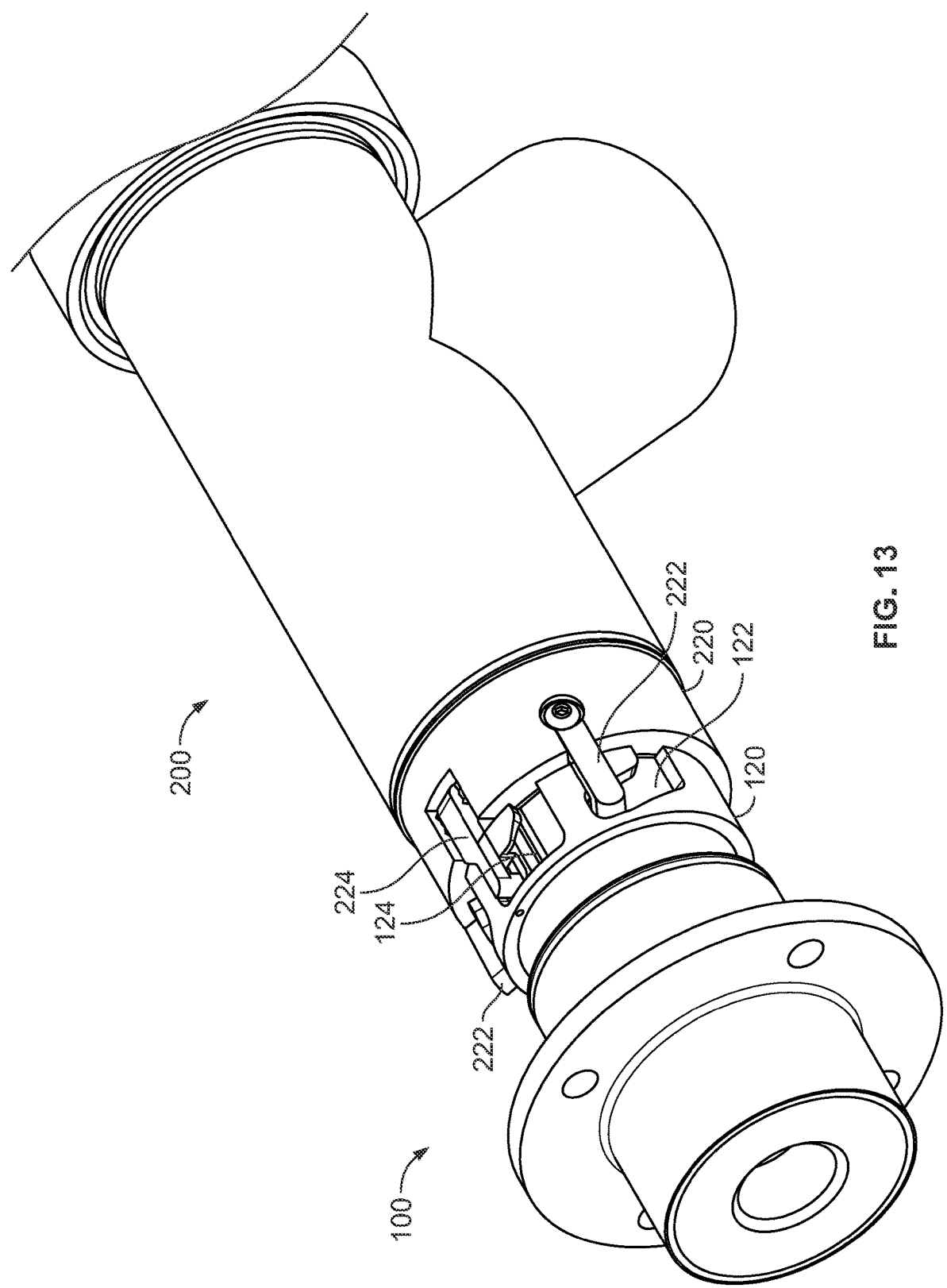
FIG. 13 is a magnified perspective view of the receptacle and a portion of the nozzle of FIG. 2 in a sixth stage of the coupling sequence.
Figure 14:
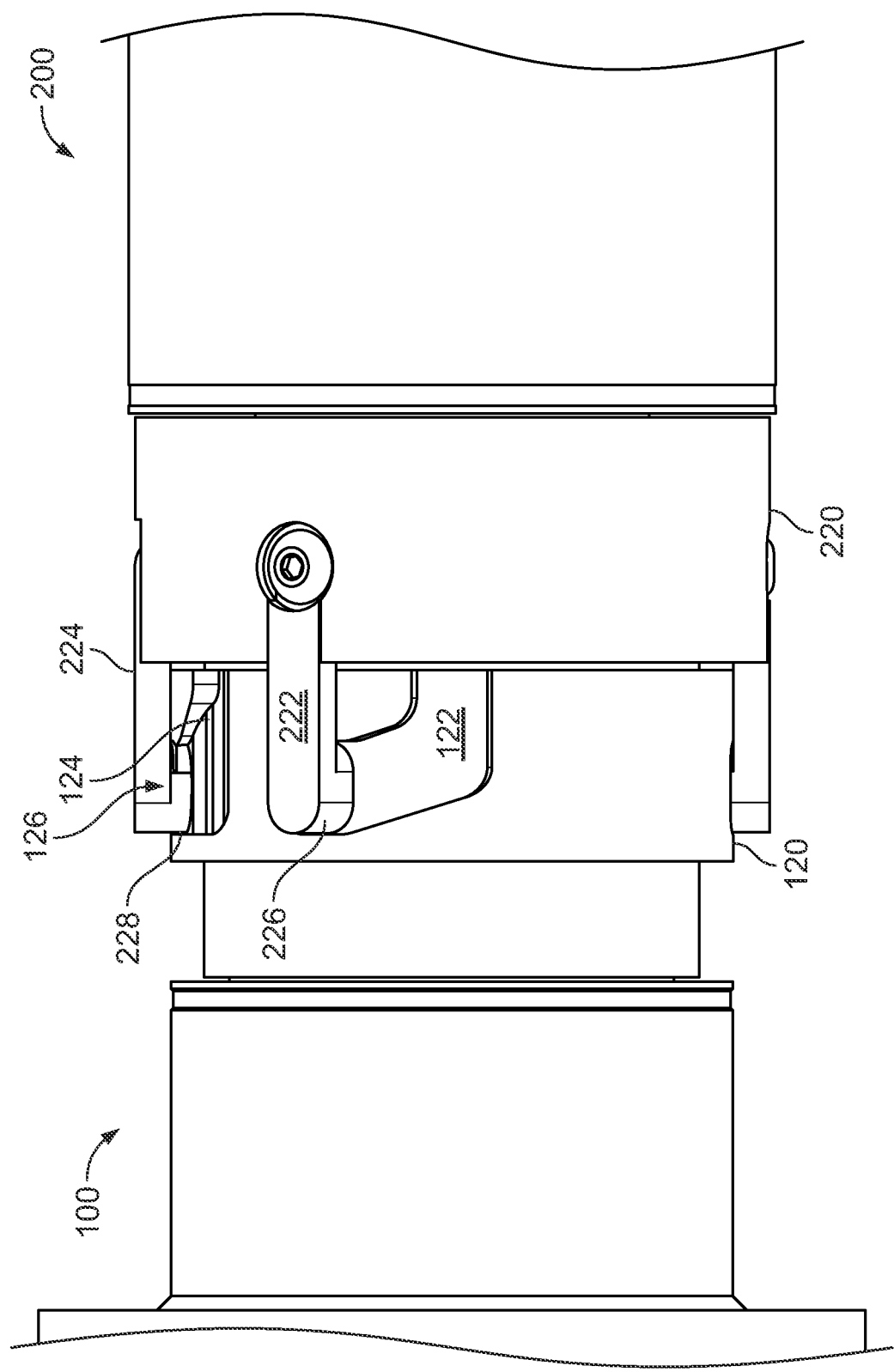
FIG. 14 is a magnified side view of a portion of the receptacle and the nozzle of FIG. 2 in the sixth stage of FIG. 13.
Figure 15:
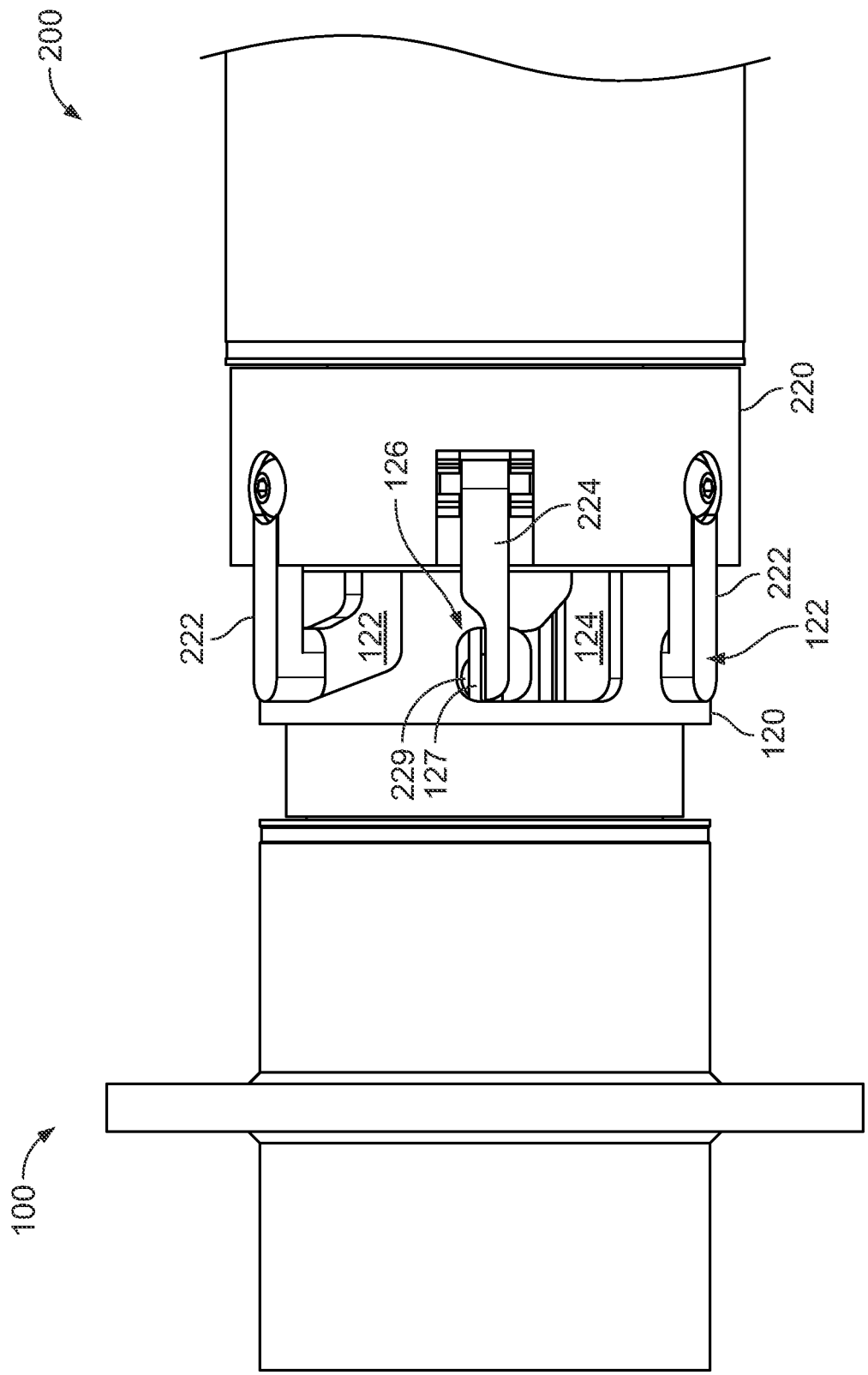
FIG. 15 is a magnified side view of a portion of the receptacle and the nozzle of FIG. 2 in the sixth state of FIG. 13.

FIGS. 13-15 depicts a subsequent sixth stage of the coupling process after the nozzle 200 has been further rotated by the operator 40 relative to the receptacle 100 to further secure the coupling between the nozzle 200 and the receptacle 100. The protrusion 226 of each of the coupling arms 222 is positioned at the distal end of the respective one of the coupling slots 122 and continues to engage and/or be adjacent to the surface 121 of the respective one of the coupling slots 122. As most clearly shown in FIG. 15, the further rotation of the nozzle 200 causes the ledge 229 of the protrusion 228 of the coupling arm 224 to slide under the shelf 127 of the coupling slot 124. The ledge 229 of the coupling arm 224 is positioned under the shelf 127 in the secured position to impede the operator 40 from pulling the nozzle 200 away from the receptacle 100 and, in turn, further secure the coupling between the nozzle 200 and the receptacle 100.

To decouple the nozzle 200 from the receptacle 100, the nozzle 200 is rotated slightly in the opposing direction such that the ledge 229 of the protrusion 228 of the coupling arm 224 is no longer under the shelf 127 of the coupling slot 124. The operator 40 then engages a decoupling mechanism, such as a lever or a wire, of the nozzle 200 to lift the distal end of the coupling arm 224 out of the cavity 126 of the coupling slot 124. Subsequently, the operator 40 rotates the nozzle 200 relative to the receptacle 100 in the opposing direction to cause the coupling arms 222, 224 to slide out the open ends of the respective coupling slots 122, 124.

Figure 16:
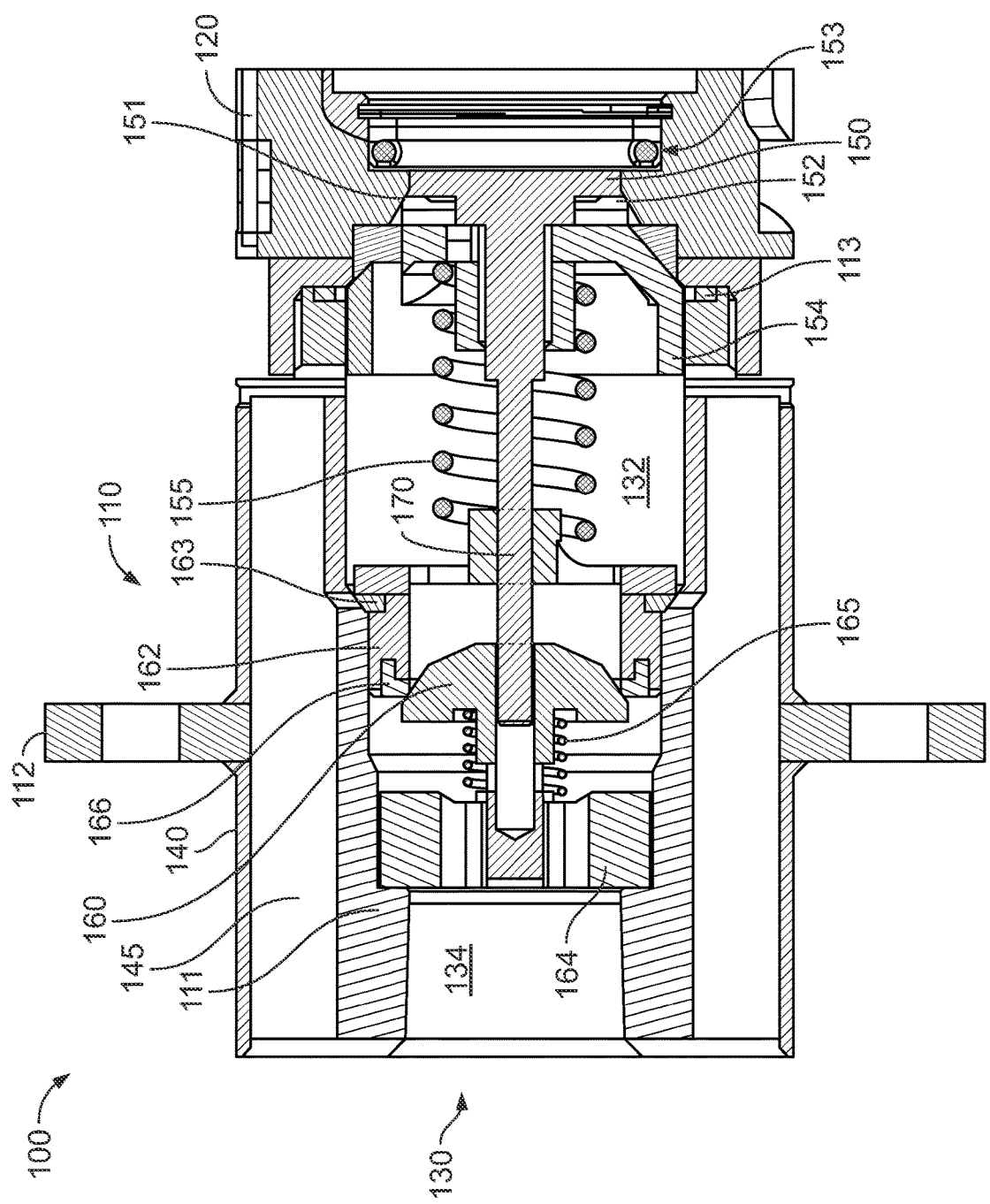
FIG. 16 is a side cross-sectional view of the receptacle of FIG. 2.
Figure 17:
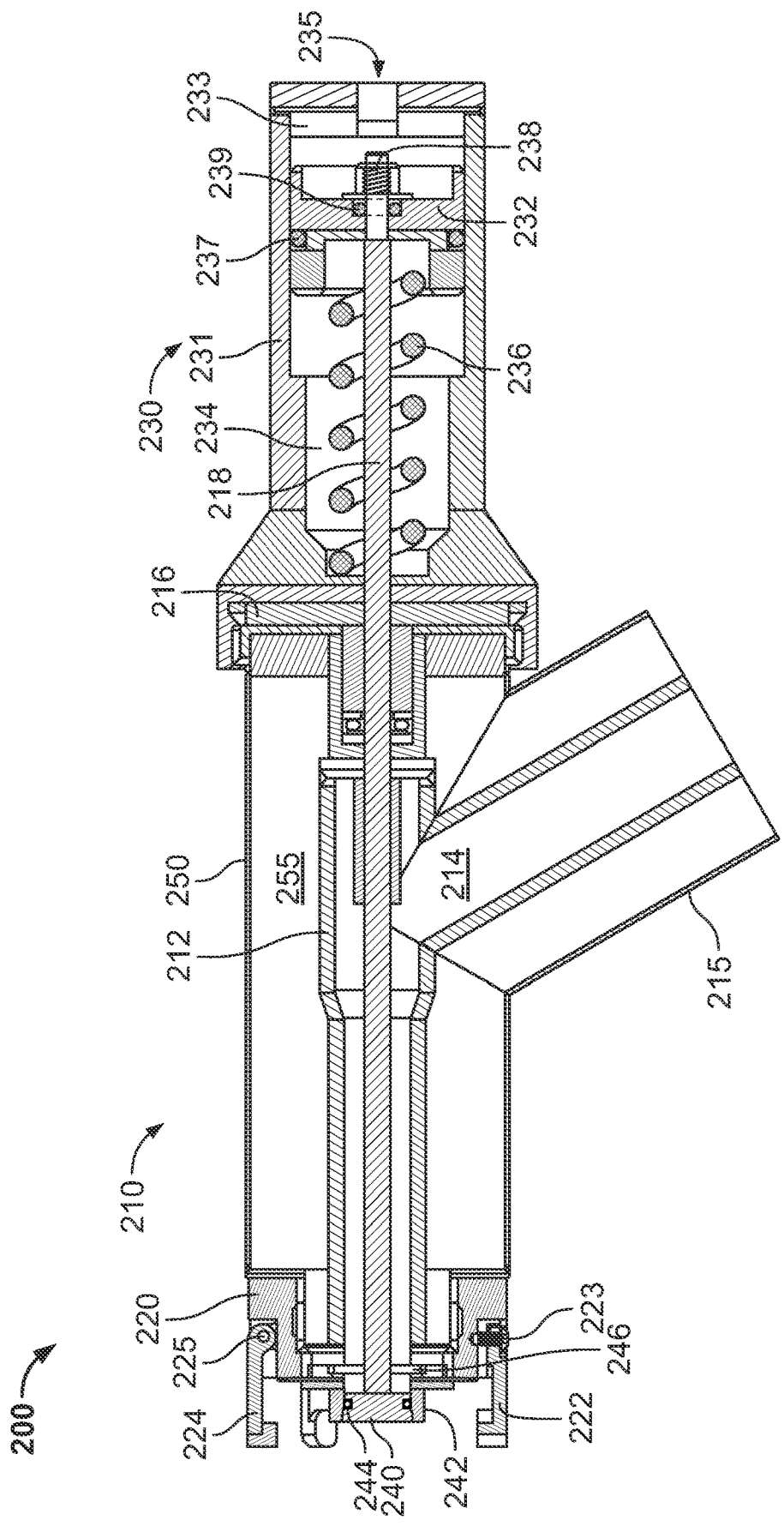
FIG. 17 is a side cross-sectional view of the nozzle of FIG. 2.

Turning to the internal components of the receptacle 100 and the nozzle 200, FIG. 16 is a cross-sectional view that depicts the internal components of the receptacle 100 and FIG. 17 is a cross-sectional view that depicts the internal components of the nozzle 200.

As illustrated in FIG. 16, the receptacle 100 includes the body 110 and the head 120 that is coupled to and extending from the front end of the body 110. A face seal 113 is positioned between and sealingly engages the body 110 and the head 120. The body 110 includes the inner wall 111, the flange 112, and an outer shell 140. The flange 112 extends radially outward from the outer shell 140 and is configured to couple the receptacle 100 to a wall, such as a wall of the fill tank 32. An insulation layer 145 is located in a gap formed between the outer shell 140 and the inner wall 111. The insulation layer 145 includes a vacuum and/or insulating material disposed in a gap formed between the outer shell 140 and the inner wall 111 to insulate the outer shell 140 from the extremely cold temperature of cryogenic fluid flowing through the receptacle 100. For example, to draw a vacuum within the gap, an evacuation port and/or valve is located along the outer shell 140 of the body 110. Additionally, the inner wall 111 of the body 110 and an inner surface of the head 120 form the chamber 130 of the receptacle 100 that houses other components and through which cryogenic fluid is to flow.

The receptacle 100 also includes a poppet 150, a check 160, and a shaft 170. The poppet 150 is positioned adjacent to the front end (also referred to as a "distal end") of the body 110 and the head 120 of the receptacle 100. The check 160 is positioned toward the back end (also referred to as a "proximal end") of the body 110. Both the poppet 150 and the check 160 are fixedly coupled to the shaft 170, which extends axially through the chamber 130 of the receptacle 100. In the illustrated example, the poppet 150 is integrally formed with and extends from an end of the shaft 170.

In the illustrated example, a check seat 162 divides the chamber 130 into a first chamber section 132 located adjacent to the front end of the body 110 and a second chamber section 134 located adjacent to the back end of the body 110. In a closed position, the check 160 engages the check seat 162 that is securely positioned within the chamber 130 between the first chamber section 132 and the second chamber section 134. For example, the check 160 is configured to engage a seat seal 166 of the check seat 162 in the closed position to form a seal between the first chamber section 132 and the second chamber section 134. A check seal 163 is positioned between and sealingly engages the check seat 162 and the inner wall 111 of the body 110. Additionally, a check guide 164 is securely positioned within the second chamber section 134 and adjacent to the back end of the body 110. At least a portion of the shaft 170 extends into and/or through the check guide 164 to guide the shaft 170 in sliding along an axis of the receptacle 100 within the chamber 130. A check spring 165 is positioned between and engages the check guide 164 and the check 160. The check spring 165 is configured to bias the check 160 to remain engaged to the seat seal 166 of the check seat 162 in the closed position.

In the closed position, the poppet 150 engages a poppet seat 151. In the illustrated example, the poppet seat 151 is defined by a portion of the head 120 adjacent to the front end of the body 110. The poppet 150 includes a poppet seal 152 that is configured to sealingly engage the poppet seat 151 in the closed position. The poppet seat 151 also includes a seat seal 153 adjacent to the poppet 150. A poppet guide 154 is coupled to the shaft 170 and/or a back side of the poppet 150 behind the poppet 150 within the first chamber section 132. An outer portion of the poppet guide 154 engages and/or is adjacent to the inner wall 111 of the body 110. Additionally, the outer portion of the poppet guide 154 is configured to slide along the inner wall 111 as the shaft 170 slides along the axis of the receptacle 100. A portion of the shaft 170 extends through the poppet guide 154 and to the poppet 240. A poppet spring 155 is positioned between and engages the check seat 162 and the poppet guide 154. The poppet spring 155 is configured to bias the poppet 150 to remain engaged to the poppet seat 151 in the closed position. As illustrated in FIG. 23, a recess 156 (e.g., a conical recess) is defined centrally on an outer surface of the poppet 150.

Turning to FIG. 17, the nozzle 200 includes the body 210, the head 220, and the actuator 230. The head 220 is coupled to and extends from the front end of the body 210, and the actuator 230 is coupled to and extends from the back end of the body 210.

The body 210 of the illustrated example includes the extension 215. The extension 215 extends outward and back toward the back end of the body 210 and is configured to connect to the hose 24 to fluidly connect the nozzle 200 to the storage tank 22. The body 210 includes the inner wall 212 and the outer shell 250. An insulation layer 255 is located in a gap formed between the outer shell 250 and the inner wall 212. The insulation layer 255 includes a vacuum and/or insulating material disposed in a gap formed between the outer shell 250 and the inner wall 212 to insulate the outer shell 250 from the extremely cold temperature of cryogenic fluid flowing through the nozzle 200. For example, to draw a vacuum within the gap, an evacuation port and/or valve is located along the outer shell 250 of the body 210. Additionally, the inner wall 212 of the body 210 and an inner surface of the head 220 form a chamber 214 of the nozzle 200 that houses other components and through which cryogenic fluid is to flow. The body 210 also includes an insulation layer 216 located at the back end of the body 210 to insulate the actuator 230 from the extremely cold temperature of the cryogenic fluid. In the illustrated example, the insulation layer 216 is in the form of a plug.

The nozzle 200 also includes a shaft 218, the poppet 240, and the poppet seat 242. The poppet 240 and the poppet seat 242 positioned adjacent to the front end of the body 210 of the nozzle 200. The shaft 218 extends axially through the chamber 214 of the nozzle 200 and into a chamber of the actuator 230. The poppet 240 is coupled to one end of the shaft 218, and a piston 232 of the actuator 230 is coupled to an opposing end of the shaft 218.

A shaft seal 217 engages a portion of the shaft 218 and is positioned between the inner wall 212 of the body 210 and the insulation layer 216 to impede cryogenic fluid from migrating toward the actuator 230 of the nozzle 200. Additionally or alternatively, an other shaft seal is positioned between the body 210 and the actuator 230 to impede cryogenic fluid from migrating toward the actuator 230. Further, in some examples, the nozzle 200 includes bellows (e.g., welded bellows) within the chamber 214 adjacent to the back end of the body 210 isolate the cryogenic fluid from the actuator 230.

In the illustrated example, the poppet 240 is integrally formed with the shaft 218. In other examples, the poppet 240 may be separably coupled to the shaft 218 (e.g., via a threaded connection). Further, in other examples, the shaft 218 includes separable first and second shaft portions. In such examples, the first shaft portion couples to the second shaft portion at a point within the actuator and adjacent to the back end of the body 210. The second shaft portion connects to the piston 232 and has a lower heat transfer coefficient relative to the first shaft portion to isolate components of the actuator from the extremely cold temperature of the cryogenic fluid.

The poppet 240 is in a closed position in FIG. 17. In the closed position, the poppet 240 engages the poppet seat 242. In the illustrated example, the poppet seat 242 is defined by a portion of the head 220 adjacent to the front end of the body 210. In other examples, the poppet seat 242 may be a separate component that is coupled to the head 220 and/or the body 210 of the nozzle 200. The poppet 240 includes a poppet seal 244 that is configured to sealingly engage the poppet seat 242 in the closed position. A face seal 246 is positioned between and sealingly engages the body 210 and the head 220. Further, as illustrated in FIG. 23, the poppet 240 includes a protruding tip 248 (e.g., a conical tip) that is located centrally on an outer surface of the poppet 240. Returning to FIG. 17, the coupling arms 222 are coupled to the head 220 via the fasteners 223, and the coupling arm 224 is hingedly coupled to the head 220 via the hinge 225.

The actuator 230 that is coupled to the back end of the body 210 includes a housing 231 that defines a chamber of the actuator 230. The piston 232 is positioned in the chamber and defines the chamber into a pressure chamber 233 and a spring chamber 234. The pressure chamber 233 is configured to contain a vacuum or inert gas (e.g., nitrogen) provided by a solenoid. In some examples, an evacuation port and/or valve is located along a portion of the housing 231 that partially defines the pressure chamber 233 to facilitate adjusting (e.g., increasing or decreasing) the pressure of the inert gas within the pressure chamber 233. The inert gas is configured to travel into and out of the pressure chamber 233 through a passageway 235 defined by the housing 231. An actuator spring 236 is disposed in the spring chamber 234. The actuator spring 236 engages the piston 232 and is configured to bias the piston 232 in a direction away from the body 210 of the nozzle 200. In the illustrated example, a piston seal 237 is disposed between and sealingly engages the piston 232 and the housing 231 to fluidly isolate the spring chamber 234 from the pressure chamber 233. Additionally, a fastener 238 (e.g., including a nut, a washer, and a seal plate) fastens the shaft 218 to the piston 232 such that the shaft 218 actuates linearly along an axis of the nozzle 200 as the piston 232 actuates within the housing 231 of the actuator 230.

In operation, the actuator 230 causes the shaft 218 to open or close the poppet 240 of the nozzle 200 by causing the poppet 240 to disengage from or engage the poppet seat 242, respectively. In turn, the actuator 230 controls the dispensing of cryogenic fluid from the nozzle 200.

Figure 18:
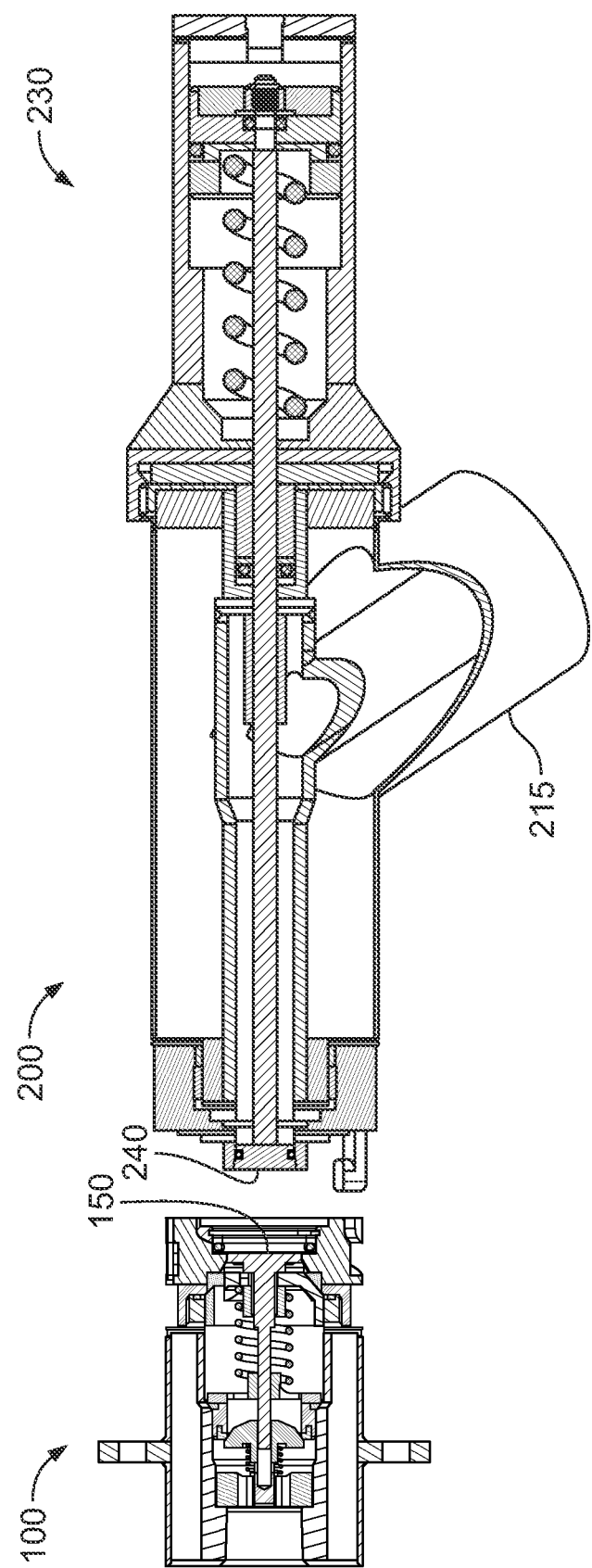
FIG. 18 is a side cross-sectional view of the receptacle and the nozzle of FIG. 2.
Figure 19:
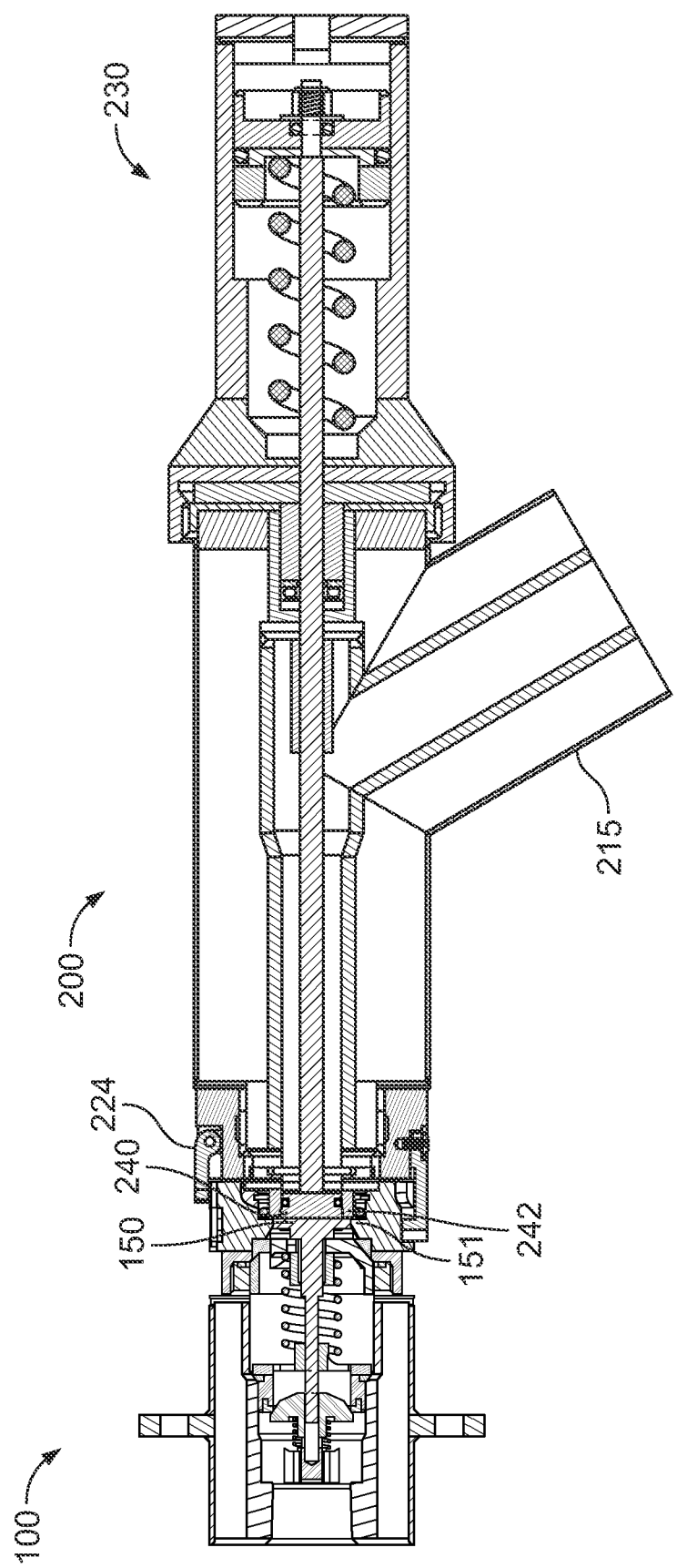
FIG. 19 is a side cross-sectional view of the receptacle and the nozzle of FIG. 2 in the coupled state.
Figure 20:
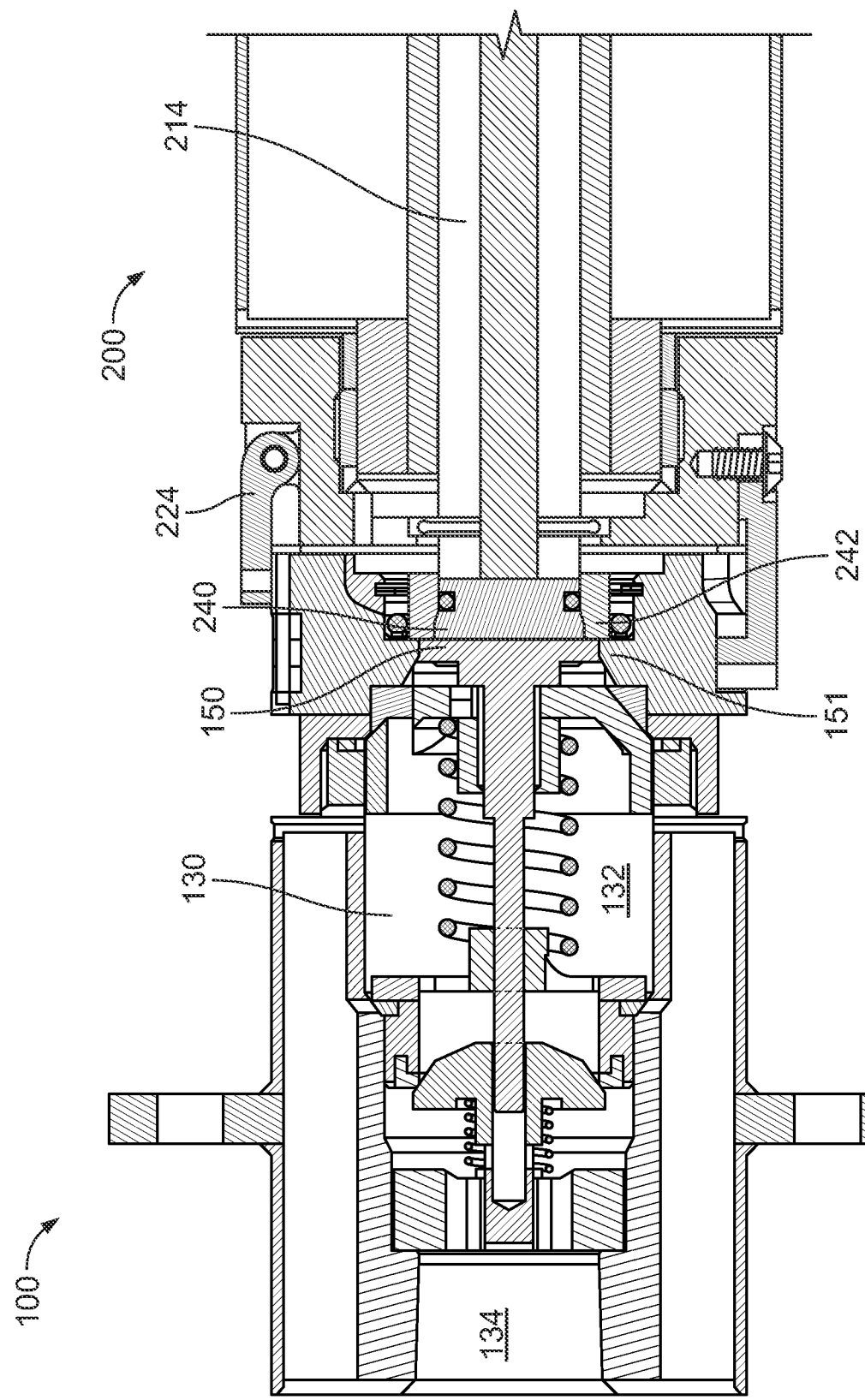
FIG. 20 is a magnified side cross-sectional view of the receptacle and the nozzle of FIG. 2 in the coupled state when a plug of the nozzle is in a closed position.

FIGS. 18-22 depict the nozzle 200 and the receptacle during a fill sequence. In FIG. 18, the nozzle 200 is not coupled to the receptacle 100. The poppet 240 of the nozzle 200 is in the closed position to prevent cryogenic fluid from being dispensed from the chamber 214 of the nozzle 200. Additionally, the poppet 150 of the receptacle 100 is in the closed position to prevent material (e.g., cryogenic fluid stored in the fill tank 32) from escaping through the receptacle 100. In FIGS. 19-20, the nozzle 200 is coupled to the receptacle 100 in the closed position. The poppet 240 remains in the closed position to prevent cryogenic fluid from being dispensed from the nozzle 200, and the poppet 150 of the receptacle 100 remains in the closed position to prevent material from escaping through the receptacle 100.

In this position, the poppet 240 of the nozzle 200 engages the poppet 150 of the receptacle 100. The recess 156 of the poppet 150 is configured to receive the protruding tip 248 of the poppet 240 to assist the poppet 240 in maintaining alignment with the recess 156 during operation of the nozzle 200 throughout the fill sequence.

The receptacle 100 and the nozzle 200 are configured to (1) to deter atmospheric air and/or debris from becoming trapped before the poppet 240 is opened to extend into the receptacle 100 and (2) to deter cryogenic fluid from escaping from the nozzle 200 and/or the receptacle 100 into the atmosphere during the coupling and/or decoupling process. For example, the internal geometries of the head 120 of the receptacle 100 and the head 220 of the nozzle 200 are complementary of each other to reduce the amount of cryogenic fluid that may become trapped and subsequently emitted during the coupling and/or decoupling process. The poppet 240 is configured to be flush with the poppet 150 when the nozzle 200 couples to the receptacle 100 to further deter any material from becoming trapped and subsequently emitted. The seat seal 153 of the receptacle 100 also is positioned to reduce emissions of cryogenic fluid during the coupling and decoupling process. Additionally, the coupling features, such as the coupling slots 122, 124 of the receptacle 100 and the respective coupling arms 222, 224 of the nozzle 200, are configured to keep the nozzle 200 securely coupled to the receptacle 100, thereby reducing emissions that may otherwise result from an unintended decoupling.

Figure 21:
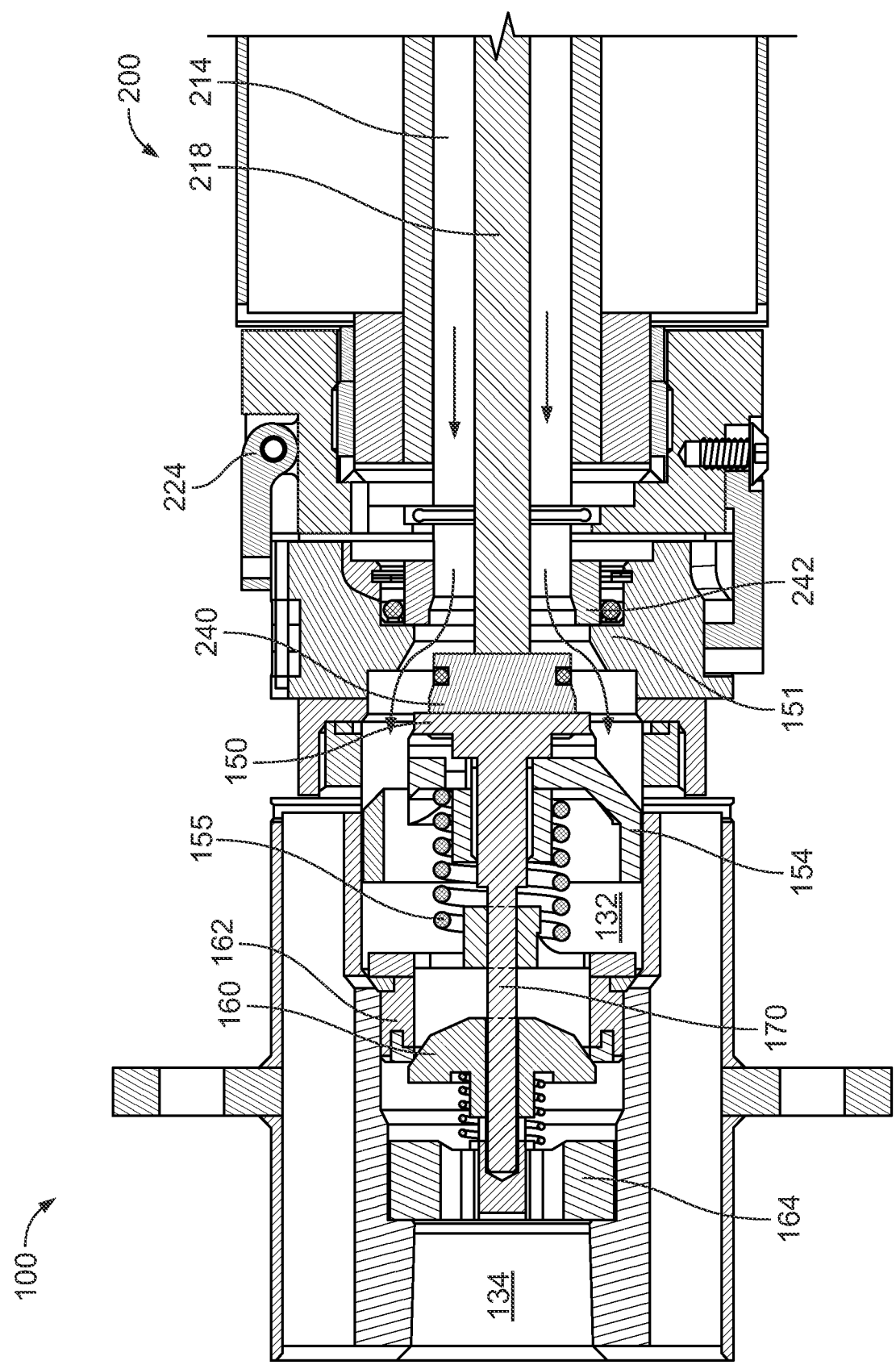
FIG. 21 is a magnified side cross-sectional view of the receptacle and the nozzle of FIG. 2 in the coupled state when the plug of the nozzle is in an open position.

FIG. 21 depicts the receptacle 100 and a portion of the nozzle 200 after the operator 40 has initiated (e.g., remotely) the fill sequence by pressing the button 28 at the filling station 20. When the operator engages the button, inert gas (e.g., nitrogen) is supplied to the pressure chamber 233 of the actuator 230. Once enough air is supplied to the pressure chamber 233, the pressure within the pressure chamber 233 overcomes the biasing forces of the actuator spring 236 of the actuator 230 and the poppet spring 155 of the poppet 150 and causes the piston 232 to actuate linearly toward the body 210 of the nozzle 200. In turn, the shaft 218 that is coupled to the piston 232 linearly actuates in the same direction. The actuation of the shaft 218 causes the poppet 240 of the nozzle 200 to disengage from the poppet seat 242 and move to an open position, which causes the poppet 150 to disengage from the poppet seat 151 and move to an open position. As indicated by the arrows in FIG. 21, such actuation enables the nozzle 200 to dispense cryogenic fluid that flows through the chamber 214 of the nozzle 200 into the first chamber section 132 of the receptacle 100. The check 160 remains closed due to a pressure difference.

Once the pressure is equalized between the chamber 214 of the nozzle 200 and the first chamber section 132 of the receptacle 100, the actuator 230 is able to overcome the biasing force applied by the check spring 165 of the check 160 and push the check 160 to disengage from the seat seal 166 of the check seat 162 and into an open position. As illustrated in FIG. 22, when the check 160 is in the open position, cryogenic fluid is capable of flowing from the storage tank 22, through the chamber 214 of the nozzle 200, through both the first chamber section 132 and the second chamber section 134 of the chamber 130 of the receptacle 100, and into the fill tank 32.

FIGS. 23-24 depicts a sensor assembly of the receptacle 100 and the nozzle 200 in accordance with the teachings herein. More specifically, FIG. 23 illustrates the sensor assembly when the nozzle 200 is decoupled from the receptacle 100, and FIG. 24 illustrates the sensor assembly when the nozzle is securely coupled to the receptacle 100 via the coupling arms 222, 224 and the corresponding coupling slots 122, 124. The sensor assembly is configured to detect a coupling state of the nozzle 200 and the receptacle 100.

The sensor assembly of the illustrated example includes the sensing device 180 of the receptacle 100 and the sensing device 280 of the nozzle 200. As shown in FIGS. 23-24, the sensing device 180 is coupled to the outer shell 140 adjacent to the head 120 of the receptacle 100. The sensing device 280 is coupled to a sleeve 270 of the nozzle 200 adjacent one or more of the coupling arms 222, 224 of the nozzle 200.

The sleeve 270 is coupled to the outer shell 250 of the nozzle 200 via a connector ring 272. The sleeve 270 extends over and covers the coupling arms 222, 224, the poppet 240, and the poppet seat 242 to protect those components from being damage during use and/or storage of the nozzle 200. Additionally, the sleeve 270 of the nozzle 200 is configured to extend over and cover the head 120 of the receptacle 100 when the receptacle 100 is coupled to the nozzle 200. The sleeve 270 forms a thermal barrier from head 120 and the head 220 as cryogenic fluid flows from the nozzle 200 and into the receptacle 100. Additionally, the positioning of sleeve 270 creates a confined space between the sleeve 270 and the heads 120, 220 through which atmospheric air is purged to deter liquified air from becoming trapped between the nozzle 200 and the receptacle 100. In the illustrated example, tubing 273 feeds purge gas (e.g., nitrogen) into this area to facilitate the removal of the atmospheric air. Additionally, the decoupling mechanism of the nozzle 200 (e.g., a lever, a wire, etc.) for decoupling the nozzle 200 from the receptacle 100 extends (1) from an exterior of the sleeve 270 to enable the operator 40 to engage the decoupling mechanism and (2) around the sleeve 270 and/or through an opening in the sleeve 270 to reach the distal end of the coupling arm 224 to enable the decoupling.

Returning to the sensing devices 180, 280, the sensing device 280 is fixedly positioned on the sleeve 270 of the nozzle 200 and the sensing device 180 is fixedly positioned on the outer shell 140 of the receptacle 100. The sensing devices 180, 280 are positioned on the receptacle 100 and the nozzle 200, respectively such that the sensing devices 180, 280 (1) are within a predetermined distance of each other and (2) aligned axially with respect to each other when the nozzle 200 is securely coupled to the receptacle 100. When the nozzle 200 is securely coupled to the receptacle 100, the sensing device 280 is configured to detect that the sensing device 180 is proximate to the sensing device 180. When the nozzle 200 is decoupled to the receptacle 100, the sensing device 280 is unable to detect the presence of the sensing device 180 due to the sensing devices 180, 280 being (1) positioned beyond a predetermined distance of each other and/or (2) being misaligned axially with respect to each other. Further, when the nozzle 200 is coupled to the receptacle 100 but not in the secured position, the sensing device 280 is unable to detect the presence of the sensing device 180 due to the sensing devices 180, 280 being misaligned axially with respect to each other. In turn, the sensing devices 180, 280 are configured to electronically detect when the nozzle 200 is securely coupled to the receptacle 100.

In some examples, the sensing device 280 is a proximity sensor and the sensing device 180 is a target block composed of material (e.g., metal) detectable by the proximity sensor. The proximity sensor is configured to (1) detect the presence of the detectable material of the sensing device 180 when the nozzle 200 is securely coupled to the receptacle 100 and (2) not detect the presence of the detectable material when the nozzle 200 is not coupled to the receptacle 100 (e.g., due to misalignment or distance). In other examples, the sensing device 280 is a signal receiver and the sensing device 180 is a signal transmitter. The sensing device 280 is configured to (1) receive a signal from the sensing device 180 when the nozzle 200 is securely coupled to the receptacle and (2) not receive a signal from the sensing device 180 when the nozzle 200 is not coupled to the receptacle 100 (e.g., due to misalignment or distance).

Figure 25:
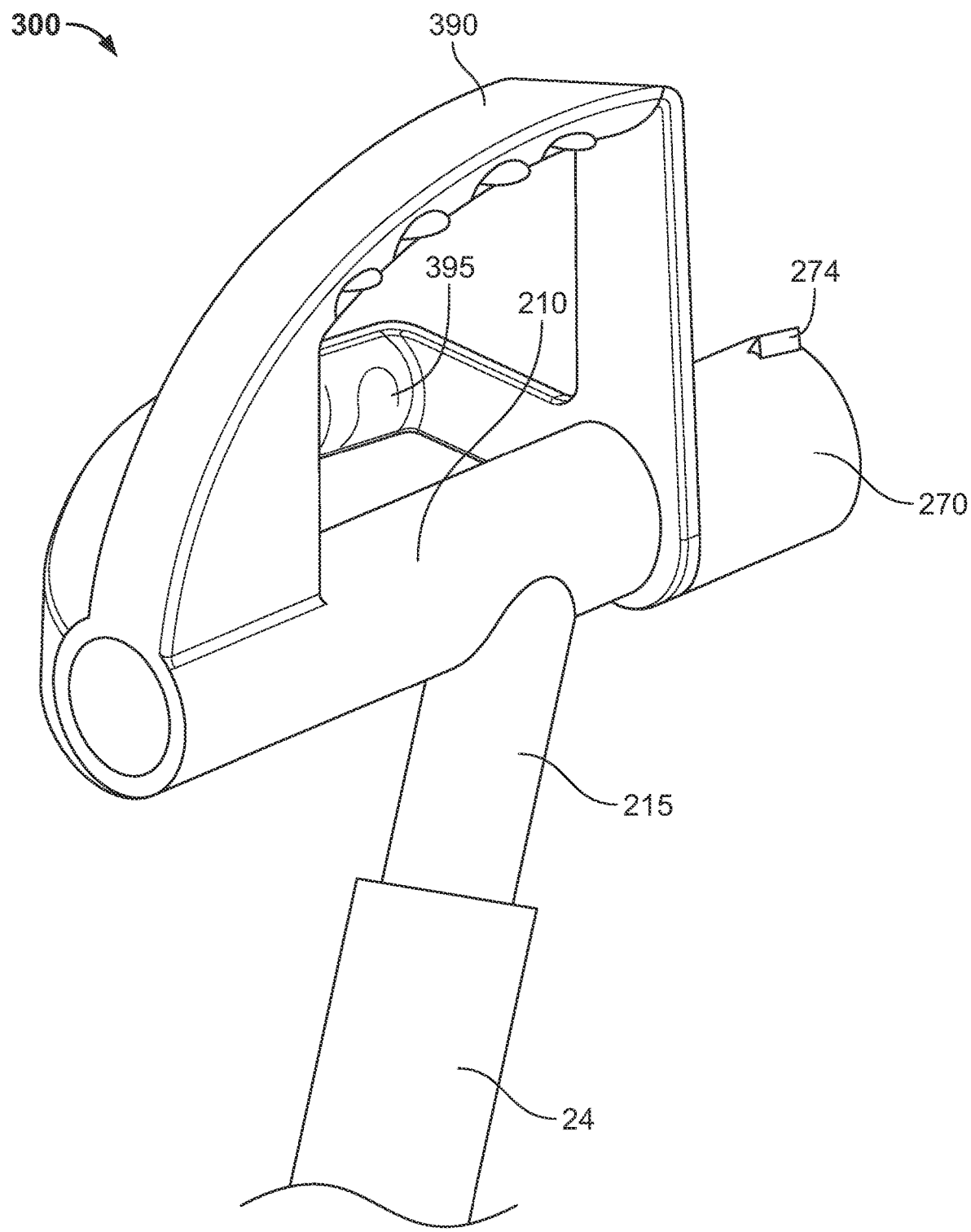
FIG. 25 is a perspective view of an example nozzle for transferring cryogenic fluid in accordance with the teachings herein.
Figure 26:
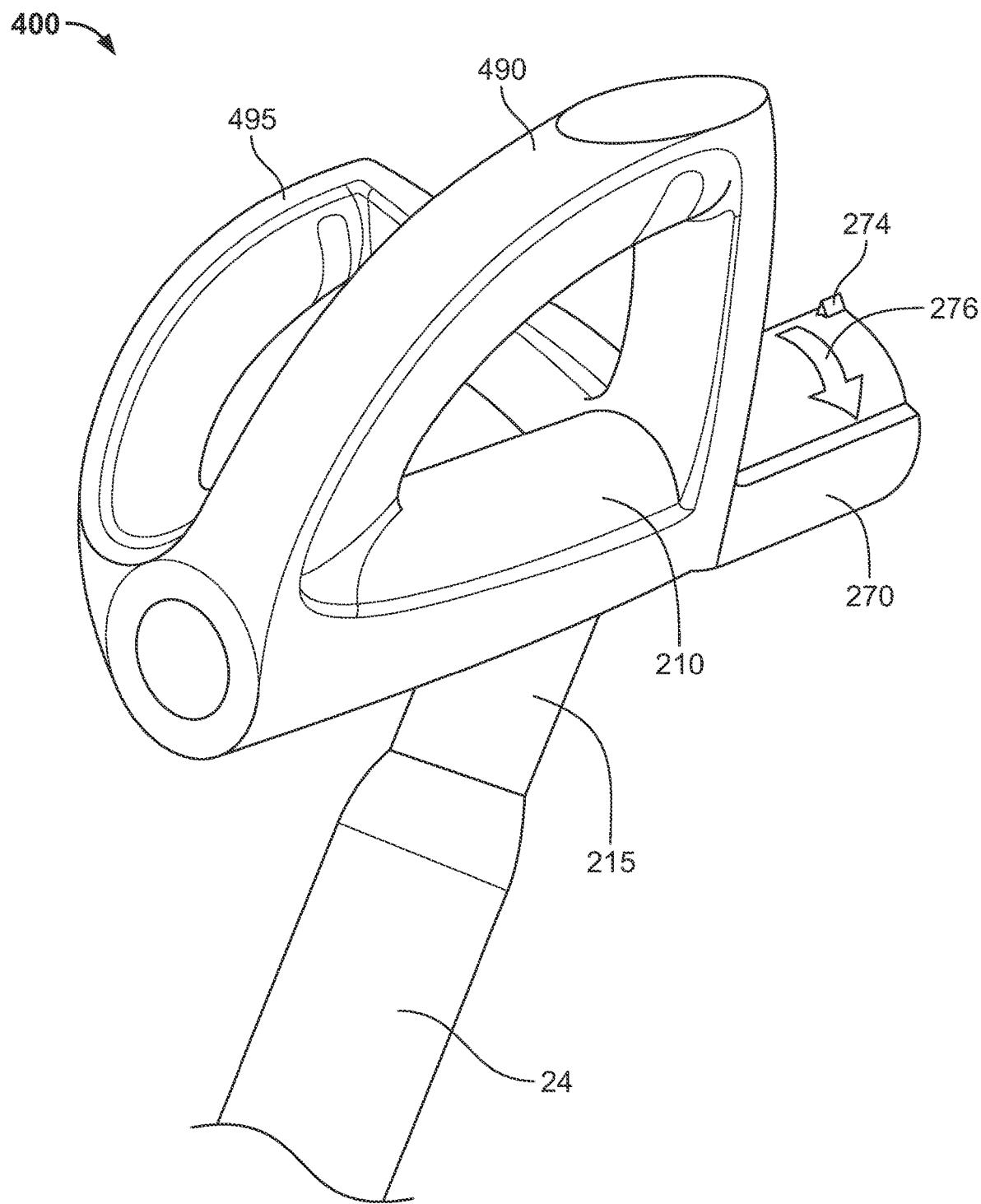
FIG. 26 is a perspective view of an example nozzle for transferring cryogenic fluid in accordance with the teachings herein.
Figure 27:
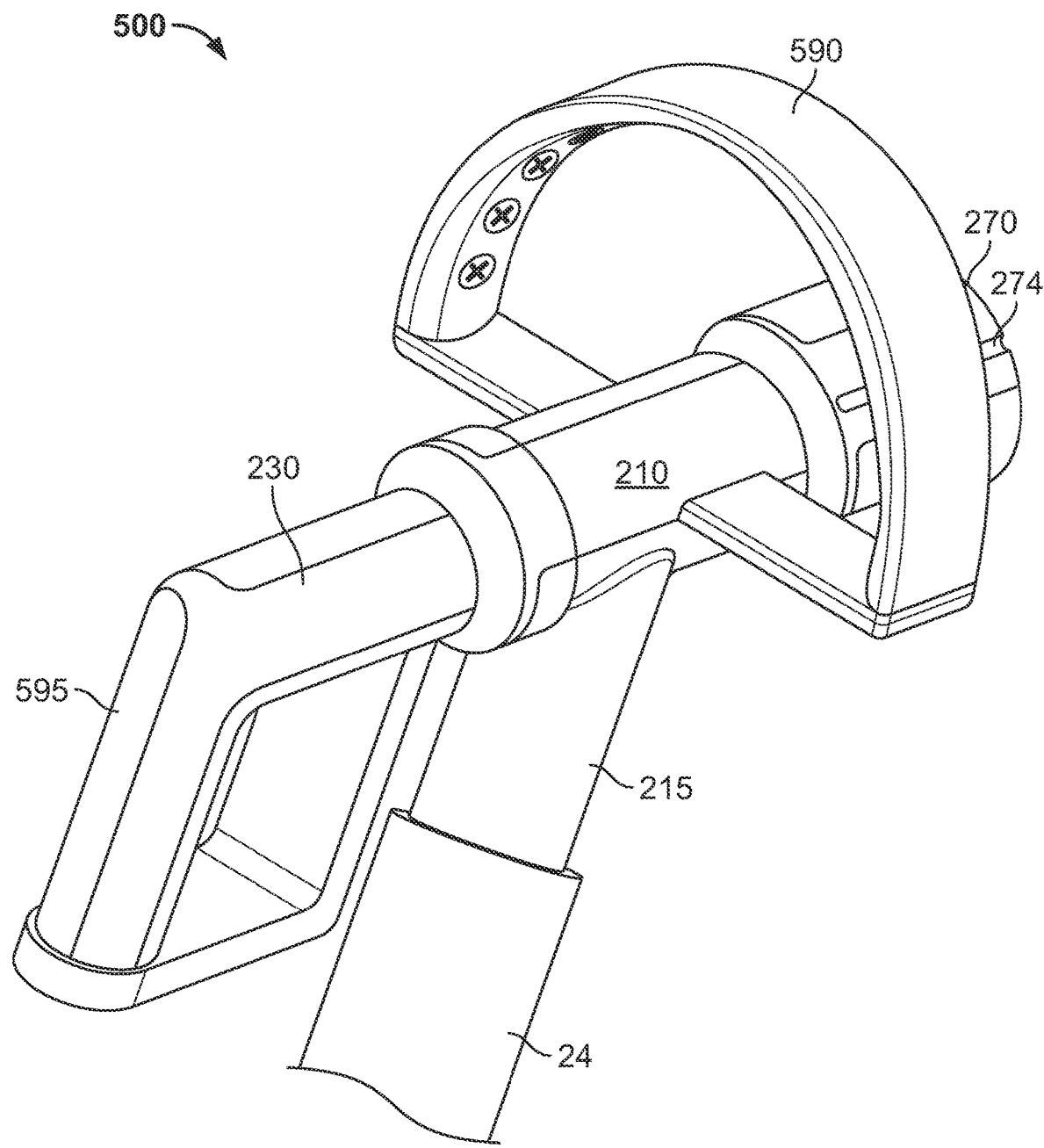
FIG. 27 is a perspective view of an example nozzle for transferring cryogenic fluid in accordance with the teachings herein.
Figure 28:
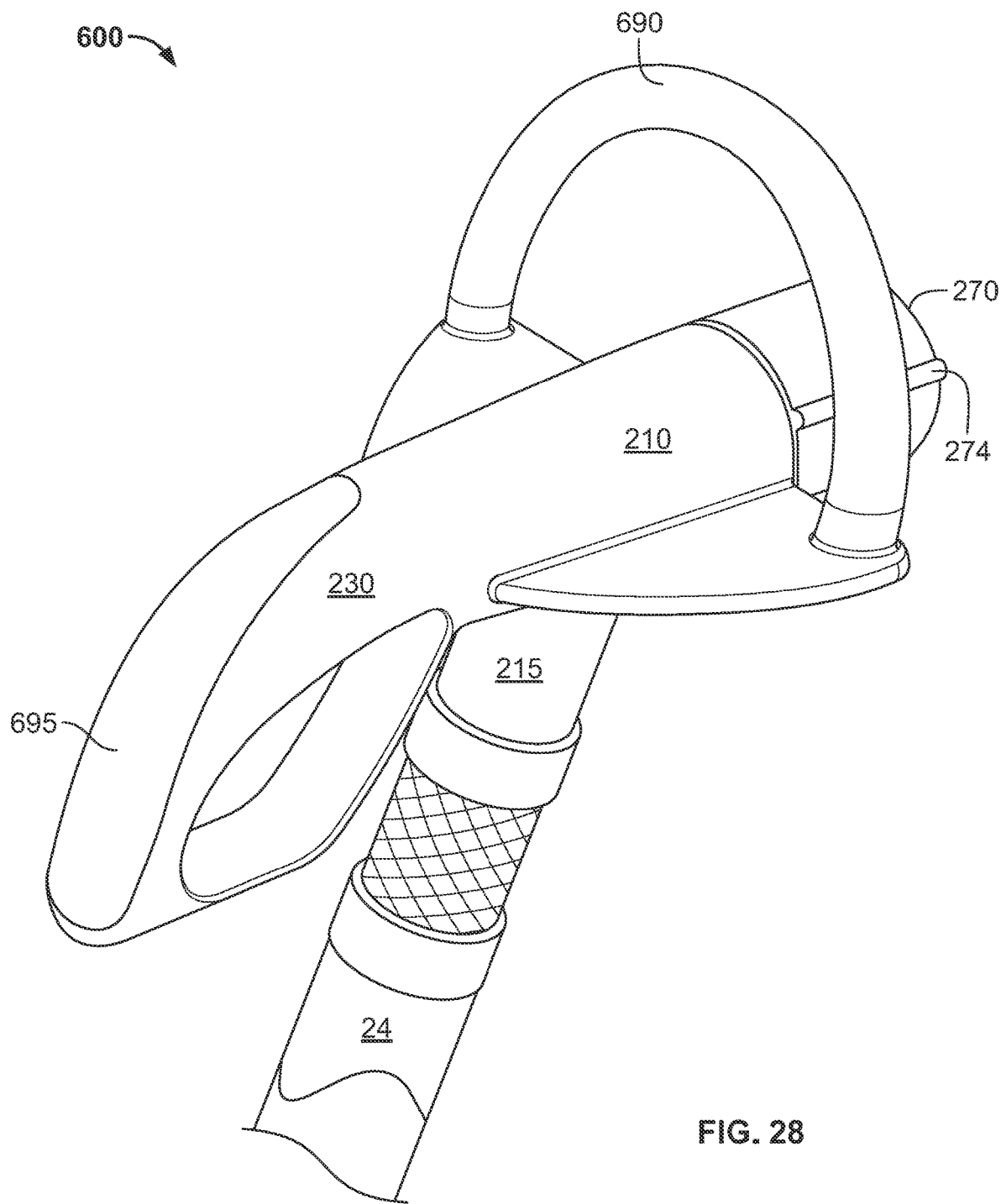
FIG. 28 is a perspective view of an example nozzle for transferring cryogenic fluid in accordance with the teachings herein.
Figure 29:
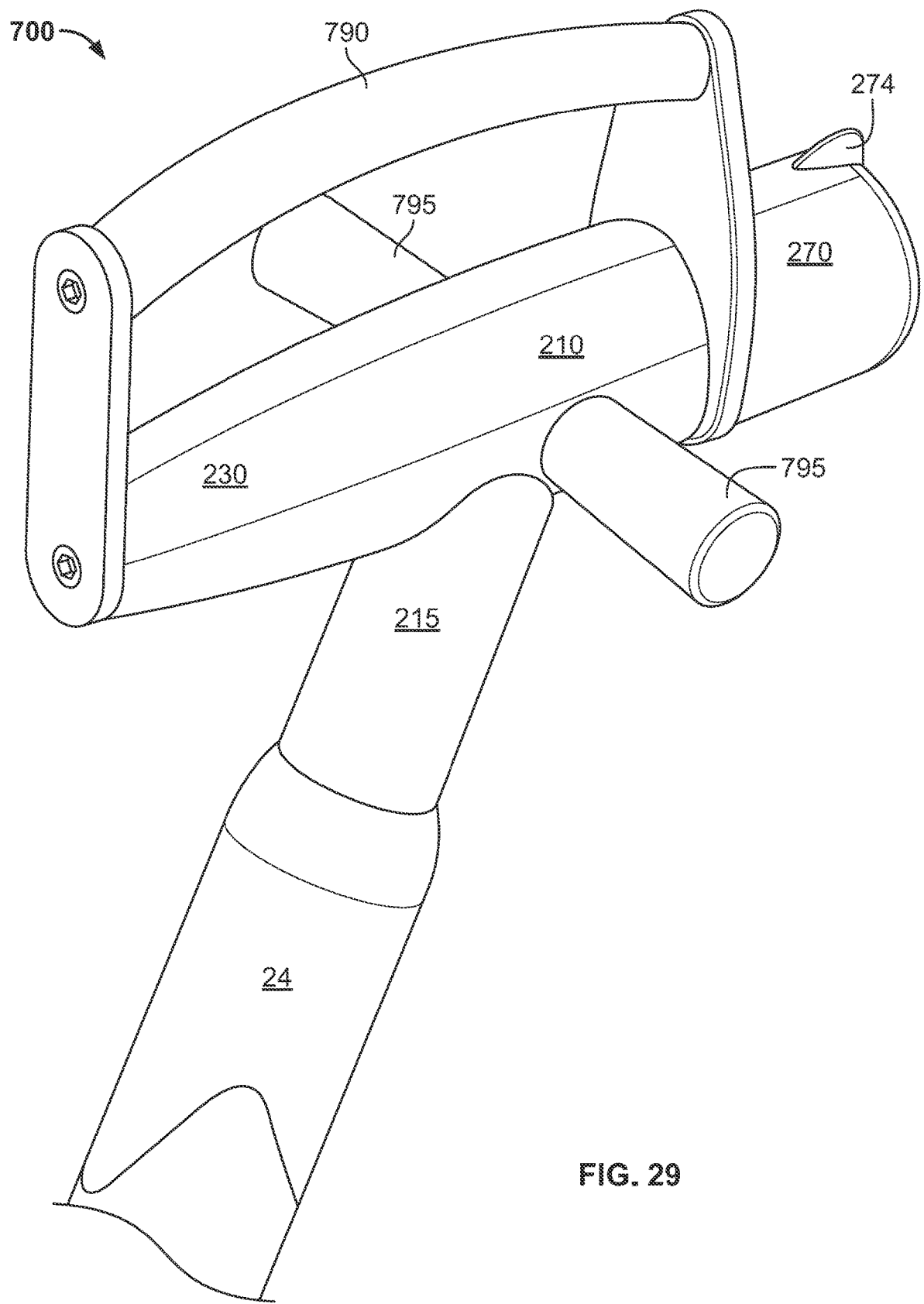
FIG. 29 is a perspective view of an example nozzle for transferring cryogenic fluid in accordance with the teachings herein.
Figure 30:
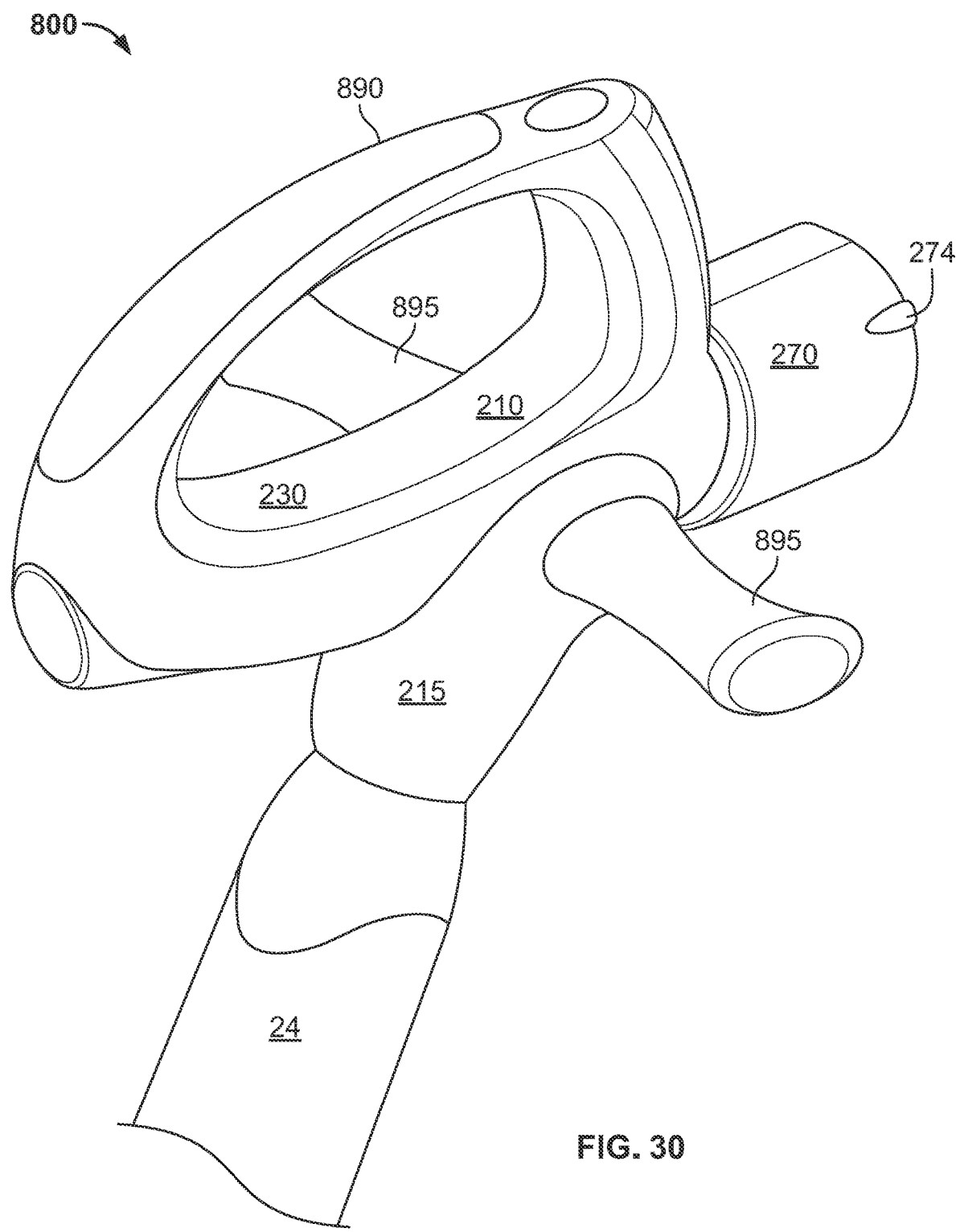
FIG. 30 is a perspective view of an example nozzle for transferring cryogenic fluid in accordance with the teachings herein.

FIGS. 25-30 depict other example nozzles for transferring cryogenic fluid in accordance with the teachings herein. More specifically, FIG. 25 illustrates an example nozzle 300, FIG. 26 illustrates an example nozzle 400, FIG. 27 illustrates an example nozzle 500, FIG. 28 illustrates an example nozzle 600, FIG. 29 illustrates an example nozzle 700, and FIG. 30 illustrates an example nozzle 800.

The nozzle 300 of FIG. 25 includes the components of the nozzle 200 depicted in FIGS. 2-3, 5-15, and 17-24. Because those components have been described in detail in connection with the nozzle 200, some of those features of the nozzle 300 are not described in further detail below for concision. As shown in FIG. 25, the nozzle 300 includes additional components to facilitate the operator 40 in securely coupling the nozzle 300 to the receptacle 100.

For example, the nozzle 300 includes a handle 390 that extends vertically upward from the body 210 and another handle 395 that extends horizontally outward from the body 210 such that an angle of about 90 degrees is formed between the handle 390 and the handle 390. The handle 390 is configured to enable the operator 40 to easily hold the nozzle 300 to the receptacle 100, and the handle 395 is configured to facilitate the operator 40 in rotating the nozzle 300 relative to the receptacle 100 to securely couple the nozzle 300 to the receptacle 100 via the coupling arms 222, 224 and the respective coupling slots 122, 124.

The nozzle 300 of the illustrated example also includes a visual guide 274 of the sleeve 270. The visual guide 274 of the nozzle 300 is configured to facilitate the operator 40 in aligning the coupling arms 222, 224 of the nozzle 300 with the coupling slots 122, 124 of the receptacle 100 toward the beginning of the coupling process. For example, the receptacle 100 also includes visual guide that corresponds with the visual guide 274 of the nozzle 300. The visual guide 274 of the nozzle 300 aligns with the visual guide of the receptacle 100 when the coupling arms 222, 224 are aligned with the coupling slots 122, 124 to indicate to the operator 40 that the coupling arms 222, 224 are in position to slide into the coupling slots 122, 124.

Further, in the illustrated example, the extension 215 extends downwardly from the body 210. The extension 215 is angled (1) backward at an angle toward the actuator 230 and (2) sideways at an angle (e.g., about 22.5 degrees) in a direction opposite to that of the handle 295 to guide the hose 24 away from the operator 40 while the operator 40 holds the nozzle 300.

The nozzle 400 of FIG. 26 includes the components of the nozzle 200 depicted in FIGS. 2-3, 5-15, and 17-24. Because those components have been described in detail in connection with the nozzle 200, some of those features of the nozzle 400 are not described below for concision. As shown in FIG. 26, the nozzle 400 includes additional components to facilitate the operator 40 in securely coupling the nozzle 400 to the receptacle 100.

For example, the nozzle 400 includes handles 490, 495 and visual guides 274, 276. The handle 490 extends vertically upward from the body 210 and is configured to enable the operator 40 to easily hold the nozzle 400 to the receptacle 100. The handle 495 extends horizontally outward from the body 210 and is configured to facilitate the operator 40 in rotating the nozzle 400 relative to the receptacle 100 to securely couple the nozzle 400 to the receptacle 100. The visual guide 274 facilitates the operator 40 in aligning the nozzle 400 with the receptacle 100, and the visual guide 276 instructs the operator on which direction to turn the nozzle 400 to securely couple the nozzle 400 to the receptacle 100.

The nozzle 500 of FIG. 27 includes the components of the nozzle 200 depicted in FIGS. 2-3, 5-15, and 17-24. Because those components have been described in detail in connection with the nozzle 200, some of those features of the nozzle 500 are not described below for concision. As shown in FIG. 27, the nozzle 500 includes additional components to facilitate the operator 40 in securely coupling the nozzle 500 to the receptacle 100.

For example, the nozzle 500 includes handles 590, 595 and the visual guide 274. The handle 590 is a semicircle that extends circumferentially about the body 210 and is configured to enable the operator 40 to easily hold the nozzle 500 to the receptacle 100. The handle 595 extend from and is positioned behind the actuator 230 and is configured to facilitate the operator 40 in rotating the nozzle 500 relative to the receptacle 100 to securely couple the nozzle 500 to the receptacle 100. The visual guide 274 facilitates the operator 40 in aligning the nozzle 500 with the receptacle 100 during the coupling process.

The nozzle 600 of FIG. 28 includes the components of the nozzle 200 depicted in FIGS. 2-3, 5-15, and 17-24. Because those components have been described in detail in connection with the nozzle 200, some of those features of the nozzle 600 are not described below for concision. As shown in FIG. 28, the nozzle 600 includes additional components to facilitate the operator 40 in securely coupling the nozzle 500 to the receptacle 100.

For example, the nozzle 600 includes handles 690, 695 and the visual guide 274. The handle 690 is a semicircle that extends circumferentially about the body 210 and is configured to enable the operator 40 to easily hold the nozzle 600 to the receptacle 100. The handle 695 extend from and is positioned behind the actuator 230 and is configured to facilitate the operator 40 in rotating the nozzle 600 relative to the receptacle 100 to securely couple the nozzle 600 to the receptacle 100. The visual guide 274 facilitates the operator 40 in aligning the nozzle 600 with the receptacle 100 during the coupling process.

The nozzle 700 of FIG. 29 includes the components of the nozzle 200 depicted in FIGS. 2-3, 5-15, and 17-24. Because those components have been described in detail in connection with the nozzle 200, some of those features of the nozzle 700 are not described below for concision. As shown in FIG. 29, the nozzle 700 includes additional components to facilitate the operator 40 in securely coupling the nozzle 500 to the receptacle 100.

For example, the nozzle 700 includes handles 790, 795 and the visual guide 274. The handle 790 extends substantially parallel to the body 210 and the actuator 230 and is configured to enable the operator 40 to easily hold the nozzle 600 to the receptacle 100. The handles 795 extend horizontally outward from the body 210 in opposing directions such that (1) an angle of 180 degrees is formed between the handles 795 and (2) an angle of about 90 degrees is formed between the handle 790 and each of the handles 795. The handles 795 are configured to facilitate the operator 40 in rotating the nozzle 700 relative to the receptacle 100 to securely couple the nozzle 700 to the receptacle 100. The visual guide 274 facilitates the operator 40 in aligning the nozzle 700 with the receptacle 100 during the coupling process.

For example, the nozzle 800 includes handles 890, 895 and the visual guide 274. The handle 890 extends along a length of the body 210 and the actuator 230 and is configured to enable the operator 40 to easily hold the nozzle 800 to the receptacle 100. The handles 895 extend horizontally outward from the body 210 in opposing directions such that (1) an angle of 180 degrees is formed between the handles 895 and (2) an angle of about 90 degrees is formed between the handle 890 and each of the handles 895. The handles 895 are configured to facilitate the operator 40 in rotating the nozzle 800 relative to the receptacle 100 to securely couple the nozzle 800 to the receptacle 100. The visual guide 274 facilitates the operator 40 in aligning the nozzle 800 with the receptacle 100 during the coupling process.

FIGS. 31-48 depict another example receptacle 900 and another example nozzle 1000 in accordance with the teachings herein. More specifically, FIGS. 31-34 illustrate mechanisms for securely coupling the nozzle 1000 to the receptacle 900, FIGS. 35-41 illustrate internal components of the nozzle 1000 and the receptacle 900 for controlling the flow of cryogenic fluid between the storage tank 22 and the fill tank 32, and FIGS. 42-48 depict a sequence of operation for the nozzle 1000 and the receptacle 900.

Figure 31:
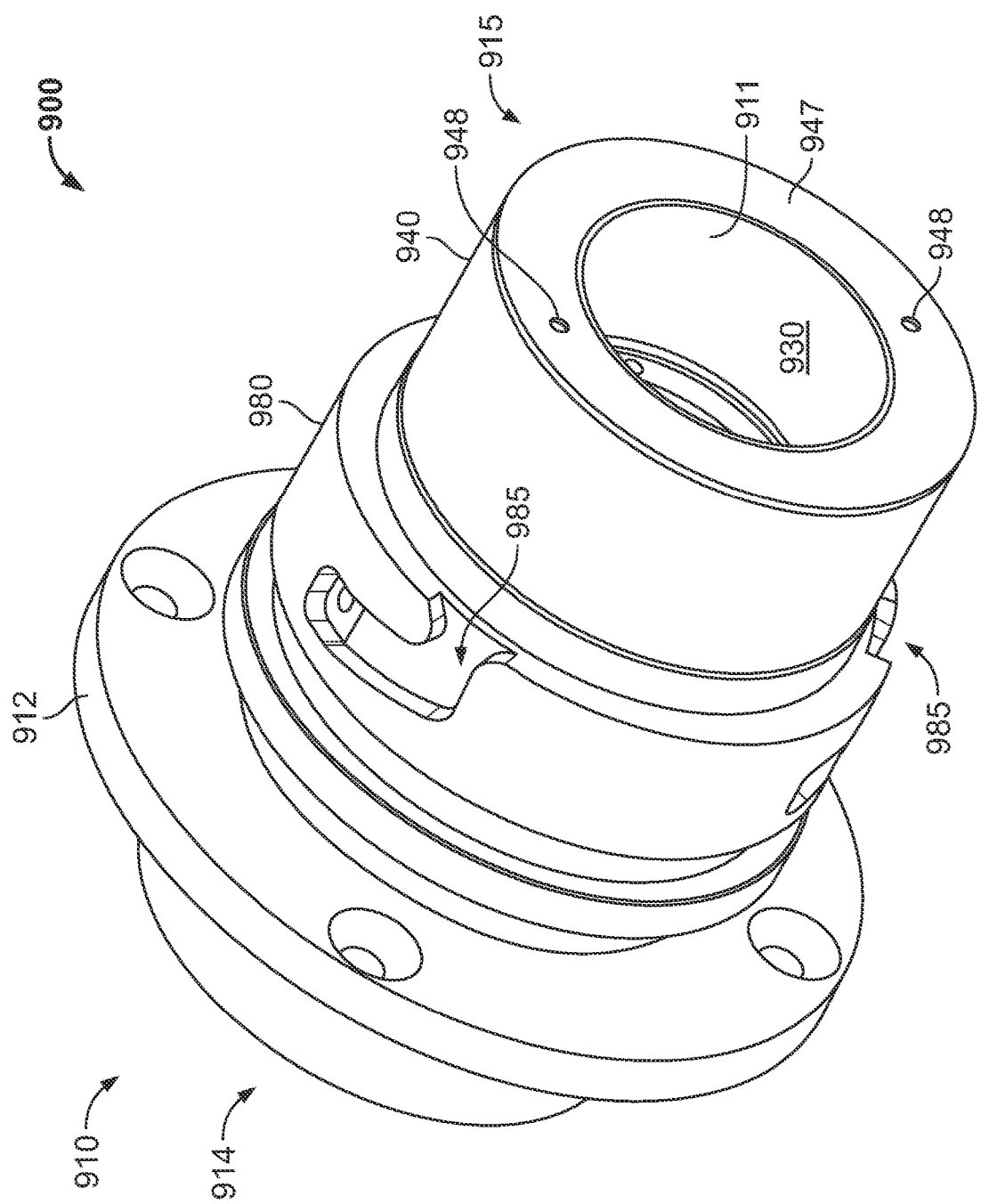
FIG. 31 is a perspective view of an example receptacle for transferring cryogenic fluid in accordance with the teachings herein.

As shown in FIG. 31, the receptacle 900 includes a body 910 that includes an inner wall 911, a flange 912, an outer shell 940, an end cap 947, and a sleeve 980. The inner wall 911 and the outer shell 940 extend between a proximal end 914 (also referred to as a "back end") and a distal end 915 (also referred to as a "front end") of the body 910. The flange 912 is coupled to (e.g., via welding) and extends radially outward from the outer shell 940. The flange 912 is configured to couple the receptacle 900 to a wall, such as a wall of the fill tank 32. The sleeve 980 extends over a portion of and is coupled to the outer shell 940 (e.g., via welding). The sleeve 980 is positioned with respect to the flange 912 along the outer shell 940 such that the sleeve 980 is closer to the distal end 915 and the flange is closer to the proximal end 914. As disclosed below in greater detail, the sleeve 980 is positioned toward the distal end 915 to facilitate one or more locking teeth 1015 of the nozzle 1000 in being securely received by one or coupling slots 985 of the receptacle 900. The end cap 947 located at the distal end 915 of the receptacle 900. In the illustrated example, the end cap 947 defines one or more guide slots 948, which are configured to receive respective one or more guide pins 1049 to facilitate rotational alignment between the receptacle 900 and the nozzle 1000. In some examples, the end cap 947 may be integrally formed with the outer shell 940.

Figure 32:
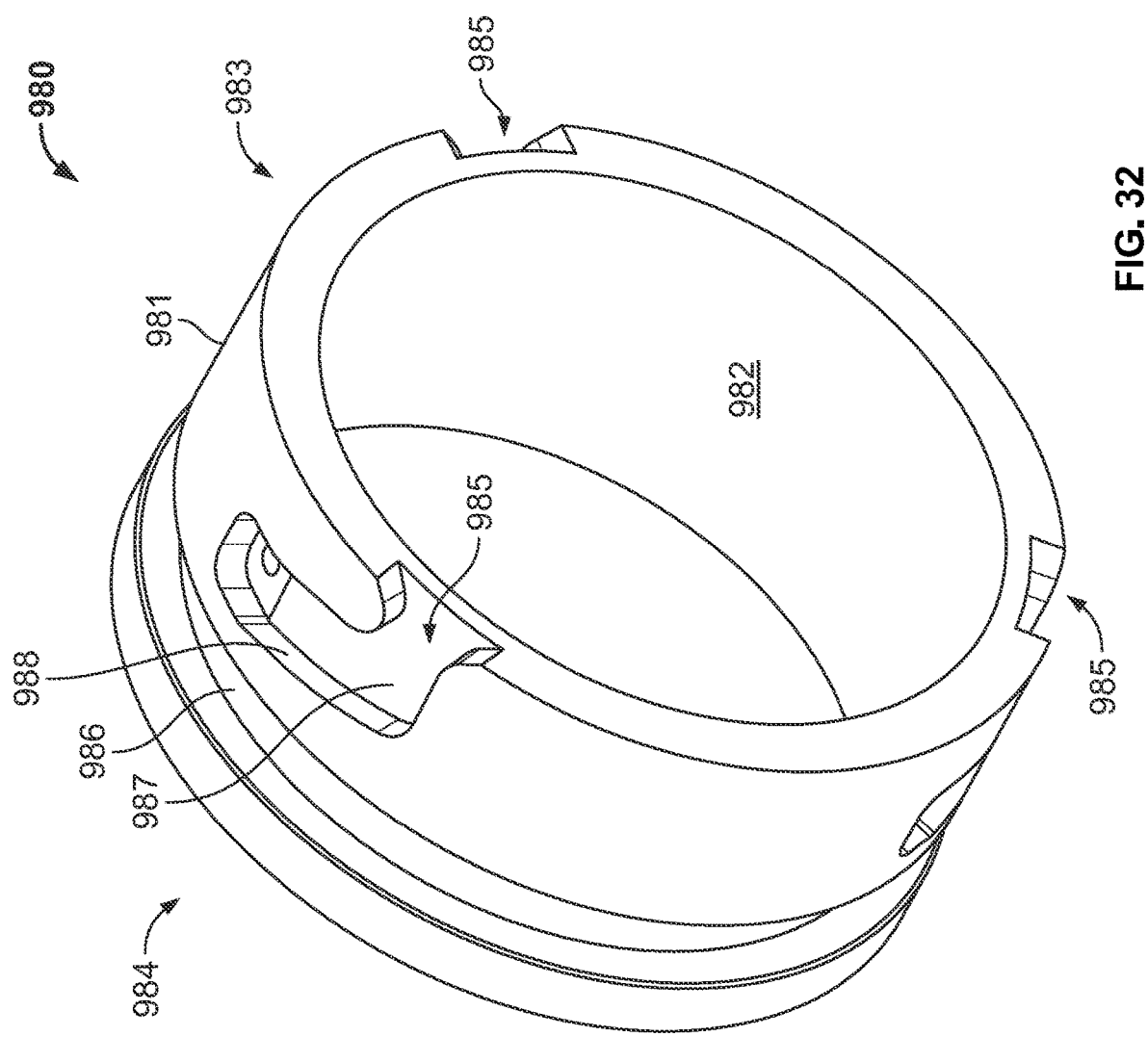
FIG. 32 is a perspective view of a sleeve of the receptacle of FIG. 31.

FIG. 32 further depicts the sleeve 980 of the receptacle 900. The sleeve 980 includes an outer surface 981 and an inner surface 982 that extend between a front end 983 and a back end 984 of the sleeve 980. The inner surface 982 engages the outer shell 940 of the body 910 of the receptacle 900. A groove 986 extends circumferentially along the outer the outer surface adjacent to the back end 984 of the sleeve 980. The coupling slots 985 are located along the outer surface 981 adjacent to the front end 983. Each of the coupling slots 985 is defined by a respective recessed surface 987 and one or more side surfaces 988. The recessed surface 987 is recessed relative to the outer surface 981 of the sleeve 980. The side surfaces 988 extend between the respective recessed surface 987 and the outer surface 981. Each of the coupling slots 985 has an open, proximal end along a front edge located toward the front end 983 of the sleeve 980. The open end of each of the coupling slots 985 enables a respective one of the locking teeth 1015 of the nozzle 1000 to slide into the coupling slots 985 for securely coupling the nozzle 1000 to the receptacle 900.

Each of the coupling slots 985 are generally L-shaped and bend or curl in a particular direction to enable the locking teeth 1015 to securely couple the nozzle 1000 to the receptacle 900. In the illustrated example, the coupling slots 985 bend or curl in a clockwise direction. In other examples, the coupling slots 985 may bend in a counter-clockwise direction. In the illustrated example, the coupling slots 985 are equidistantly spaced apart from each circumferentially along the outer surface 981 of the sleeve 980. Further, in the illustrated example, the sleeve 980 defines three coupling slots 985. In other examples, the sleeve 980 may define more or fewer coupling slots 985.

Figure 33:
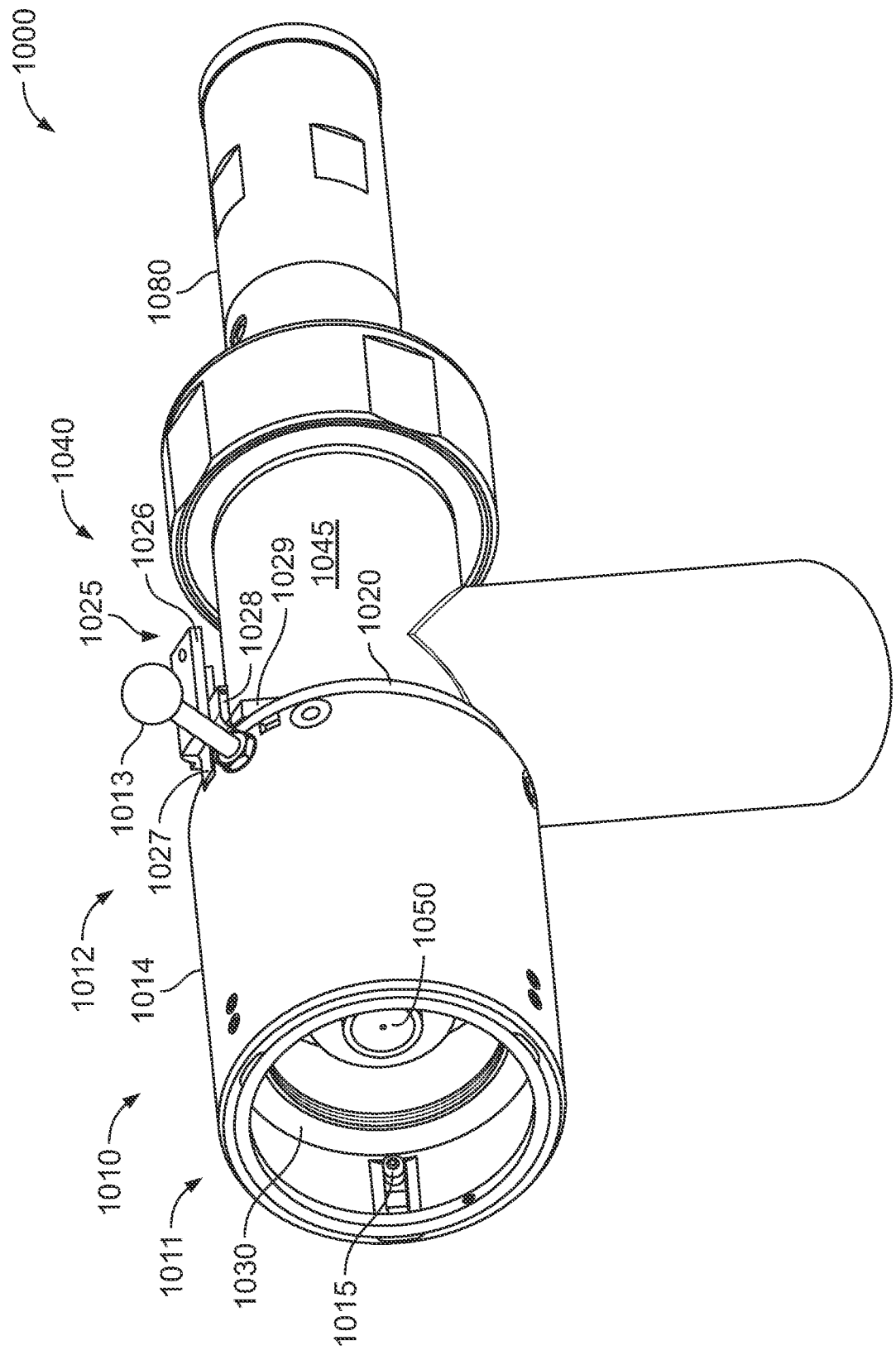
FIG. 33 is a perspective view of an example nozzle for transferring cryogenic fluid with the receptacle of FIG. 31 in accordance with the teachings herein.
Figure 34:
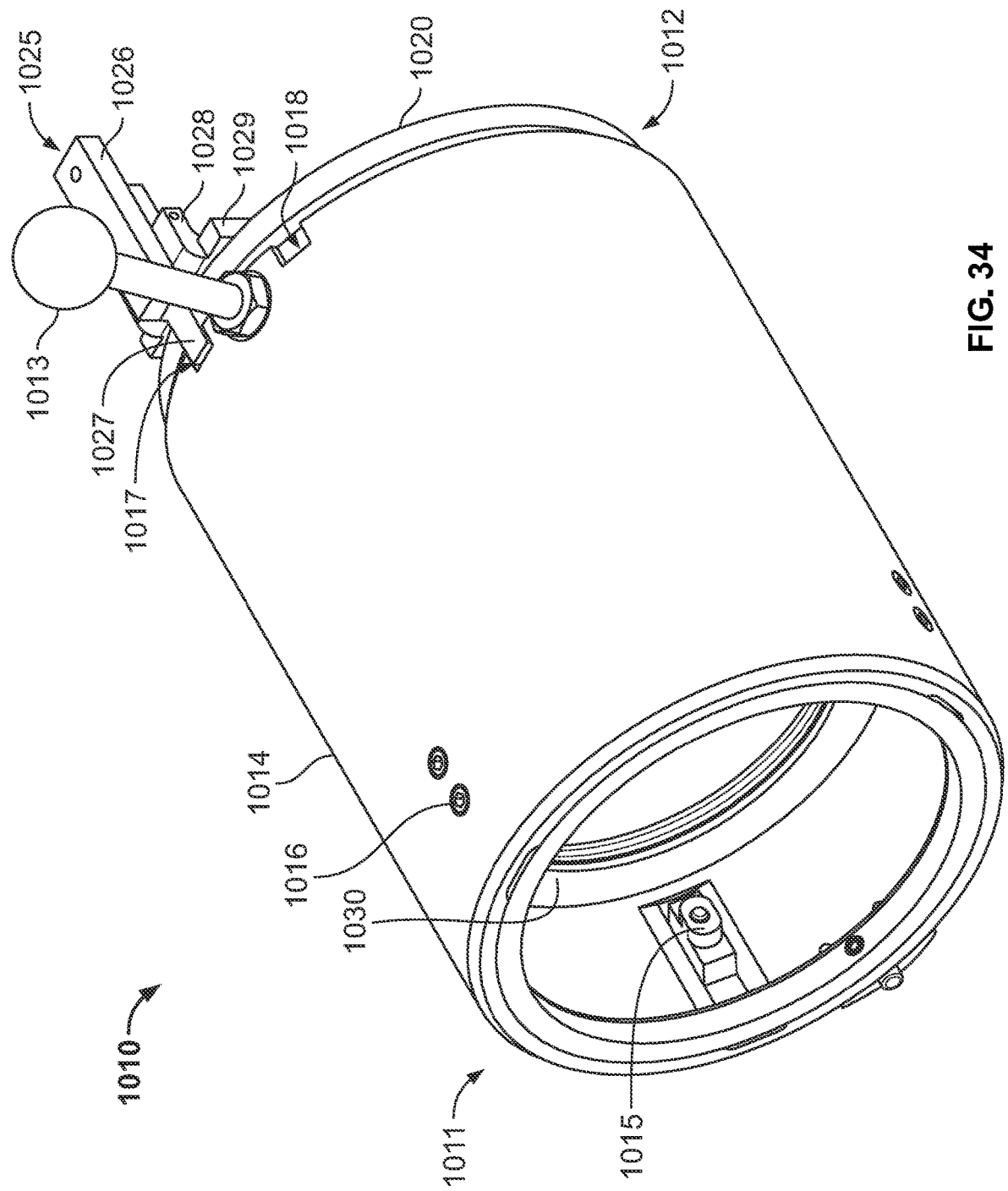
FIG. 34 is a perspective view of a sleeve of the nozzle of FIG. 33 having a locking assembly that is configured to securely couple the nozzle to the receptacle of FIG. 31.
Figure 38:
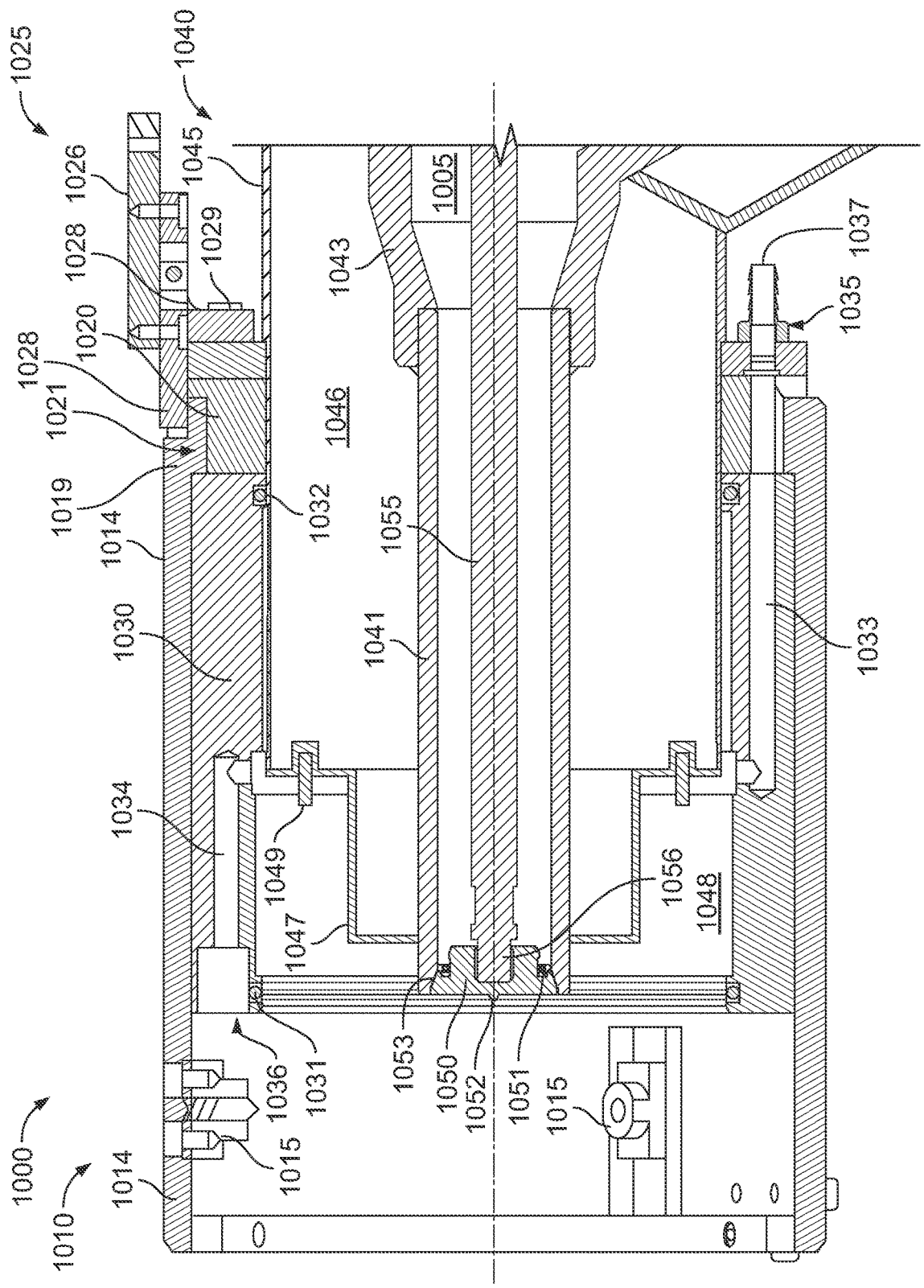
FIG. 38 is a magnified, cross-sectional view of a coupling end of the nozzle of FIG. 33.

Turning to FIG. 33, the nozzle 1000 of the illustrated includes a locking assembly 1010, a body 1040, and an actuator 1080. The actuator 1080 is coupled to and extends from a back end of the body 1040. The locking assembly 1010 is coupled to an outer shell 1045 of the body 1040 at a front end of the body 1040. The locking assembly 1010 includes a distal end 1011 and a proximal end 1012. As shown in FIG. 38, the proximal end 1012 is coupled to the outer shell 1045 toward the front end of the body 1040, and the distal end 1011 extends longitudinally beyond the front end of the body 1040. As shown in FIG. 34, the locking assembly 1010 includes a handle 1013, an outer sleeve 1014, the one or more locking teeth 1015, a sleeve ring 1020, a redundant locking mechanism 1025, and an inner sleeve 1030.

Returning to FIG. 38, the sleeve ring 1020 and the inner sleeve 1030 are fixedly coupled to the outer shell 1045 of the body 1040. For example, respective inner surfaces of the sleeve ring 1020 and the inner sleeve 1030 are coupled to an outer surface of the outer shell 1045. The sleeve ring 1020 and the inner sleeve 1030 are arranged in a side-by-side manner longitudinally along the outer shell 1045. A proximal end of the of the inner sleeve 1030 contacts a front side of the sleeve ring 1020. A distal end of the inner sleeve 1030 extends longitudinally beyond the front end of the outer shell 1045 of the body 1040. The outer sleeve 1014 extends over and is rotatably coupled to the inner sleeve 1030 and the sleeve ring 1020. An inner surface of the outer sleeve 1014 rotatably engages portions of respective outer surfaces of the inner sleeve 1030 and the sleeve ring 1020. The outer sleeve 1014 includes an inner lip 1019 at its proximal end that is received by a groove defined by the sleeve ring 1020 and the proximal end of the inner sleeve 1030 to prevent axial movement of the outer sleeve 1014 relative to the inner sleeve 1030.

Returning to FIG. 34, the locking teeth 1015 are fixedly positioned along an inner surface of the outer sleeve 1014 adjacent to a distal end of the outer sleeve 1014. Further, the locking teeth 1015 are spaced apart from a distal end of the inner sleeve 1030. In the illustrated example, each of the locking teeth 1015 are coupled to the outer sleeve 1014 via one or more fasteners 1016. The locking teeth 1015 are configured to be slidably received by the coupling slots 985 of the receptacle 900 to securely couple the nozzle 1000 to the receptacle 900. In the illustrated example, the locking teeth 1015 are equidistantly spaced apart from each circumferentially along the inner surface of the outer sleeve 1014. Further, in the illustrated example, the locking assembly 1010 includes three locking teeth 1015. In other examples, the locking assembly 1010 may include more or fewer locking teeth 1015.

The handle 1013 is fixedly positioned at a proximal end of the outer sleeve 1014. As discussed below in greater detail, the handle 1013 is configured to be used by the operator 40 to rotate the outer sleeve 1014 relative to the inner sleeve 1030 and the body 1040 of the nozzle 1000 to guide the locking teeth 1015 through the coupling slots 985 of the receptacle 900.

In the illustrated example, the redundant locking mechanism 1025 is coupled to the sleeve ring 1020 adjacent to the proximal end of the outer sleeve 1014. The redundant locking mechanism 1025 includes an arm 1026 with a locking end 1027. The redundant locking mechanism 1025 also includes a spring 1028 and a base 1029. The base 1029 is securely coupled to a back side of the sleeve ring 1020. The spring 1028 (e.g., a torsion spring) is operatively coupled to the base 1029 and the arm 1026 to bias the arm toward a rest position in which the arm 1026 is substantially perpendicular to the base 1029. The arm 1026 is configured to move from the rest position when the operator 40 presses down on another end of the arm 1026 that is opposite the locking end 1027 to overcome the biasing force of the spring 1028. As illustrated in FIG. 34, the proximal end of outer sleeve 1014 defines two locking slots 1017, 1018 that are located near the redundant locking mechanism 1025. The first locking slot 1017 is configured to securely receive the locking end 1027 of the arm 1026 to interfere with further rotation of the outer sleeve 1014 in a first locked state. The second locking slot 1018 is configured to securely receive the locking end 1027 of the arm 1026 to interfere with further rotation of the outer sleeve 1014 in a second locked state. In the illustrated example, the handle 1013 is located between the locking slots 1017, 1018. In other examples, the handle 1013 may be positioned to the side of the locking slots 1017, 1018 to prevent the handle 1013 and the arm 1026 from interfering with rotational movement of the outer sleeve 1014.

In operation, to securely couple the nozzle 1000 to the receptacle 900, the nozzle 1000 is positioned relative to receptacle 900 such that the locking teeth 1015 are aligned axially with the coupling slots 985 of the receptacle 900. At this time, the redundant locking mechanism 1025 is in the first locked state with the locking end 1027 of the arm 1026 positioned in the first locking slot 1017 to prevent rotation of the outer sleeve 1014 relative to the inner sleeve 1030. Subsequently, the nozzle 1000 is moved toward the receptacle 900 such that the locking teeth 1015 are received by respective open ends of the coupling slots 985. Once the locking teeth 1015 are positioned in the respective coupling slots 985, the operator 40 engages the arm 1026 of the redundant locking mechanism 1025 to lift the locking end 1027 from the first locking slot 1017 and, in turn, remove the redundant locking mechanism 1025 from the first locked state. The operator 40 then uses the handle 1013 to rotate the outer sleeve 1014 relative to the inner sleeve 1030 in a first rotational direction. Rotation of the outer sleeve 1014 causes the locking teeth 1015, which are fixedly coupled to the outer sleeve 1014, to also rotate. The rotation of the locking teeth 1015 causes the locking teeth 1015 to travel to a locked position farther within the bent, curled, and/or curved path of the respective coupling slots 985, which enables the locking teeth 1015 to lock the nozzle 1000 to the receptacle 900. When the locking teeth 1015 are in the lock position within the coupling slots 985, the operator 40 allows the spring 1028 to bias the locking end 1027 of the arm 1026 into the second locking slot 1018 (e.g., by releasing the arm) to prevent rotation of the outer sleeve 1014 relative to the inner sleeve 1030 and, in turn, prevent the locking teeth 1015 from sliding out of the coupling slots 985.

To decouple the nozzle 1000 from the receptacle 900, the operator 40 (1) removes the arm 1026 from the second locking slot 1018, (2) rotates the outer sleeve 1014 so that the locking teeth 1015 slide to the openings of the respective coupling slots 985, (3) pulls the nozzle 1000 away from the receptacle 900, and (4) places the arm 1026 back into the first locking slots 1017.

Figure 35:
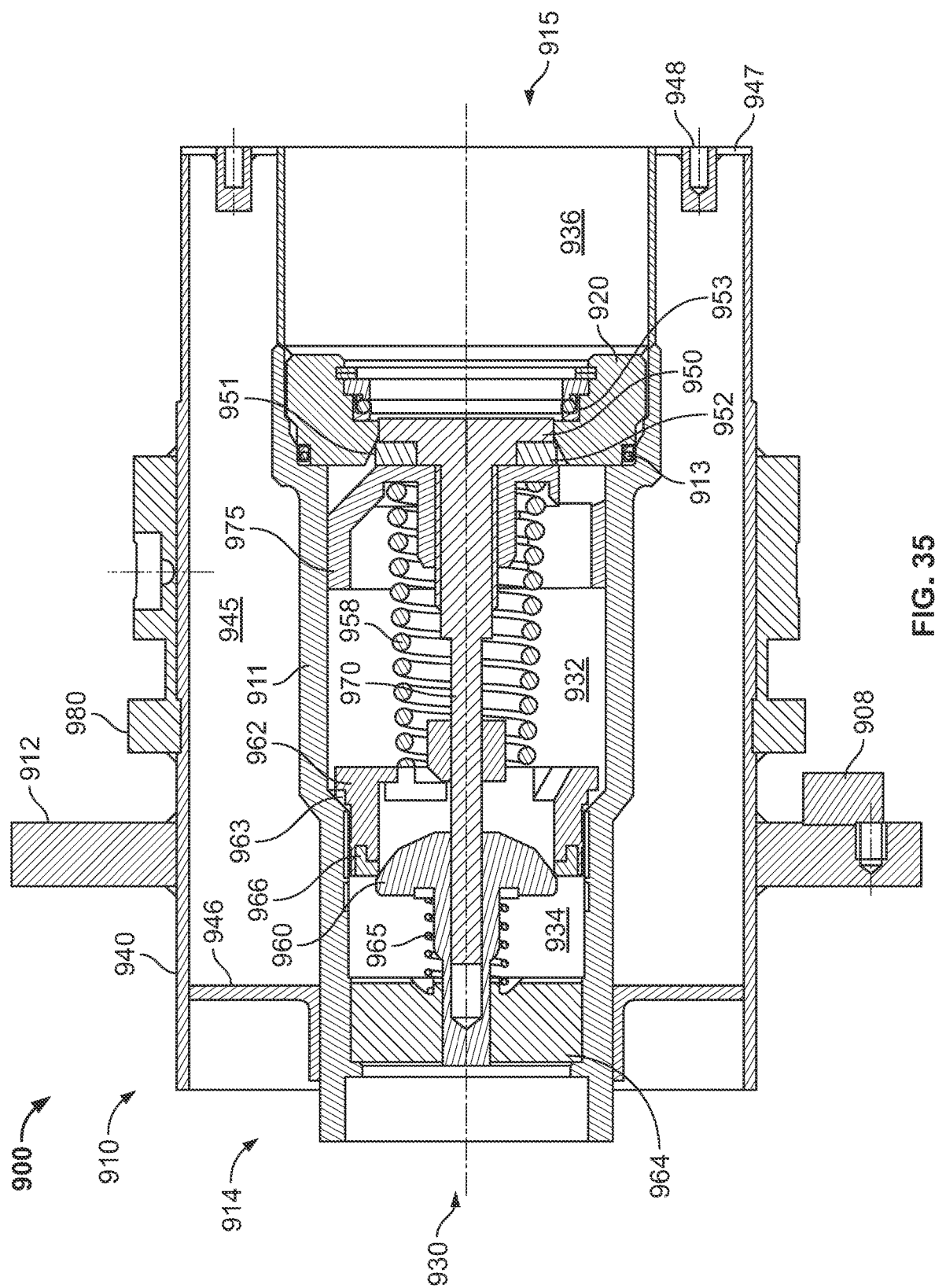
FIG. 35 is a cross-sectional view of the receptacle of FIG. 31.
Figure 36:
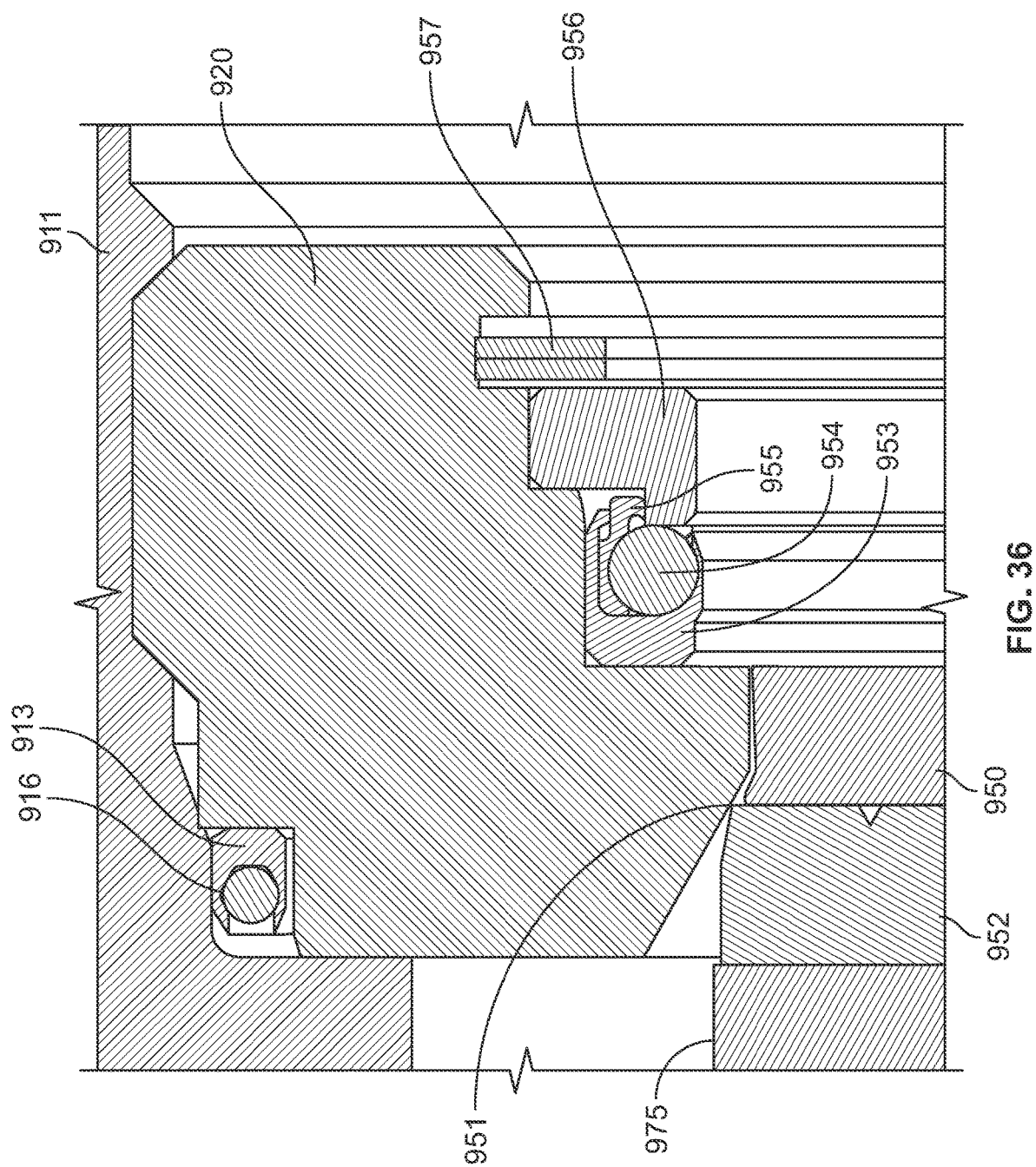
FIG. 36 is a magnified, cross-sectional view of a portion of the receptacle of FIG. 31.
Figure 37:
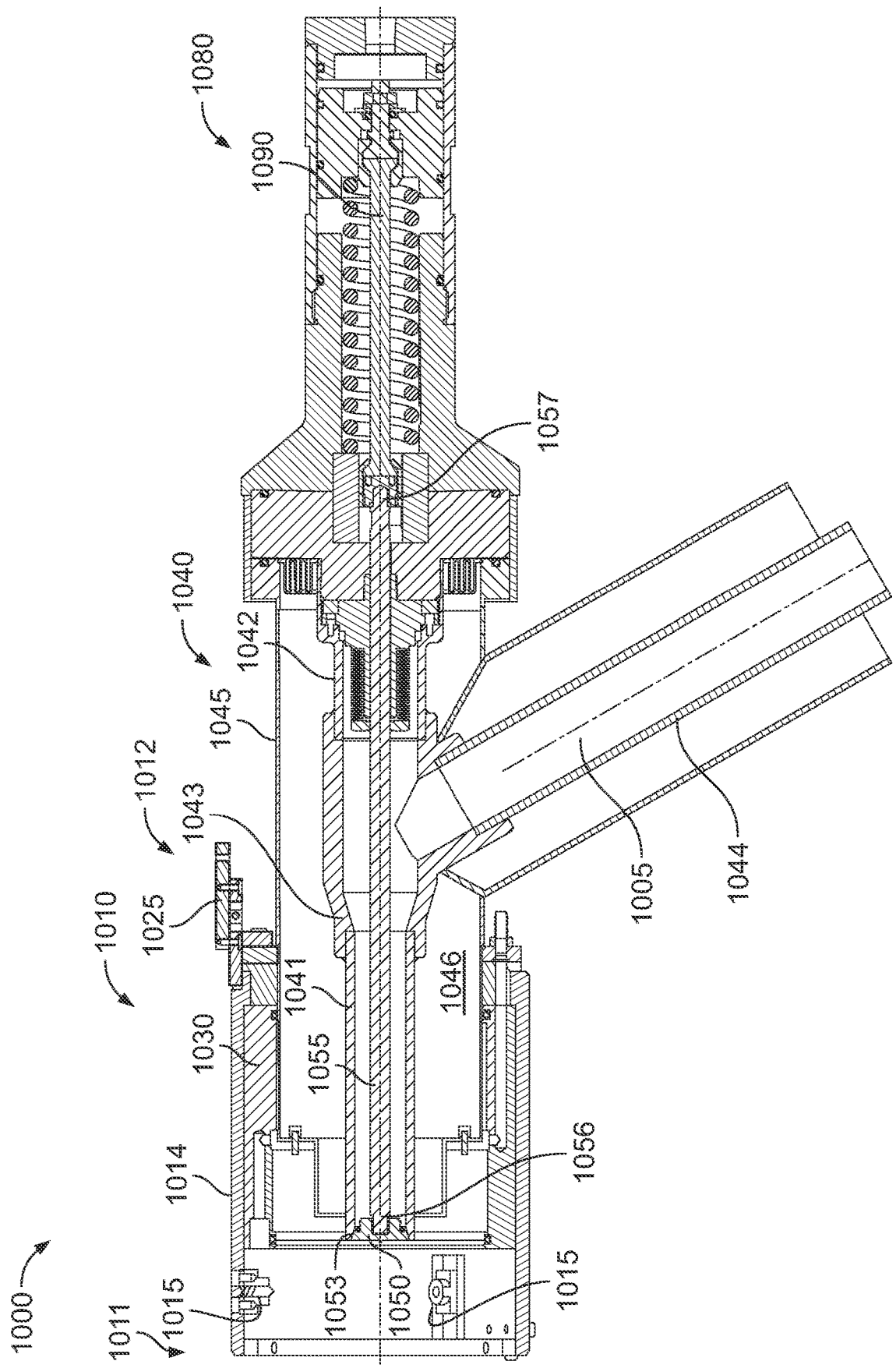
FIG. 37 is a cross-sectional view of the nozzle of FIG. 33.
Figure 39:
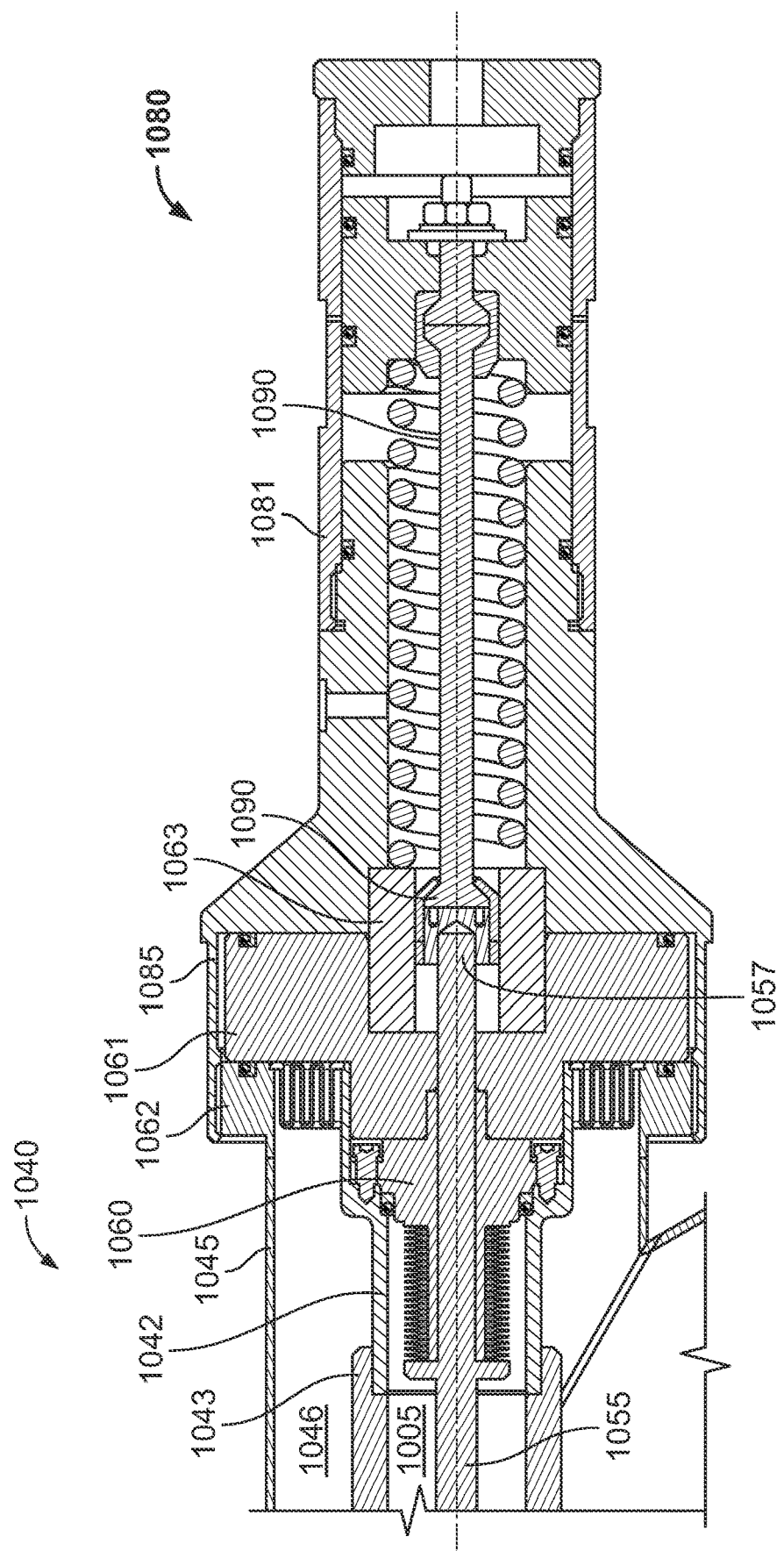
FIG. 39 is a magnified, cross-sectional view of an actuator and a portion of a body of the nozzle of FIG. 33.
Figure 40:
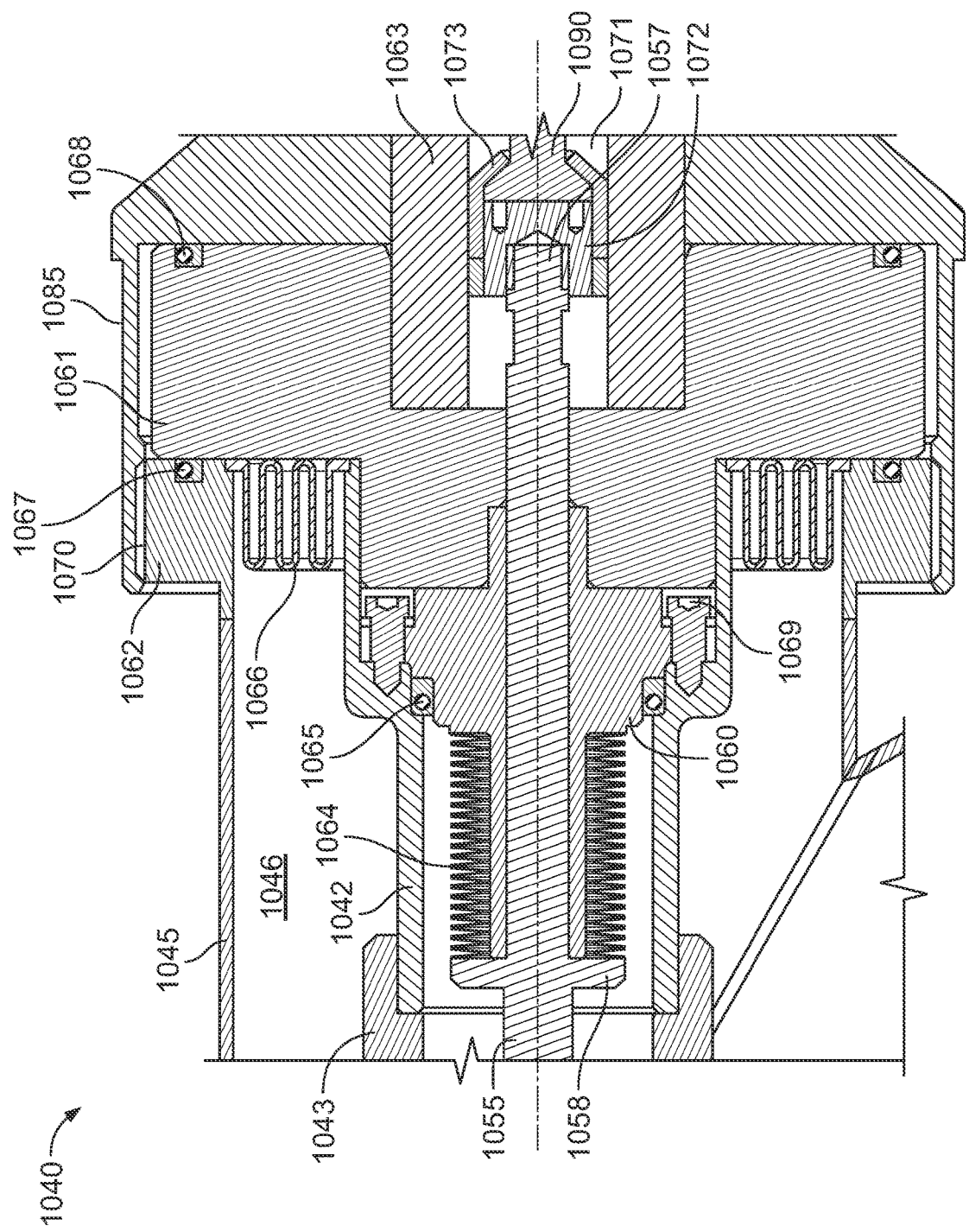
FIG. 40 is a further magnified, cross-sectional view of a connection between the actuator and the body of the nozzle of FIG. 43.
Figure 41:
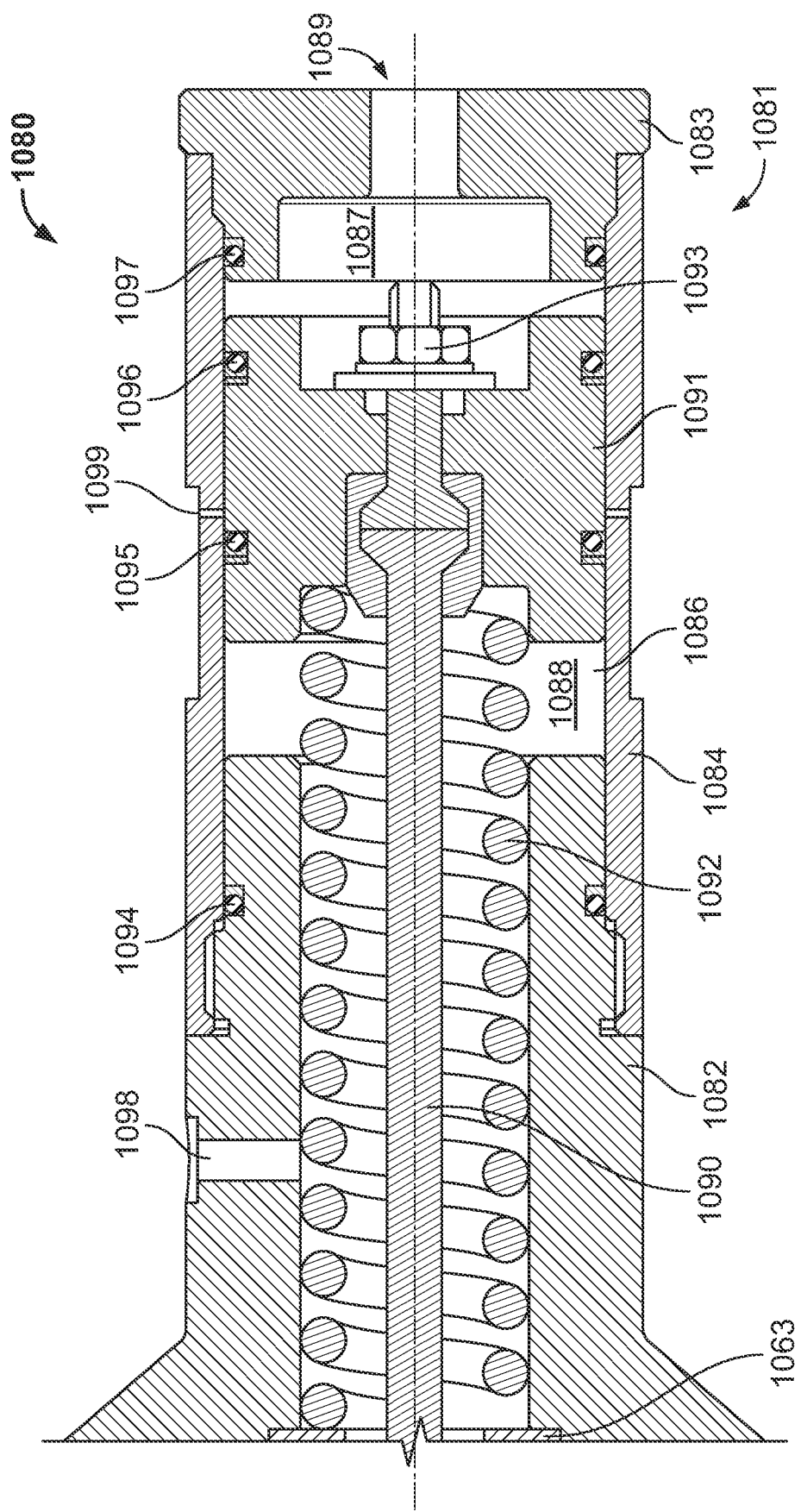
FIG. 41 is a further, magnified cross-sectional view of the actuator of FIG. 39.

Turning to the internal components of the receptacle 900 and the nozzle 1000, FIG. 35 is a cross-sectional view that depicts the internal components of the receptacle 900 and FIG. 36 is a cross-sectional view of a sealing assembly of the receptacle 900. FIG. 37 is a cross-sectional view that depicts the internal components of the nozzle 1000. Additionally, FIGS. 38-41 are magnified cross-sectional view of various portions of the nozzle 1000 with the handle 1013 not shown. More specifically, FIG. 38 is a magnified view of a coupling end of the nozzle 1000. FIG. 39 is a magnified view of an interface between an actuator 1080 and a body 1040 of the nozzle 1000. FIG. 40 is a further magnified view of the interface between the actuator 1080 and the body 1040 of the nozzle 1000, and FIG. 41 is a further expanded view of the actuator 1080.

As illustrated in FIGS. 35-36, the receptacle 900 includes the body 910 and a head 920 (also referred to as a "bonnet"). The head 920 is coupled to the inner wall 911 adjacent to the distal end 915. In the illustrated example, the head 920 is offset from the distal end 915 within the chamber 930 of the body 910. A face seal 913 is positioned between and sealingly engages the body 910 and the head 920. A biasing spring 916 engages the face seal 913 to hold the face seal 913 in place in place against the head 920.

An insulation layer 945 is located in a gap formed radially between the outer shell 940 and the inner wall 911. The insulation layer 945 extends longitudinally between a support bracket 946 that is located adjacent to the proximal end 914 of the body 910 and the end cap 947 located at the distal end 915. The support bracket 946 and the end cap 947 sealingly extend between the inner wall 911 and the outer shell 940 such that the insulation layer 945 is in a sealed cavity formed by the inner wall 911, the outer shell 940, the support bracket 946, and the end cap 947. The insulation layer 945 includes a vacuum and/or insulating material located in the sealed gap formed between the outer shell 940 and the inner wall 911 to insulate the outer shell 940 from the extremely cold temperature of cryogenic fluid flowing through the receptacle 900. The receptacle 900 may include an evacuation port and/or valve to draw a vacuum within the gap. The evacuation port and/or valve may be positioned along the end cap 947 and/or along the outer shell 940. In the illustrated example, the end cap 947 defines one or more guide slots 948, which are configured to receive the one or more guide pins 1049 to facilitate rotational alignment between the receptacle 900 and the nozzle 1000.

The inner wall 911 of the body 910 defines a chamber 930 through which cryogenic fluid is to flow. The chamber 930 houses other components of the receptacle 900 to control the flow of the cryogenic fluid. The internal components of the receptacle 900 include a poppet 950, a check 960, and a shaft 970. The poppet 950 is positioned toward the distal end 915 of the body 910. The check 960 is positioned toward the proximal end 914 of the body 910. The poppet 950 is fixedly coupled to the shaft 970, and the check 960 is slidably coupled to the shaft 970. The shaft 970 extends axially through the chamber 930 of the receptacle 900. In the illustrated example, the poppet 950 is integrally formed with and extends from an end of the shaft 970.

The poppet 950 is configured to sealingly engage a poppet seat 951 that is defined by the head 920 adjacent to the distal end 915. The check 960 is configured to sealingly engage a check seat 962 that is located toward the proximal end 914. The check seat 962 separates a chamber section 932 (also referred to as a "first chamber section") and a chamber section 934 (also referred to as a "second chamber section") of the chamber 930. The chamber section 934 extends between the check seat 962 and the proximal end 914 of the body 910 such that the chamber section 934 is adjacent to the proximal end 914. The chamber section 932 extends between the check seat 962 and the poppet seat 951. The head 920 separates the chamber section 932 and a chamber section 936 (also referred to as a "third chamber section") of the chamber 930 that is adjacent to the distal end 915. The head 920 is offset from the distal end 915 such that the chamber section 936 extends between the head 920 and the distal end 915 of the body 910.

FIG. 35 depicts a closed state of the receptacle 900. In the closed state, the check 960 is in a closed position at which the check 960 engages the check seat 962 that is securely positioned within the chamber 930 between the chamber section 932 and the chamber section 934. For example, the check 960 is configured to engage a seat seal 966 of the check seat 962 in the closed position to form a seal between the chamber section 932 and the chamber section 934. A check seal 963 is positioned between and sealingly engages the check seat 962 and the inner wall 911 of the body 910. Additionally, a check guide 964 is securely positioned within the chamber section 934 and adjacent to the proximal end 914 of the body 910. At least a portion of the shaft 970 extends into and/or through the check guide 964 to guide the shaft 970 in sliding along an axis of the receptacle 900 within the chamber 930. A check spring 965 is positioned between and engages the check guide 964 and the check 960. The check spring 965 is configured to bias the check 960 to remain engaged to the seat seal 966 of the check seat 962 in the closed position.

Also in the closed state, the poppet 950 is in a closed position at which the poppet 950 engages a poppet seat 951 that is defined by a portion of the head 920 adjacent to the distal end 915 of the body 910. The poppet 950 includes a poppet seal 952 that is configured to sealingly engage the poppet seat 951 in the closed position.

As best shown in FIG. 36, a seat seal 953 engages the head 920 adjacent to the poppet seat 951. The seat seal 953 is configured to sealingly engage a body 1040 of the nozzle 1000 when the receptacle securely receives the nozzle 1000. A biasing spring 954, a support ring 955, and a retainer 956 engage the seat seal 953 to bias the seat seal 953 in place against the head 920. Further, a retainer ring 957 engages the retainer 956 to hold the seat seal 953, the biasing spring 954, the support ring 955, and the retainer 956 in place.

Figure 43:
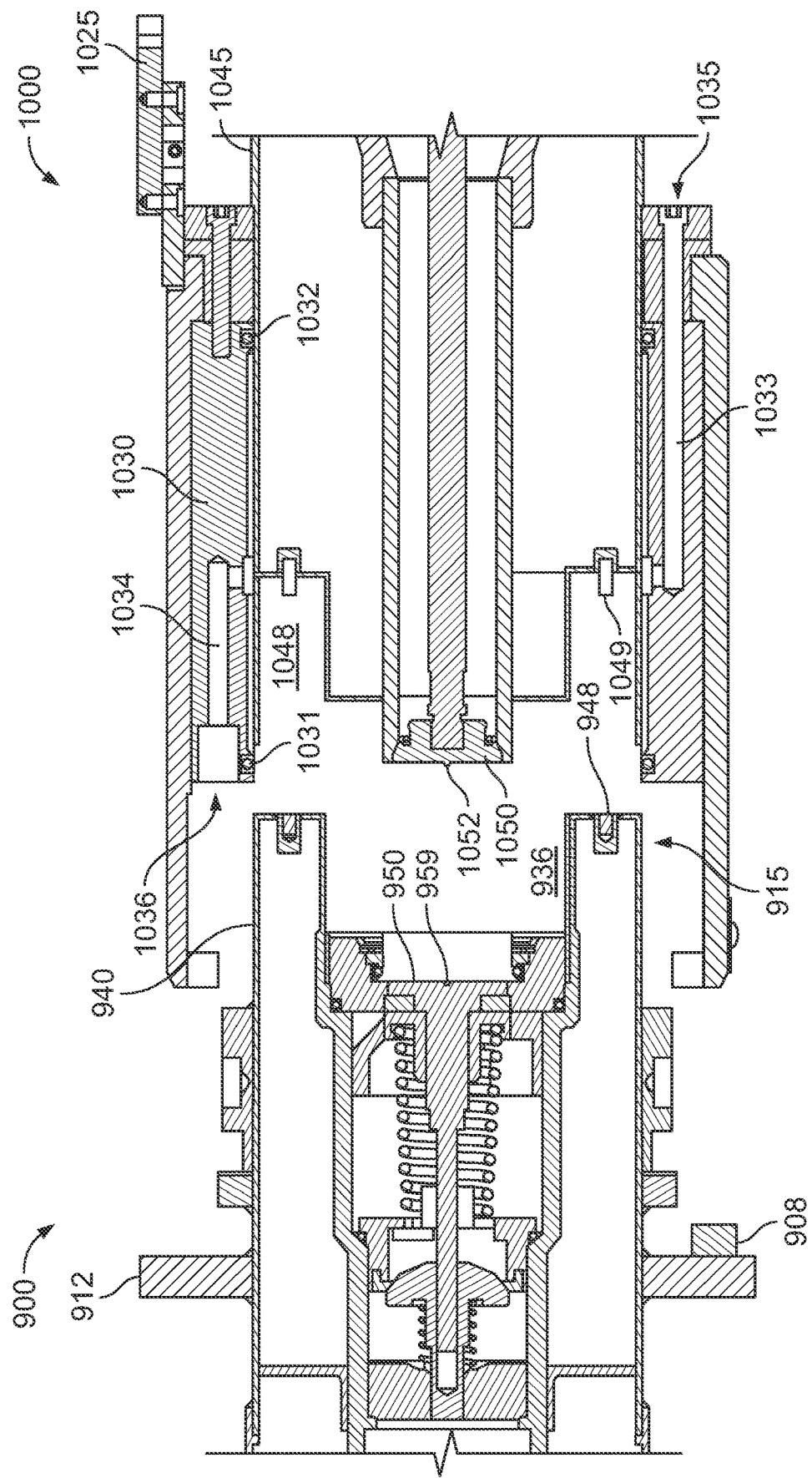
FIG. 43 is a partial cross-sectional view of the nozzle of FIG. 33 and the receptacle of FIG. 31 as the nozzle is being coupled to the receptacle.

Returning to FIG. 35, a poppet guide 975 is coupled to the shaft 970 and/or a back side of the poppet 950 behind the poppet 950 within the chamber section 932. An outer portion of the poppet guide 975 engages and/or is adjacent to the inner wall 911 of the body 910. The outer portion of the poppet guide 975 is configured to slide along the inner wall 911 as the shaft 970 slides along the axis of the receptacle 900. A portion of the shaft 970 extends through the poppet guide 975 and to the poppet 950. A poppet spring 958 is positioned between and engages the check seat 962 and the poppet guide 975. The poppet spring 958 is configured to bias the poppet 950 to remain engaged to the poppet seat 951 in the closed position. As best shown in FIG. 43, a recess 959 (e.g., a conical recess) defined centrally on an outer surface of the poppet 950 is configured to receive a protrusion 1052 of a poppet 1050 of the nozzle 1000 to facilitate alignment and secure engagement between the poppet 950 of the receptacle 900 and the poppet 1050 of the nozzle 1000.

Turning to FIG. 37, the nozzle 1000 includes the locking assembly 1010, the body 1040, the poppet 1050, and an actuator 1080. The poppet 1050 is positioned adjacent a front end of the body 1040, and the actuator 1080 is coupled to a back end of the body 1040.

In the illustrated example, the body 1040 of the nozzle 1000 includes a body segment 1041 (also referred to as a "front body segment" and a "first body segment"), a body segment 1042 (also referred to as a "rear body segment" and a "second body segment"), a body segment 1043 (also referred to as a "middle body segment," a "connecting body segment," and a "third body segment"), and a body segment 1044 (also referred to as a "body extension," a "hose-connection body segment," and a "fourth body segment"). The body segments 1041, 1042, 1043, 1044 are coupled together to form a chamber 1005 through which cryogenic fluid is permitted to flow and in which components are house to control the flow of the cryogenic fluid.

The body segment 1043 is coupled to and positioned between the other body segments 1041, 1042, 1044 of the body 1040. The body segment 1041 is positioned adjacent to the front end and is mechanically and fluidly coupled to an outlet port of the body segment 1043. The body segment 1044 is mechanically and fluidly coupled to an inlet port of the body segment 1043. The body segment 1044 also is configured to connect to the hose 24 to fluidly connect the nozzle 1000 to a tank, such as the storage tank 22. In the illustrated example, the body segment 1044 forms an extension that extends radially outward and back toward the back end of the body 1040. The body segment 1042 is mechanically and fluidly coupled to a third port of the body segment 1043. In the other examples, the body 1040 may be formed of more or fewer body segments. For example, two or more of the body segments 1041, 1042, 1043, 1044 may be integrally formed together.

The body segments 1041, 1042, 1043, 1044 of the illustrated example are arranged such that the cryogenic fluid is to flow through the body segment 1044, a portion of the body segment 1043, and the body segment 1041. The body segment 1041, the body segment 1042, and a portion of the body segment 1043 are coaxially aligned along a longitudinal axis of the nozzle 1000 to permit a shaft 1055 of the nozzle 1000 to extend and slide axially through the chamber 1005.

The body 1040 of the illustrated example also includes the outer shell 1045. An insulation layer 1046 is located in a gap formed between the outer shell 1045 and the body segments 1041, 1042, 1043, 1044. The insulation layer 1046 extends longitudinally between the back end of the body 1040 and an end cap 1047 adjacent to the front end. The insulation layer 1046 includes a vacuum and/or insulating material in the gap to insulate the outer shell 1045 from the extremely cold temperature of cryogenic fluid flowing through the nozzle 1000. The nozzle 1000 may include an evacuation port to draw a vacuum within the gap. The evacuation port may be located along the outer shell 1045 and/or the end cap 1047 of the body 1040 to draw the vacuum.

The shaft 1055 that extends through a portion of the chamber 1005. For example, the shaft 1055 extends through a portion of the chamber 1005 defined by the body segments 1041, 1042, 1043. The poppet 1050 is coupled to a first end 1056 of the shaft 1055 adjacent to the front end of body 1040. As disclosed below in greater detail with respect to FIGS. 39-40, a second end 1057 of the shaft 1055 is coupled to a stem 1090 of the actuator 1080 adjacent to the back end of the body 1040. As the stem 1090 of the actuator 1080 is actuated from a rest position and to an extended position, the stem 1090 causes the shaft 1055 of the nozzle 1000 to slide in the same position. In turn, the poppet 1050 located at the first end 1056 of the shaft 1055 disengages from the poppet seat 1053 to permit cryogenic to flow from the chamber 1005 at the front end of the nozzle 1000.

FIG. 38 further depicts a front end of the nozzle 1000 that is configured to couple to a receptacle, such as the receptacle 900. The poppet 1050 is coupled to the first end 1056 of the shaft 1055 adjacent to the front end of the nozzle 1000. In the illustrated example, the poppet 1050 is threadably coupled to the shaft 1055. The poppet 1050 is configured to engage the poppet seat 1053 in a closed position to prevent cryogenic fluid from flowing and is configured to be disengaged from the poppet seat 1053 in an open position to permit the flow of cryogenic fluid from the nozzle 1000. The poppet seat 1053 is defined by the body 1040 adjacent to the front end of the nozzle 1000. For example, the poppet seat 1053 is defined by an end of the body segment 1041 of the body 1040. Further, a seal 1051 (e.g., an O-ring) is coupled to the poppet 1050 to promote the formation of sealed connection between the poppet 1050 and the poppet seat 1053 when the poppet 1050 is in a closed position. In the illustrated example, the seal 1051 is securely positioned within a groove defined by a back surface of the poppet 1050.

As shown in FIG. 38, the end cap 1047 extends between a front end of the outer shell 1045 and a front end of the portion of the body 1040 defining the chamber 1005 (e.g., a front portion of the body segment 1041). In some examples, the end cap 1047 is integrally formed with the outer shell 1045. The inner sleeve 1030 of the locking assembly 1010 is coupled to the outer shell 1045 and extends beyond the front end of the body 1040. In the illustrated example, the end cap 1047 includes one or more bends (e.g., two 90 degree bends) such that a void 1048 (e.g., a toroid void) is formed between the inner sleeve 1030 and the end cap 1047. The void 1048 (also referred to as a "clearance gap") is configured to sealingly receive the distal end 915 of the receptacle 900 when the nozzle 1000 is coupled to receptacle 900 via the locking assembly 1010.

A seal 1031 (e.g., an O-ring) is positioned at a distal end and along an inner surface of the inner sleeve 1030 of the locking assembly 1010. The seal 1031 is positioned to form a sealed connection between the inner sleeve 1030 of the nozzle 1000 and the outer shell 940 of the receptacle 900 when the distal end 915 of the receptacle 900 is received by the void 1048. In the illustrated example, the seal 1031 is securely housed in a groove defined along the inner surface and adjacent to the distal end of the inner sleeve 1030. A seal 1032 (e.g., an O-ring) also is positioned along the inner surface at proximal end of the inner sleeve 1030 adjacent the sleeve ring 1020. The seal 1032 is positioned between the inner surface of inner sleeve 1030 and the outer shell 1045 to form a sealed connection between the inner sleeve 1030 and the outer shell 1045. In the illustrated example, the seal 1032 is securely housed in a groove that is defined along the inner surface and adjacent to the proximal end of the inner sleeve 1030.

As shown in FIG. 38, the inner sleeve 1030 of the locking assembly 1010 defines conduits 1033, 1034 that are configured to be fluidly connected to the gap located between the outer shell 1045 and the body segments 1041, 1042, 1043, 1044. Each of the conduits 1033, 1034 is fluidly connected to the void 1048. The inner sleeve 1030 defines a purge port 1035 at a first end of the conduit 1033, and an opposing second end of the conduit 1033 is connected to the void 1048. A purge valve 1037 is coupled to the purge port 1035. The inner sleeve 1030 defines a check port 1036 at a first end of the conduit 1034, and an opposing second end of the conduit 1034 is connected to the void 1048. In the illustrated example, the conduit 1033 extends to the proximal end of the inner sleeve 1030 such that the purge port 1035 is located along the proximal end of the inner sleeve 1030, and the conduit 1034 extends to the distal end of the inner sleeve 1030 such that the check port 1036 is located along the proximal end of the inner sleeve 1030. As disclosed below in greater detail with respect to FIGS. 43-44, the conduits 1033, 1034; the respective ports 1035, 1036; and the purge valve 1037 are configured to purge the void 1048 of moisture and/or other contaminates prior to the void 1048 securely receiving the distal end 915 of the receptacle 900. In some examples, the inner sleeve 1030 is composed of material with low thermal conductivity, such as a high-pressure fiberglass laminate (e.g., G-10) and/or other insulating material, to provide thermal insulation from fluid and/or other material flowing through the conduits 1033, 1034.

Turning to FIGS. 39-40, the actuator 1080 is coupled to the back end of the body 1040. The nozzle 1000 includes an coupling assembly to connect the body 1040 and the actuator 1080. The coupling assembly includes insulating material to thermally isolate the chamber 1005 of the nozzle 1000 (through which cryogenic fluid flows) from the actuator 1080 and the exterior of the nozzle 1000.

The coupling assembly of the illustrated example includes a thermal buffer 1061, a coupling ring 1062, and another thermal buffer 1063. The thermal buffers 1061, 1063 are composed of material with low thermal conductivity, such as a high-pressure fiberglass laminate (e.g., G-10) and/or other insulating material, to thermally insulate the actuator 1080 from the body 1040 through which cryogenic fluid flows. In the illustrated example, the thermal buffer 1061 has a substantially T-shaped cross section. The thermal buffer 1061 (also referred to as a "first thermal buffer") is housed within a chamber formed by an outer wall 1085 of the actuator 1080 at a front end of the actuator 1080. A back side of the thermal buffer 1061 engages an inner surface of the actuator 1080 that extends perpendicular to the longitudinal axis of the actuator 1080. The thermal buffer 1063 is positioned in an opening defined by the thermal buffer 1061 and the actuator 1080. The thermal buffer 1063 is a hollow cylinder that defines a chamber 1071 (also referred to as a "coupling chamber") in which the second end 1057 of the shaft 1055 is operatively coupled to a stem 1090 of the actuator 1080. In the illustrated example, the stem 1090 is composed of material with low thermal conductivity, such as a high-pressure fiberglass laminate (e.g., G-10) and/or other insulating material, to further thermally isolate components of the actuator 1080 from the extremely cold temperatures of cryogenic fluid. The coupling ring 1062 is at least partially housed within the chamber formed by the outer wall 1085 of the actuator 1080. The coupling ring 1062 engages a front side of the thermal buffer 1061 and is coupled to the outer wall 1085 of the actuator, for example, via threads 1070. The coupling ring 1062 also is coupled to the outer shell 1045 of the body 1040 such that the coupling ring 1062 is positioned axially between the thermal buffer 1061 and the outer shell 1045.

In the illustrated example, a portion of the front end of the thermal buffer 1061 extends into an opening defined by the body segment 1042 of the body 1040. Within the opening of the body 1040, the front end of the thermal buffer 1061 engages a back end of a shaft guide 1060. The shaft guide 1060 extends between the front end of the thermal buffer 1061 and a flange 1058 of the shaft 1055. The shaft guide 1060 of the illustrated example is coupled to securely fastened to the body segment 1042 of the body 1040 via one or more fasteners 1069. In other examples, the shaft guide 1060 may be welded to the body 1040.

As shown in FIGS. 39-40, the shaft 1055 extends through the body 1040 and the shaft guide 1060 and at least partially through the thermal buffers 1061, 1063 to operatively connect to the stem 1090 of the actuator 1080 within the chamber 1071 of the thermal buffer 1063. The coupling assembly includes a connector 1072 and a crimped fastener 1073 to couple the second end 1057 of the shaft 1055 to the stem 1090 of the actuator 1080 within the chamber 1071. In the illustrated example, the connector 1072 engages and is positioned axially between the shaft 1055 and the stem 1090. The connector 1072 also engages and is positioned radially between (i) the crimped fastener 1073 and (ii) the shaft 1055 and the stem 1090. The connector 1072 includes inner threads to threadably receive the second end 1057 of the shaft 1055 and outer threads to be threadably received by an uncrimped end of the crimped fastener 1073. A flared end of the stem 1090 engages the connector 1072. A crimped end of the crimped fastener 1073 is crimped around the flared end of the stem 1090 to securely fasten the second end 1057 of the shaft 1055 to the flared end of the stem 1090.

The coupling assembly includes one or more seals to further seal the chamber 1005 from the actuator 1080 and the exterior of the body 1040. For example, the seals deter a condensation path from forming between the chamber 1005 and the exterior of the body 1040. In the illustrated example, the coupling assembly includes one or more bellows seals. For example, a bellows 1064 (also referred to as a "first bellows" or a "first bellows seal") is coupled to and extends between the flange 1058 of the shaft 1055 and the shaft guide 1060 to form a seal between the shaft 1055 and the shaft guide 1060. A bellows 1066 (also referred to as a "second bellows" or a "second bellows seal") is coupled to and extends between the body segment 1042 of the body 1040 and the coupling ring 1062 to form a seal between the body 1040 and the coupling ring 1062. In the illustrated example, the coupling assembly also includes one or more O-rings. A seal 1065 (also referred to as a "first seal" or a "first O-ring" is positioned between and engages the shaft guide 1060 and the body segment 1042 of the body 1040 to fluidly isolate the fasteners 1069 from the cryogenic fluid. A seal 1067 (also referred to as a "second seal" or a "second O-ring" is positioned between and sealing engages the coupling ring 1062 and the thermal buffer 1061. A seal 1068 (also referred to as a "third seal" or a "third O-ring" is positioned between and sealing engages the thermal buffer 1061 and the inner surface of the actuator 1080.

FIG. 41 further depicts the actuator 1080 of the nozzle 1000. In the illustrated example, a body 1081 of the actuator 1080 is formed from a body segment 1082 (also referred to as a "first body segment" or a "front body segment"), a body segment 1083 (also referred to as a "second body segment," a "back body segment," or an "end cap"), and a body segment 1084 (also referred to as a "third body segment" or a "middle body segment"). The body segment 1082 includes the outer wall 1085 of the actuator 1080 in which the thermal buffers 1061, 1063 and the coupling ring 1062 are at least partially housed. The body segments 1082, 1084 are threadably coupled together, and the body segments 1083, 1084 are threadably coupled together. In the illustrated example, the body 1081 of the actuator 1080 includes three body segments that are assembled together. In other examples, the body 1081 may be formed by more or fewer body segments.

The body 1081 of the actuator defines a chamber 1086 through which the stem 1090 of the actuator 1080 extends. In the illustrated example, the actuator 1080 also includes a piston 1091 and a spring 1092 that are housed within the chamber 1086. An end of the stem 1090 is coupled to the piston 1091 via a fastener 1093 (e.g., a bolt, a nut, etc.). The spring 1092 (also referred to as an "actuator spring") extends between and engages the thermal buffer 1063 of the coupling assembly and the piston 1091 of the actuator 1080. Further, in the illustrated example, the fastener 1093 is a nut that is screwed onto a dumbbell-like structure with notching that forms a key to prevent rotation of the components while being coupled together.

The piston 1091 divides the chamber 1086 into and separates a pressure chamber 1087 and a spring chamber 1088. The pressure chamber 1087 is configured to contain a vacuum or inert gas (e.g., nitrogen) provided by a solenoid. The pressure chamber 1087 receives the inert gas through an inlet port 1089 (e.g., also referred to as a "passageway") defined by the body segment 1083 of the body 1081. The spring 1092 engages the piston 1091 and is configured to bias the piston 1091 in a direction away from the body 1040 of the nozzle 1000. The piston 1091 of the illustrated example is composed of material with low thermal conductivity, such as a high-pressure fiberglass laminate (e.g., G-10) and/or other insulating material, to provide further thermal insulation between to the pressure chamber 1087 of the actuator 1080.

The body 1081 of the actuator 1080 defines a plurality of ports fluidly connected to the chamber 1086. For example, the body segment 1083 defines the inlet port 1089 for the pressure chamber 1087. The body segment 1082 defines a vacuum port 1098 that is fluidly connected to the spring chamber 1088 and is configured to provide further insulation from the cryogenic temperature of portions of the body 1040 of the nozzle 1000. The body segment 1084 defines a vent port 1099. In some examples, an evacuation port and/or valve may be located along a portion of the body 1081 to facilitate adjustment (e.g., increasing or decreasing) of the pressure of the inert gas within the pressure chamber 1087.

The actuator 1080 of the illustrated example includes one or more seals to seal the pressure chamber 1087 and the spring chamber 1088 from each other and/or from an exterior of the actuator 1080. For example, a seal 1094 engages and is positioned between the body segments 1082, 1084 adjacent to threads that couple the body segments 1082, 1084 together. The seal 1094 (e.g., an O-ring) fluidly separates the spring chamber 1088 from the threads. In the illustrated example, the seal 1094 is housed in a groove defined by the body segment 1082. Seals 1095, 1096 are located at opposing ends of the piston 1091 and each is positioned between and engages the piston 1091 and the body segment 1084. Each of the seals 1095, 1096 (e.g., O-rings) is positioned within a respective groove defined by the piston 1091. The seal 1095 is positioned between and fluidly separates the spring chamber 1088 and the vent port 1099. The seal 1096 is positioned between and fluidly separates the pressure chamber 1087 and the vent port 1099. A seal 1097 engages and is positioned between the body segments 1083, 1084 adjacent to threads that couple the body segments 1082, 1084 together. The seal 1097 (e.g., an O-ring) fluidly separates the pressure chamber 1087 from the threads. In the illustrated example, the seal 1094 is housed in a groove defined by the body segment 1083.

Figure 42:
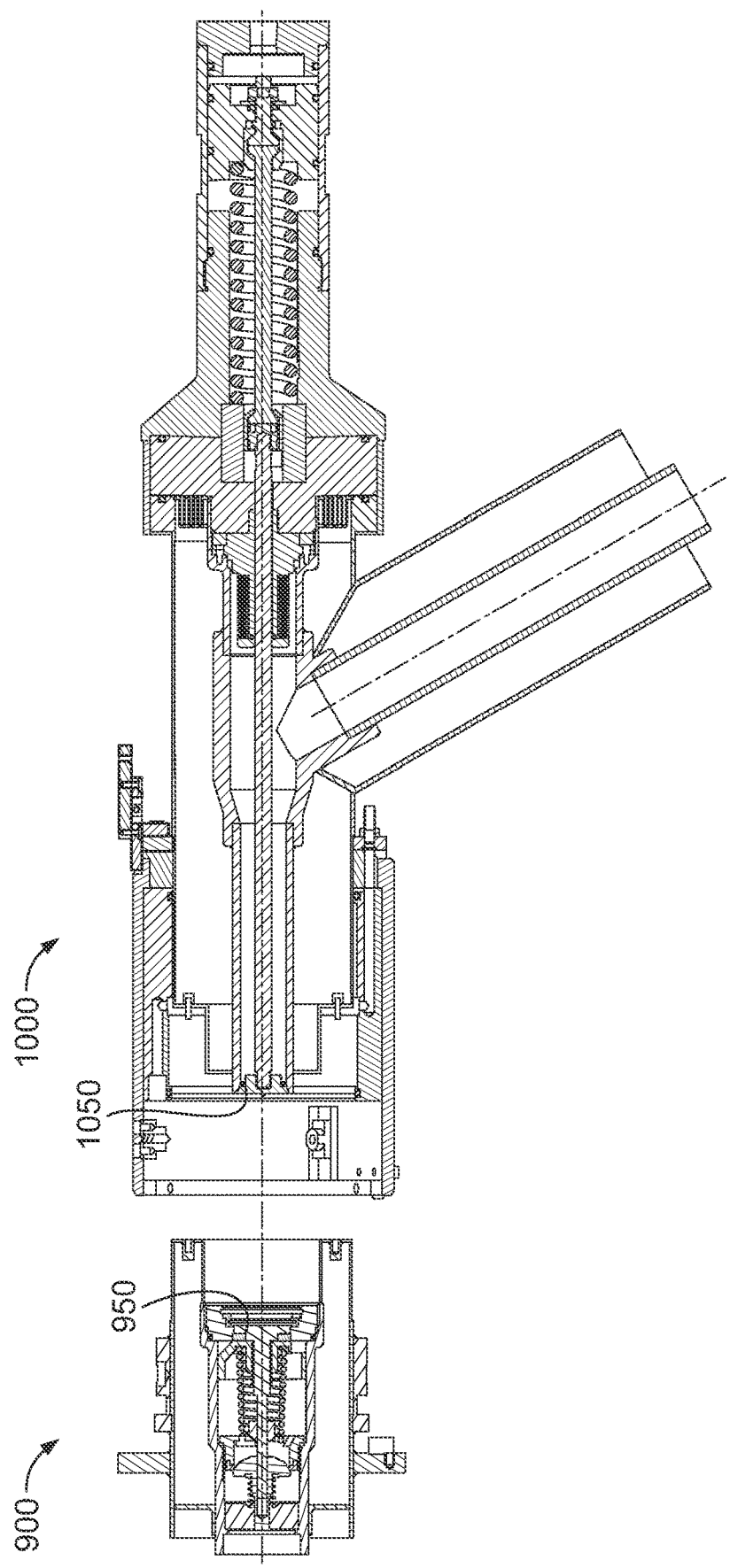
FIG. 42 is a cross-sectional view of the nozzle of FIG. 33 uncoupled from the receptacle of FIG. 31.
Figure 44:
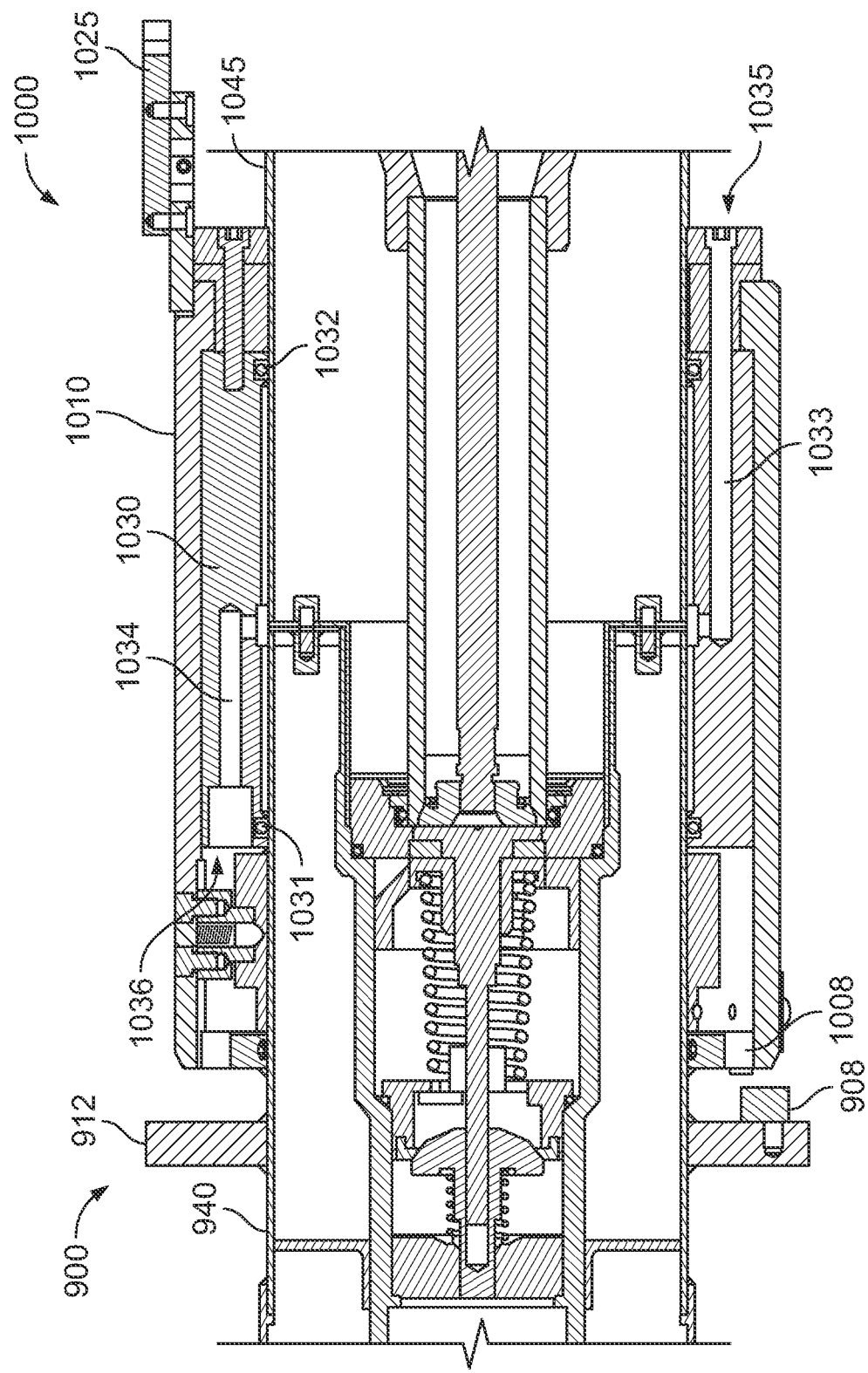
FIG. 44 is a cross-sectional view of a portion of the nozzle of FIG. 33 coupled to the receptacle of FIG. 31.

FIGS. 42-44 depict the coupling sequence between the nozzle 1000 and the receptacle 900 with the handle 1013 of the nozzle 1000 not shown. FIG. 42 depicts the nozzle 1000 and the receptacle 900 when the nozzle 1000 has yet to be coupled to the receptacle 900. The poppet 1050 of the nozzle 1000 is in the closed position to prevent cryogenic fluid from being dispensed from the chamber 1005 of the nozzle 1000. Additionally, the poppet 950 of the receptacle 900 is in the closed position to prevent material (e.g., cryogenic fluid stored in the fill tank 32) from escaping through the receptacle 900.

FIG. 43 depicts the nozzle 1000 and the receptacle 900 as the nozzle 1000 is being moved closer to the receptacle 900 for coupling purposes. Before the nozzle 1000 engages the receptacle 900, air and/or other cleaning fluid is sprayed through the conduit 1033 via the purge port 1035 and/or the purge valve 1037 (FIG. 38) and into the void 1048 of the nozzle 1000 and the chamber section 936 of the receptacle 900. The cleaning fluid is sprayed into the void 1048 and the chamber section 936 to purge the area between the nozzle 1000 and the receptacle of moisture and/or other contaminates to prevent such material from being trapped between the nozzle 1000 and the receptacle 900 when coupled together. Additionally, any moisture and/or other contaminates, along with the cleaning fluid is removed from the area between the nozzle 1000 and the receptacle 900 via the conduit 1034 and the check port 1036.

FIG. 44 depicts the nozzle 1000 coupled to the receptacle 900 after the cleaning fluid is applied. When the nozzle 1000 and the receptacle 900 are coupled together, the seal 1031 prevents the cleaning fluid and/or contaminates from escaping between the inner sleeve 1030 of the nozzle 1000 and the outer shell 940 of the receptacle 900. The seal 1032 prevents the cleaning fluid and/or contaminates from escaping between the inner sleeve 1030 and the outer shell 1045 of the nozzle 1000.

In the illustrated example, the receptacle 900 includes a sensing device 908 and the nozzle 1000 includes a sensing device 1008. The sensing device 908 is fixedly coupled to the flange 912 of the receptacle 900. The sensing device 1008 is fixedly coupled to the outer sleeve 1014 of the nozzle 1000. The sensing devices 908, 1008 are positioned to be (1) within a predetermined distance of each other and (2) aligned axially with respect to each other when the nozzle 1000 is securely coupled to the receptacle 900. When the nozzle 1000 is securely coupled to the receptacle 900, the sensing device 1008 is configured to detect the presence of the sensing device 908. When the nozzle 1000 is decoupled to the receptacle 900, the sensing device 1008 is unable to detect the presence of the sensing device 908 due to the sensing devices 908, 1008 being (1) positioned beyond a predetermined distance of each other and/or (2) being misaligned axially with respect to each other. Further, when the nozzle 1000 is coupled to the receptacle 900 but not in the secured position, the sensing device 1008 is unable to detect the presence of the sensing device 908 due to the sensing devices 908, 1008 being misaligned axially with respect to each other. In turn, the sensing devices 908, 1008 are configured to electronically detect when the nozzle 1000 is securely coupled to the receptacle 900.

In some examples, the sensing device 1008 is a proximity sensor and the sensing device 908 is a target block composed of material (e.g., metal) detectable by the proximity sensor. The proximity sensor is configured to (1) detect the presence of the detectable material when the nozzle 1000 is securely coupled to the receptacle 900 and (2) not detect the presence of the detectable material when the nozzle 1000 is not securely coupled to the receptacle 900 (e.g., due to misalignment or distance). In other examples, the sensing device 1008 is signal receiver and the sensing device 908 is a signal transmitter. In such examples, the sensing device 1008 is configured to (1) receive a signal from the sensing device 908 when the nozzle 1000 is securely coupled to the receptacle 900 and (2) not receive a signal from the sensing device 908 when the nozzle 1000 is not coupled to the receptacle 900 (e.g., due to misalignment or distance).

Figure 45:
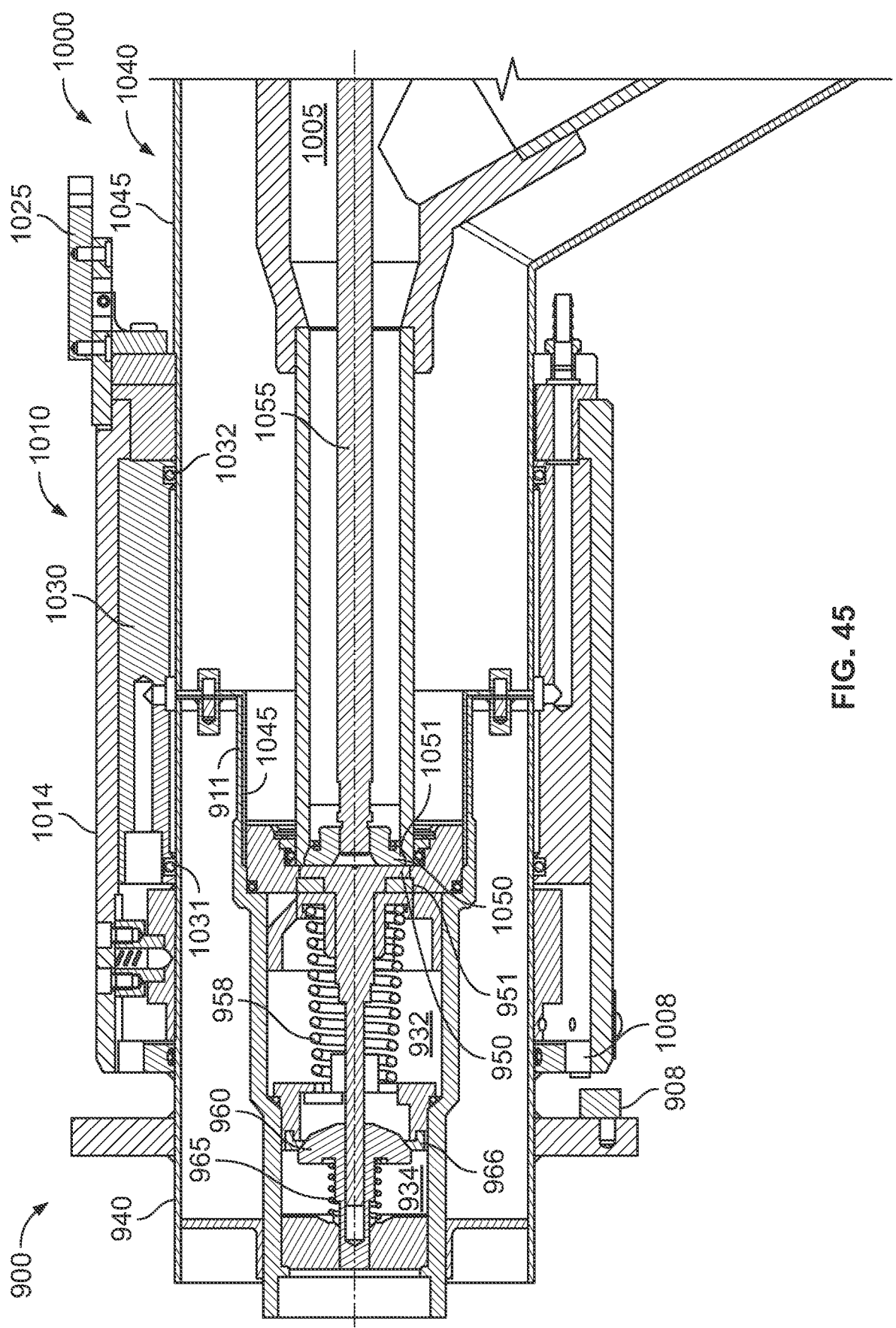
FIG. 45 is another cross-sectional view of a portion of the nozzle of FIG. 33 coupled to the receptacle of FIG. 31.
Figure 46:
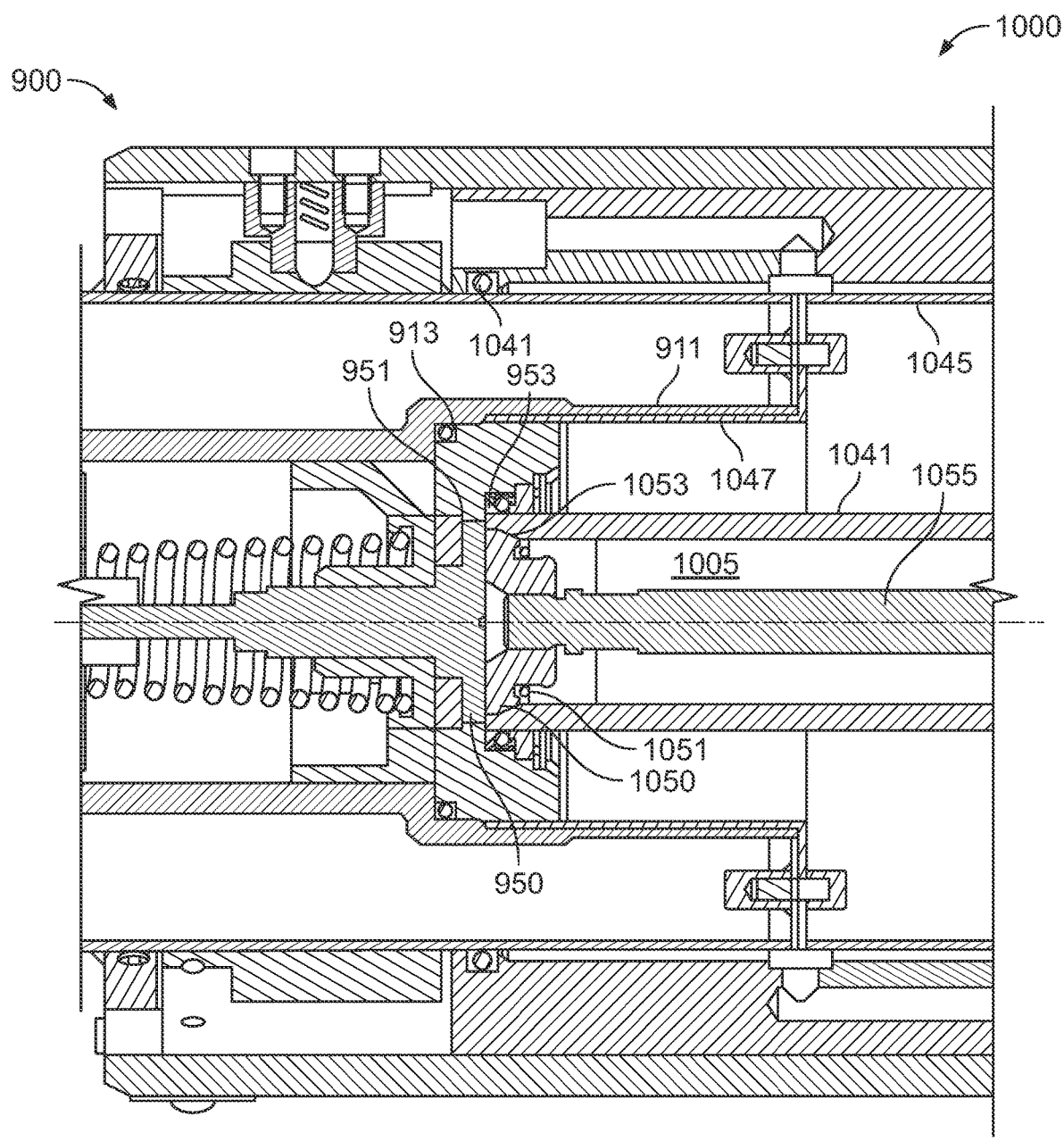
FIG. 46 is a magnified, cross-sectional view of a portion of the nozzle of FIG. 33 coupled to the receptacle of FIG. 31.
Figure 47:
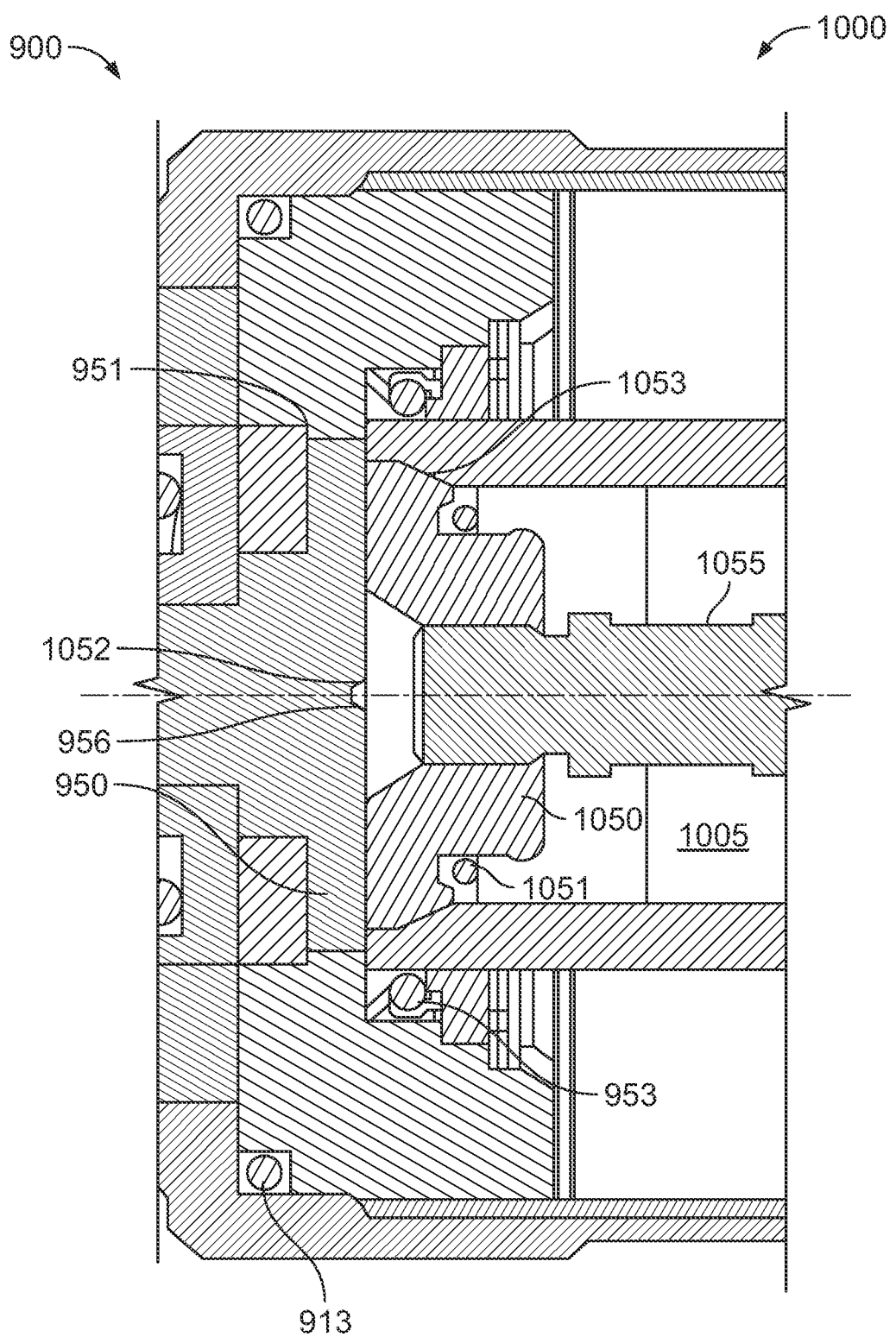
FIG. 47 is a further magnified, cross-sectional view of a portion of the nozzle of FIG. 33 coupled to the receptacle of FIG. 31.

In FIGS. 45-47, the nozzle 1000 is coupled to the receptacle 900 via the locking assembly 1010 and in the closed state. More specifically, FIG. 45 depicts the receptacle 900 and a portion of the nozzle 1000 (without the handle 1013) when the nozzle 1000 is coupled to the receptacle 900. FIG. 46 depicts an expanded view of a portion of the receptacle 900 and a portion of the nozzle 1000 when coupled together in respective closed states. FIG. 47 depicts a further expanded view of the poppet 1050 of the nozzle 1000 and the poppet 950 of the receptacle when coupled together in the respective closed states.

In the closed position, the poppet 1050 of the nozzle 1000 engages the poppet 950 of the receptacle 900. The poppet 1050 remains in the closed position to prevent cryogenic fluid from being dispensed from the nozzle 1000, and the poppet 950 remains in the closed position to prevent material from escaping through the receptacle 900. The end cap 1047 extends toward the front portion of the body 1040 to increase the amount of insulation provided around chamber 1005. The void 1048 is configured to securely and sealingly receive the distal end 915 of the receptacle 900 to minimize potential conductive paths and, in turn, reduce heat leaks between the chamber 1005 and the exterior of the nozzle 1000. For example, the internal geometries of the inner wall 911 of the receptacle 900 and the outer shell 1045 of the nozzle 1000 are complementary of each other to deter any potential heat leak between the chamber 1005 and the exterior of the nozzle 1000. To further limit potential heat leaks, the seal 1031 forms a sealed connection between the inner sleeve 1030 of the nozzle 1000 and the outer shell 940 and the seal 1032 forms a sealed connection between the inner sleeve 1030 and the outer shell 1045.

The receptacle 900 and the nozzle 1000 are configured to (1) to deter atmospheric air and/or debris from becoming trapped before the poppet 1050 is opened to extend into the receptacle 900 and (2) to deter cryogenic fluid from escaping from the nozzle 1000 and/or the receptacle 900 into the atmosphere during the coupling and/or decoupling process. For example, the void 1048 of the nozzle 1000 and the distal end 915 of the body 910 of the receptacle 900 are shaped to be complimentary with each other to reduce the amount of cryogenic fluid that may become trapped and subsequently emitted during the coupling and/or decoupling process. The poppet 1050 is configured to be flush with the poppet 950 when the nozzle 1000 couples to the receptacle 900 to further deter any material from becoming trapped and subsequently emitted. The seat seal 953 of the receptacle 900 and the seals 1031, 1032 of the nozzle 1000 also are positioned to reduce emissions of cryogenic fluid during the coupling and decoupling process. Additionally, the locking assembly 1010 is configured to keep the nozzle 1000 securely coupled to the receptacle 900, thereby reducing emissions that may otherwise result from an unintended decoupling.

Figure 48:
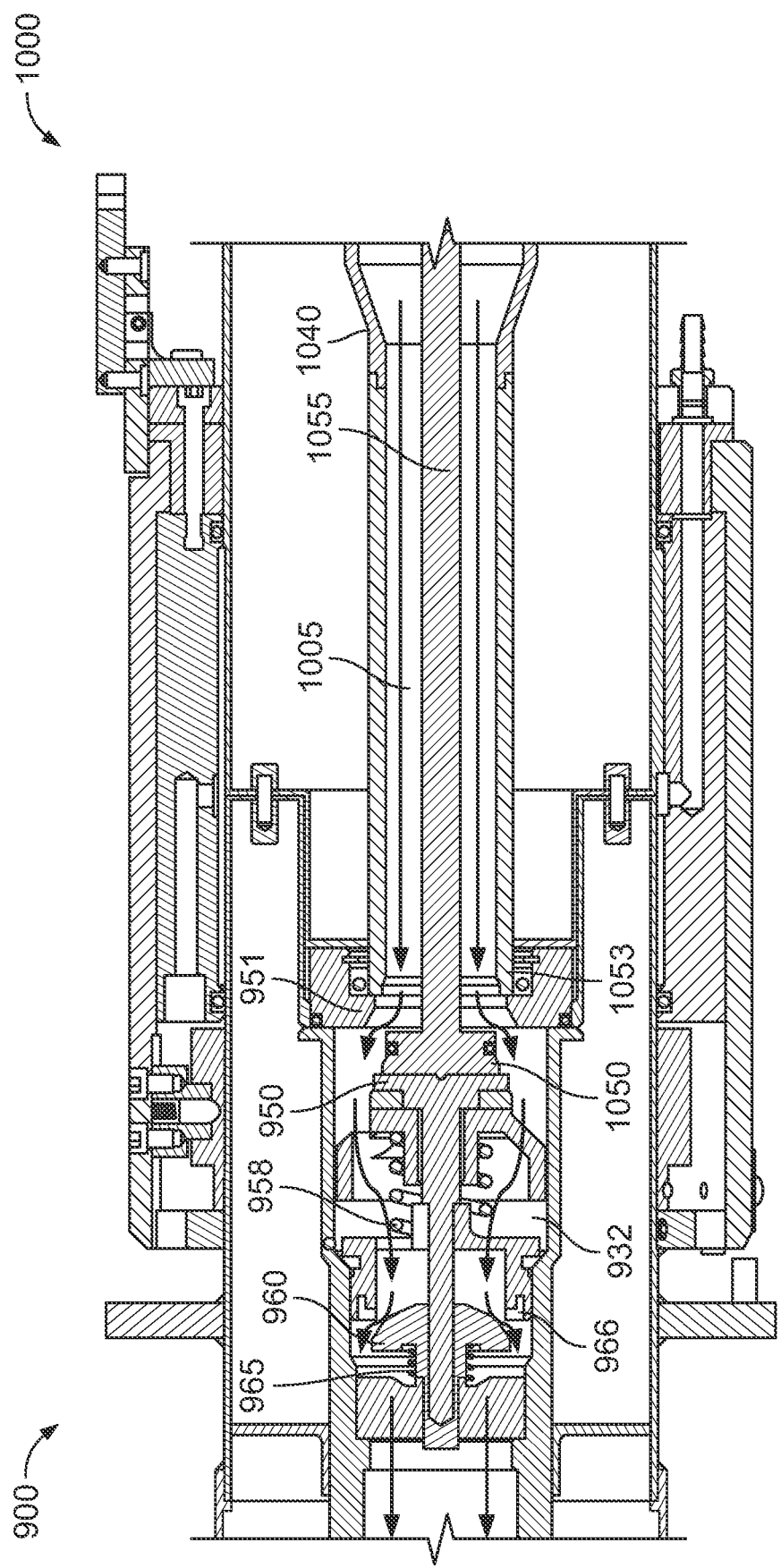
FIG. 48 is a magnified, cross-sectional view of a portion of the nozzle of FIG. 33 and the receptacle of FIG. 31 in an open state.

FIG. 48 depicts the nozzle 1000 and the receptacle 900 in respective open states during which cryogenic fluid flows through the nozzle 1000 and the receptacle 900 for a fill sequence. To initiate the fill sequence (e.g., remotely), the operator 40 presses the button 28 at the filling station 20. Inert gas (e.g., nitrogen) is supplied to the pressure chamber 1087 of the actuator 1080 when the button 28 is pressed. Once enough air is supplied to the pressure chamber 1087, the pressure within the pressure chamber 1087 overcomes the biasing forces of the spring 1092 of the actuator 1080 and the poppet spring 958 of the poppet 950 and causes the piston 1091 of the actuator 1080 to actuate linearly toward the body 1040 of the nozzle 1000. In turn, the stem 1090 that is coupled to the piston 1091 linearly actuates in the same direction, which causes the shaft 1055 that is operatively connected to the stem 1090 to actuate in the same direction. The actuation of the shaft 1055 causes the poppet 1050 of the nozzle 1000 to disengage from the poppet seat 1053 and move to an open position, which causes the poppet 950 to disengage from the poppet seat 951 and move to an open position. Such actuation enables the nozzle 1000 to dispense cryogenic fluid that flows through the chamber 1005 of the nozzle 1000 into the chamber section 932 of the receptacle 900. The check 960 remains closed due to a pressure difference.

Once the pressure is equalized between the chamber 1005 of the nozzle 1000 and the chamber section 932 of the receptacle 900, the actuator 1080 is able to overcome the biasing force applied by the check spring 965 of the check 960 and push the check 960 to disengage from the seat seal 966 of the check seat 962 and into an open position. When the check 960 is in the open position, as illustrated in FIG. 48, cryogenic fluid is capable of flowing from the storage tank 22, through the chamber 1005 of the nozzle 1000, through both the chamber section 932 and the chamber section 934 of the chamber 930 of the receptacle 900, and into the fill tank 32.

FIGS. 49-66 depict another example receptacle 1100 and another example nozzle 1200 in accordance with the teachings herein. More specifically, FIGS. 49-60 illustrate mechanisms for securely coupling the nozzle 1200 to the receptacle 1100, and FIGS. 61-66 illustrate internal components of the nozzle 1200 and the receptacle 1100 for controlling the flow of cryogenic fluid between the storage tank 22 and the fill tank 32.

Figure 49:
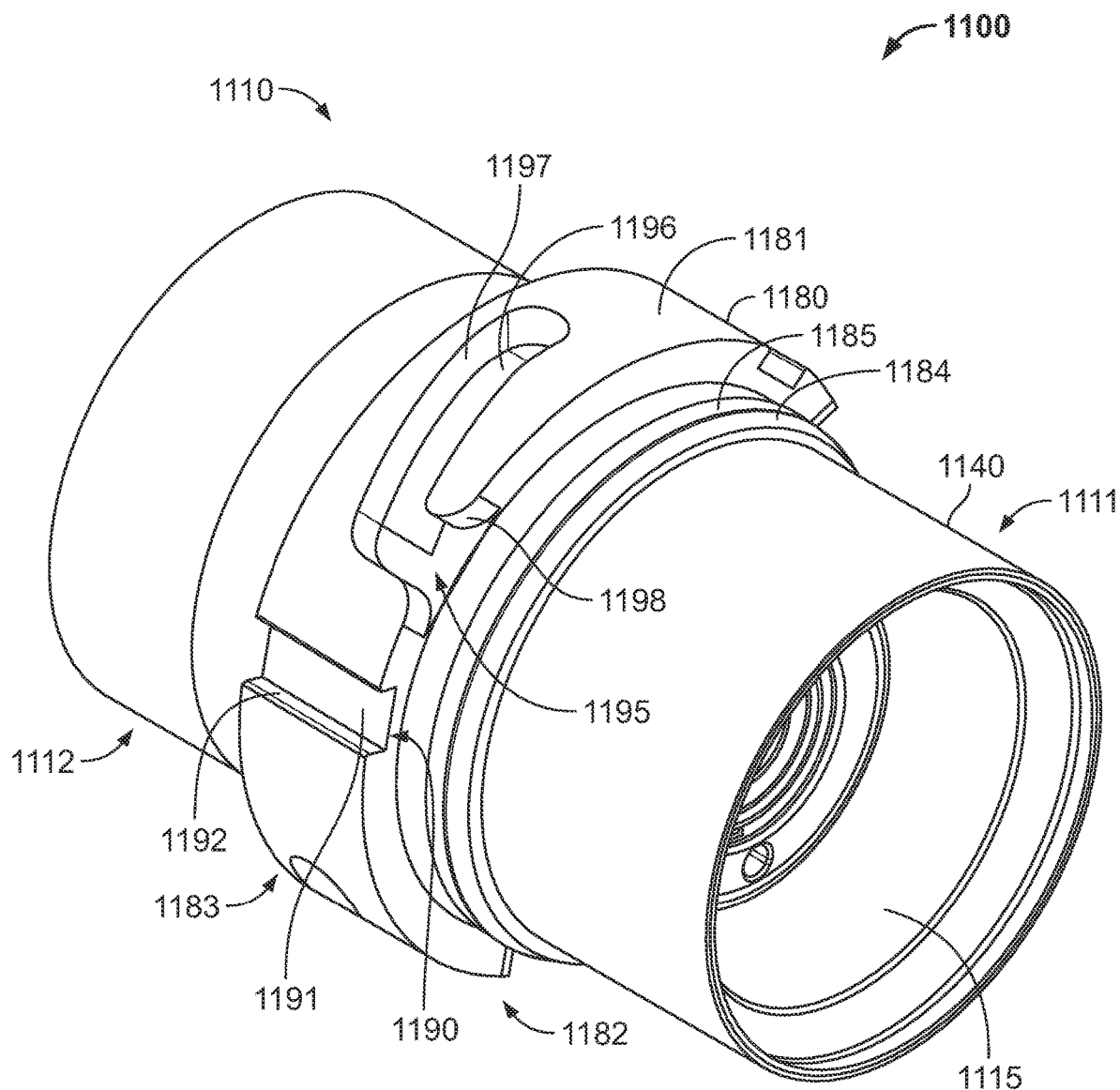
FIG. 49 is a perspective view of an example receptacle for transferring cryogenic fluid in accordance with the teachings herein.

As shown in FIG. 49, the receptacle 1100 includes a body 1110 that extends between a proximal end 1112 (also referred to as a "back end") and a distal end 1111 (also referred to as a "front end"). The body 1110 includes an outer shell 1140 and a sleeve 980. As disclosed below in greater detail with respect to FIG. 61, the body 1110 also includes interior walls 1113, 1114, 1115.

Returning to FIG. 49, a sleeve 1180 is positioned between and is offset from both the distal end 1111 and the proximal end 1112. The sleeve 1180 extends over a portion of and is coupled to the outer shell 1140 (e.g., via welding). The sleeve 1180 includes an outer surface 1181 and an inner surface that extend between a front end 1182 and a back end 1183 of the sleeve 1180. The inner surface engages and is coupled to the outer shell 1140 of the body 1110. The sleeve 1180 includes a front edge 1184 that is chamfered at the front end 1182. A seal 1185 (e.g., an O-ring) is positioned adjacent to the front edge 1184. The front edge 1184 is chamfered to facilitate radial alignment between coupling components of the receptacle 1100 and the nozzle 1200. The seal 1185 is positioned to facilitate a sealed coupling between the sleeve 1180 of the receptacle 1100 and an inner sleeve 1230 of the nozzle 1200. Returning to FIG. 49, the sleeve 1180 defines one or more guide slots 1190 and one or more coupling slots 1195 that are located along the outer surface 1181.

Each of the guide slots 1190 are defined by a recessed surface 1191 and opposing side surfaces 1192. The guide slots 1190 extend linearly in a direction parallel to the longitudinal axis of the receptacle 1100. The guide slots 1190 extend from the front end 1182 and toward the back end 1183 of the sleeve 1180. In the illustrated example, the guide slots 1190 extend to the back end 1183 of the sleeve 1180. The recessed surface 1191 is recessed relative to the outer surface 1181 of the sleeve 1180, and the side surfaces 1192 extend between the recessed surface 1191 and the outer surface 1181. Each of the guide slots 1190 has an opening adjacent to the front end 1182 of the sleeve 1180. That is, each of the guide slots 1190 has an opening along a front-facing surface located toward the front end 1182 of the sleeve 1180. The open end of each of the guide slots 1190 enables a respective guide extension 1233 of the nozzle 1200 to slide into the guide slots 1190 to rotationally align locking teeth 1215 of the nozzle 1200 with the coupling slots 1195 of the receptacle 1100. In the illustrated example, the guide slots 1190 are equidistantly spaced apart from each other circumferentially along the outer surface 1181 of the sleeve 1180. Further, in the illustrated example, the sleeve 1180 defines three guide slots 1190. In other examples, the sleeve 1180 may define more or fewer guide slots 1190.

Figure 54:
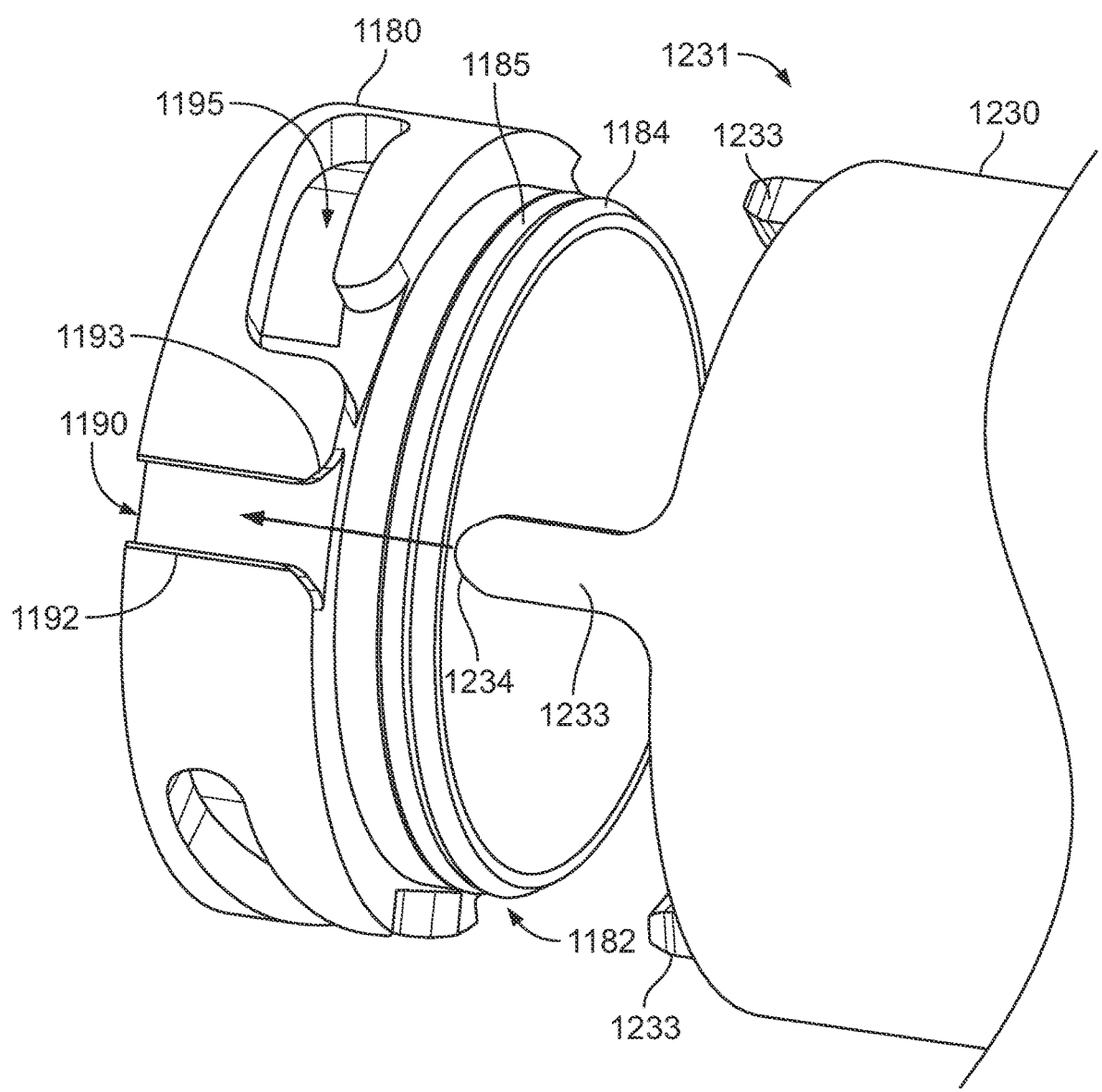
FIG. 54 depicts a first stage of the receptacle of FIG. 49 coupling to the nozzle of FIG. 50.

As shown in FIG. 54, the respective side surfaces 1192 and/or the front-facing defines beveled corners 1193 (e.g., chamfered corners) at the respective opening for each of the guide slots 1190. The beveled corners 1193 facilitate the respective guide extensions 1233 in entering the guide slot 1190 through the opening of the respective guide slots 1190. As shown in FIG. 56, a beveled edge 1194 (e.g., a chamfered edge) is located adjacent to the recessed surface 1196 at a base of the opening of each of the guide slots 1190 to facilitate radial alignment between guide slots 1190 and the respective guide extensions 1233.

Figure 55:
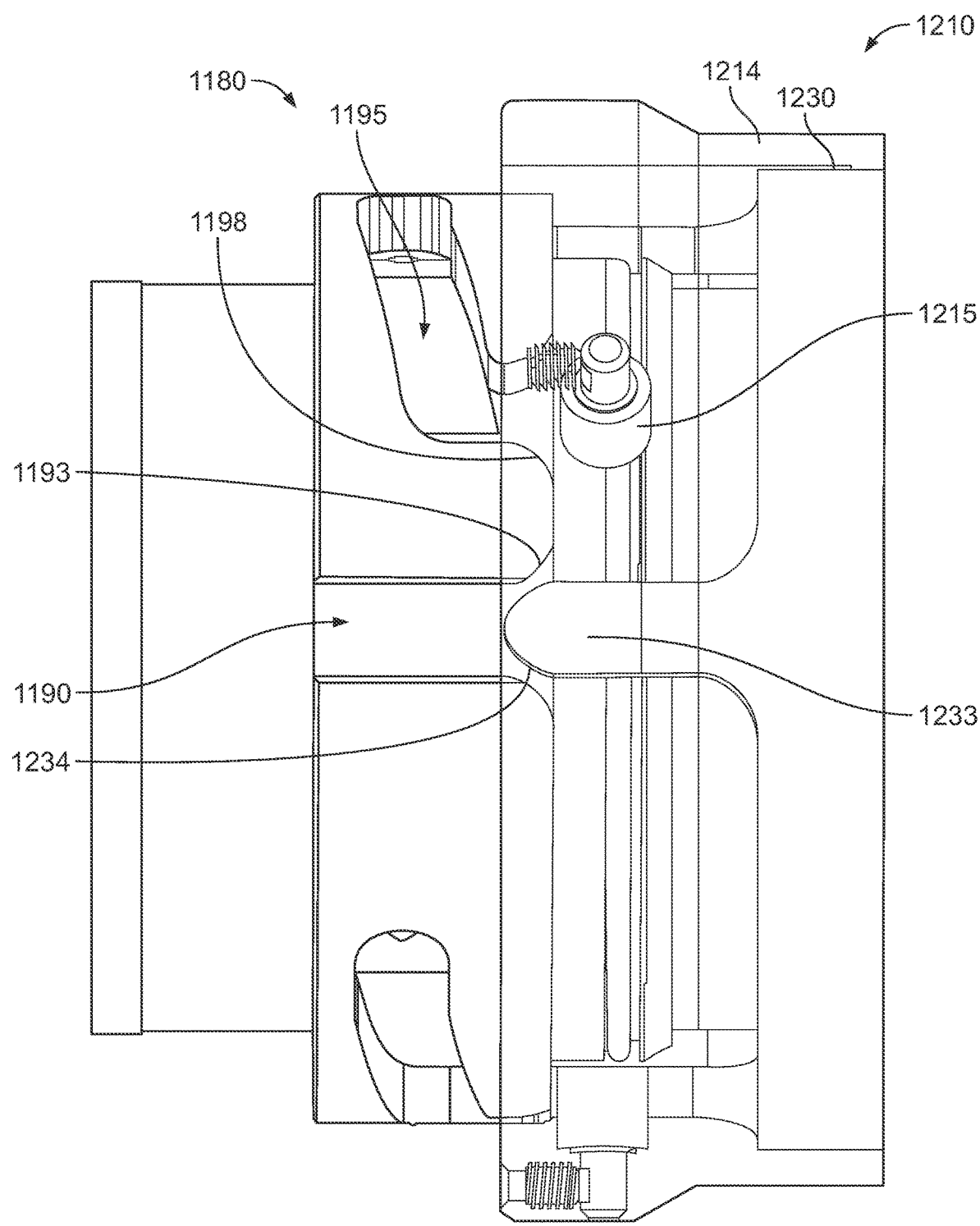
FIG. 55 depicts a second stage of the receptacle of FIG. 49 coupling to the nozzle of FIG. 50 with an outer sleeve of the locking assembly depicted as translucent for illustrative purposes.

Returning to FIG. 49, each of the coupling slots 1195 are defined by a recessed surface 1196 and one or more side surfaces 1197. The recessed surface 1196 is recessed relative to the outer surface 1181 of the sleeve 1180, and side surfaces 1197 extend between the recessed surface 1196 and the outer surface 1181. Each of the coupling slots 1195 has an opening adjacent to the front end 1182 of the sleeve 1180. That is, each of the coupling slots 1195 has an opening along the front-facing surface that is located toward the front end 1182 of the sleeve 1180. The open end of each of the coupling slots 1195 enables a respective of the locking teeth 1215 of the nozzle 1200 to slide into the coupling slots 1195 for securely coupling the nozzle 1200 to the receptacle 1100. For each of the coupling slots 1195 in the illustrated example, the respective side surfaces 1197 and/or the outer wall of the front end 1182 defines beveled corners 1198 (e.g., chamfered corners) at the respective opening. As shown in FIG. 55, the beveled corners 1198 facilitate the locking teeth 1215 in entering the coupling slots 1195 through the respective openings.

Each of the coupling slots 1195 are generally L-shaped and bend or curl in a particular direction to enable the locking teeth 1215 to securely couple the nozzle 1200 to the receptacle 1100. In the illustrated example, the coupling slots 1195 bend or curl in a clockwise direction. In other examples, the coupling slots 1195 may bend or curl in a counter-clockwise direction. In the illustrated example, the coupling slots 1195 are equidistantly spaced apart from each other circumferentially along the outer surface 1181 of the sleeve 1180. Further, in the illustrated example, the sleeve 1180 defines three coupling slots 1195. In other examples, the sleeve 1180 may define more or fewer coupling slots 1195.

Figure 50:
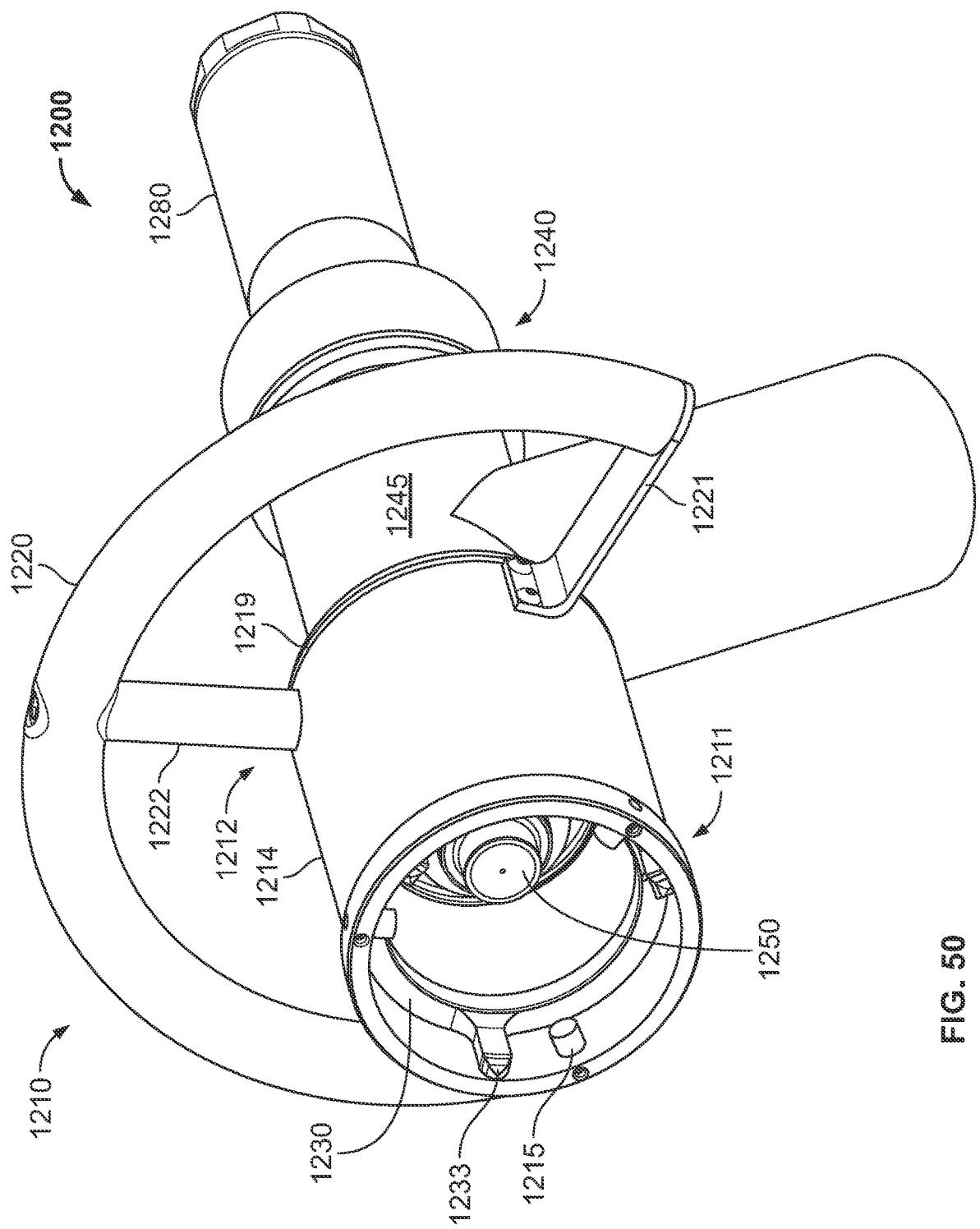
FIG. 50 is a perspective view of an example nozzle for transferring cryogenic fluid with the receptacle of FIG. 49 in accordance with the teachings herein.
Figure 51:
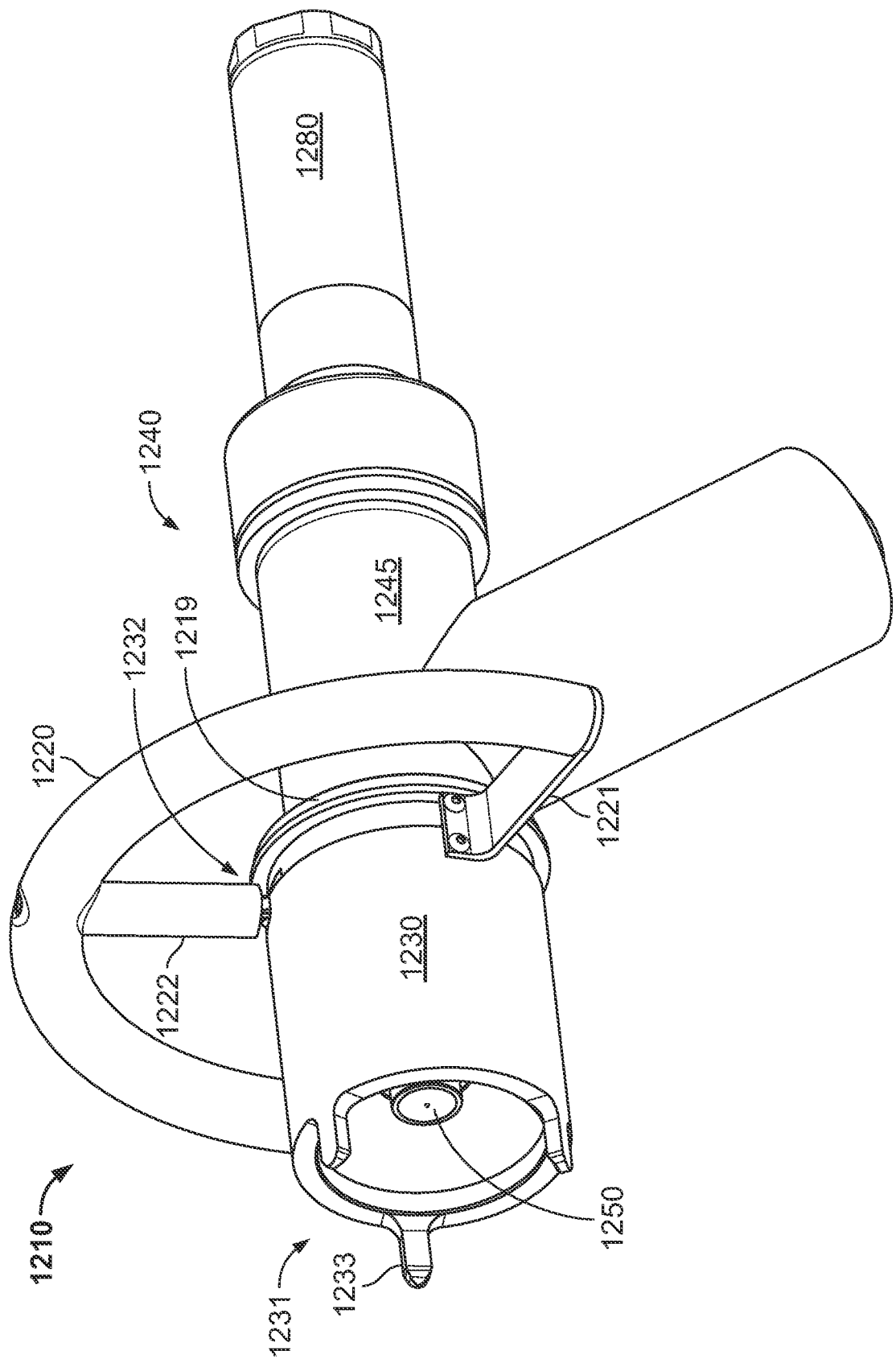
FIG. 51 is another perspective view of the nozzle of FIG. 50 with an outer sleeve of a locking assembly of the nozzle removed.
Figure 52:
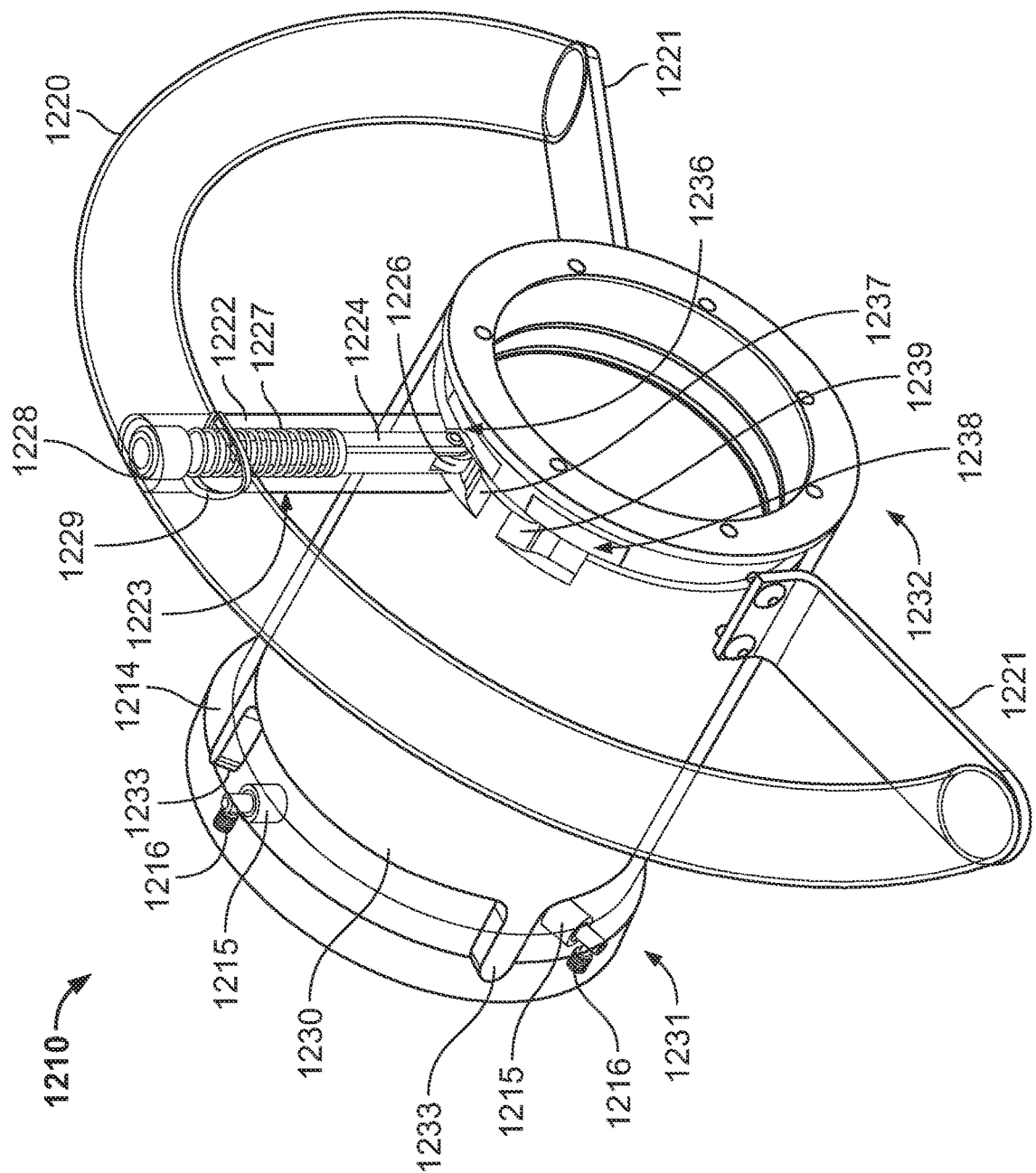
FIG. 52 is a perspective view of a locking assembly of the nozzle of FIG. 50 with an outer sleeve, a handle, and connecting posts of the locking assembly depicted as translucent for illustrative purposes.
Figure 53:
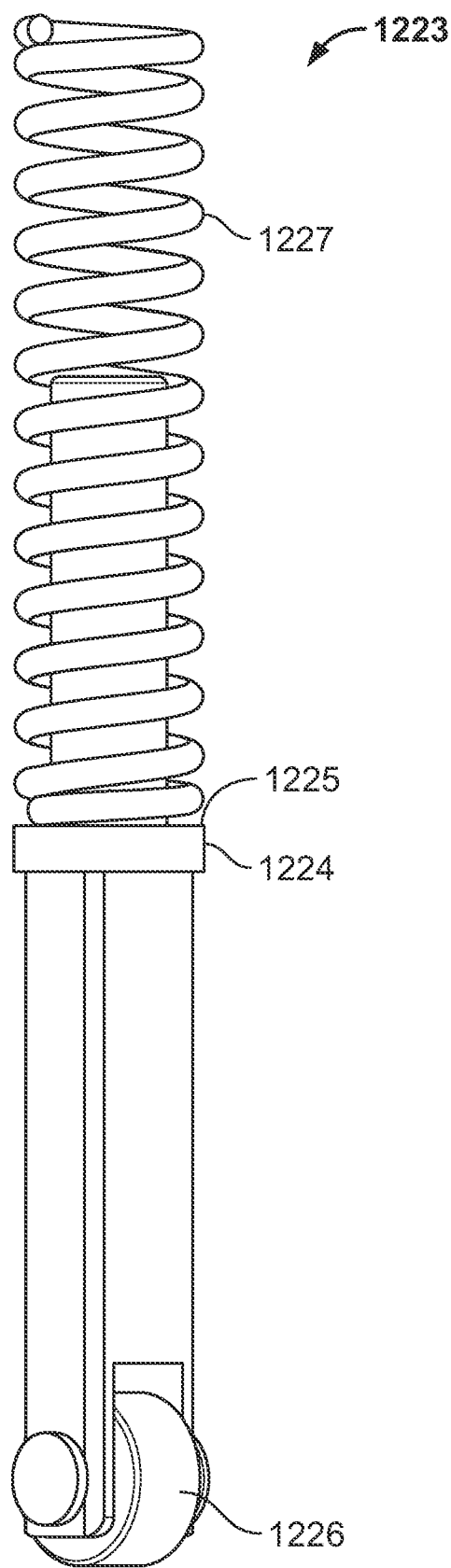
FIG. 53 depicts a redundant locking mechanism of the locking assembly of FIG. 52.

FIGS. 50-53 a locking assembly 1210 of the nozzle 1200. More specifically, FIG. 50 is a perspective view of the nozzle 1200 with the locking assembly 1210. FIG. 51 is another perspective view of the nozzle 1200 with an outer sleeve 1214 of the locking assembly 1210 to more clearly show other features of the locking assembly 1210. FIG. 52 is a perspective view of the locking assembly 1210, and FIG. 53 is a perspective view of a redundant locking mechanism 1223 of the locking assembly 1210.

As shown in FIGS. 50-51, the nozzle 1200 includes the locking assembly 1210, a body 1240, and an actuator 1280. The actuator 1280 is coupled to and extends from a back end of the body 1240. The locking assembly 1210 is coupled to an outer shell 1245 of the body 1240 at a front end of the body 1240. The locking assembly 1210 includes an outer sleeve 1214, a sleeve ring 1219, a handle 1220, one or more locking teeth 1215, the redundant locking mechanism 1223 (FIG. 52), and an inner sleeve 1230. The locking assembly 1210 also includes a distal end 1211 and a proximal end 1212.

Figure 62:
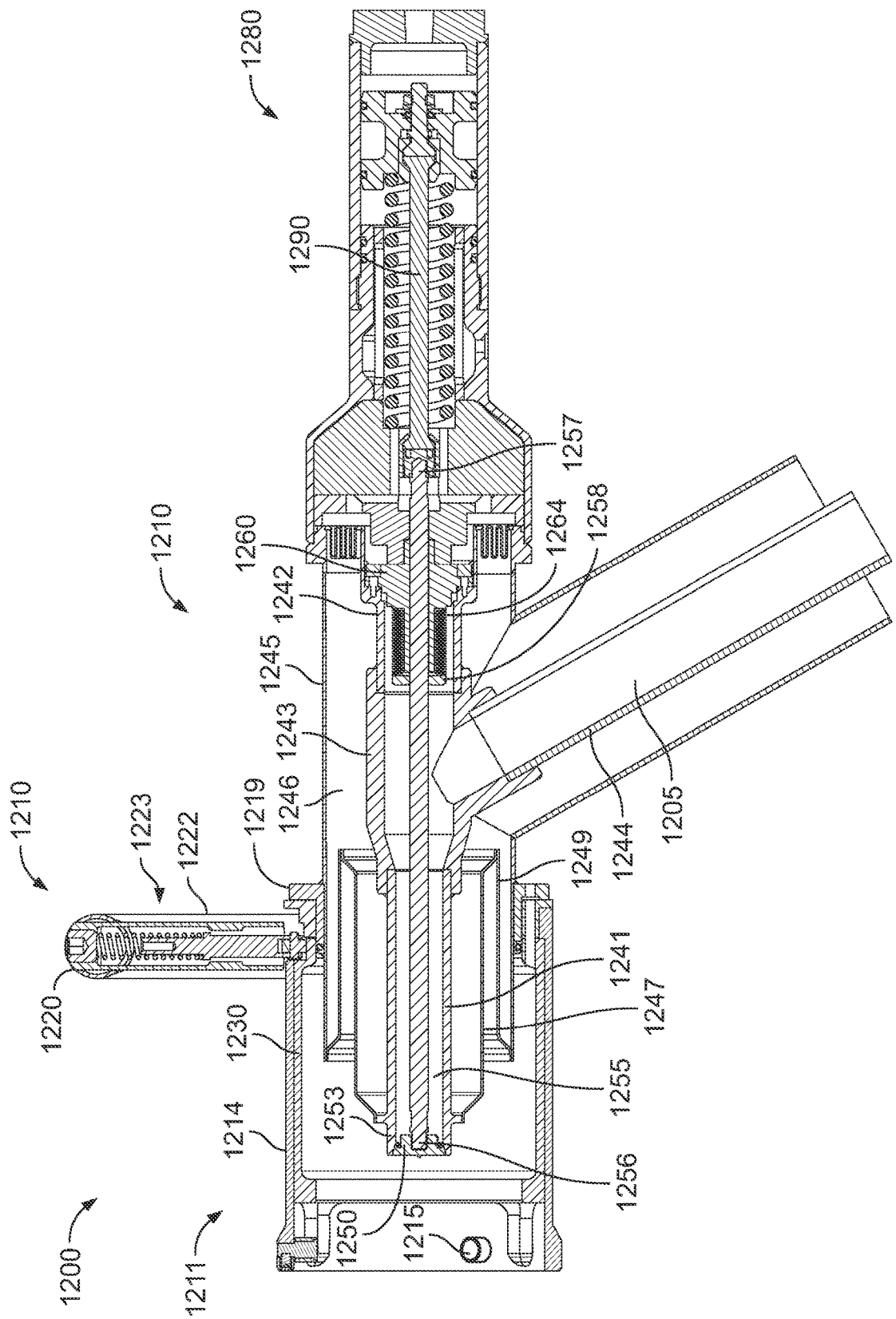
FIG. 62 is a cross-sectional view of the nozzle of FIG. 50.
Figure 63:
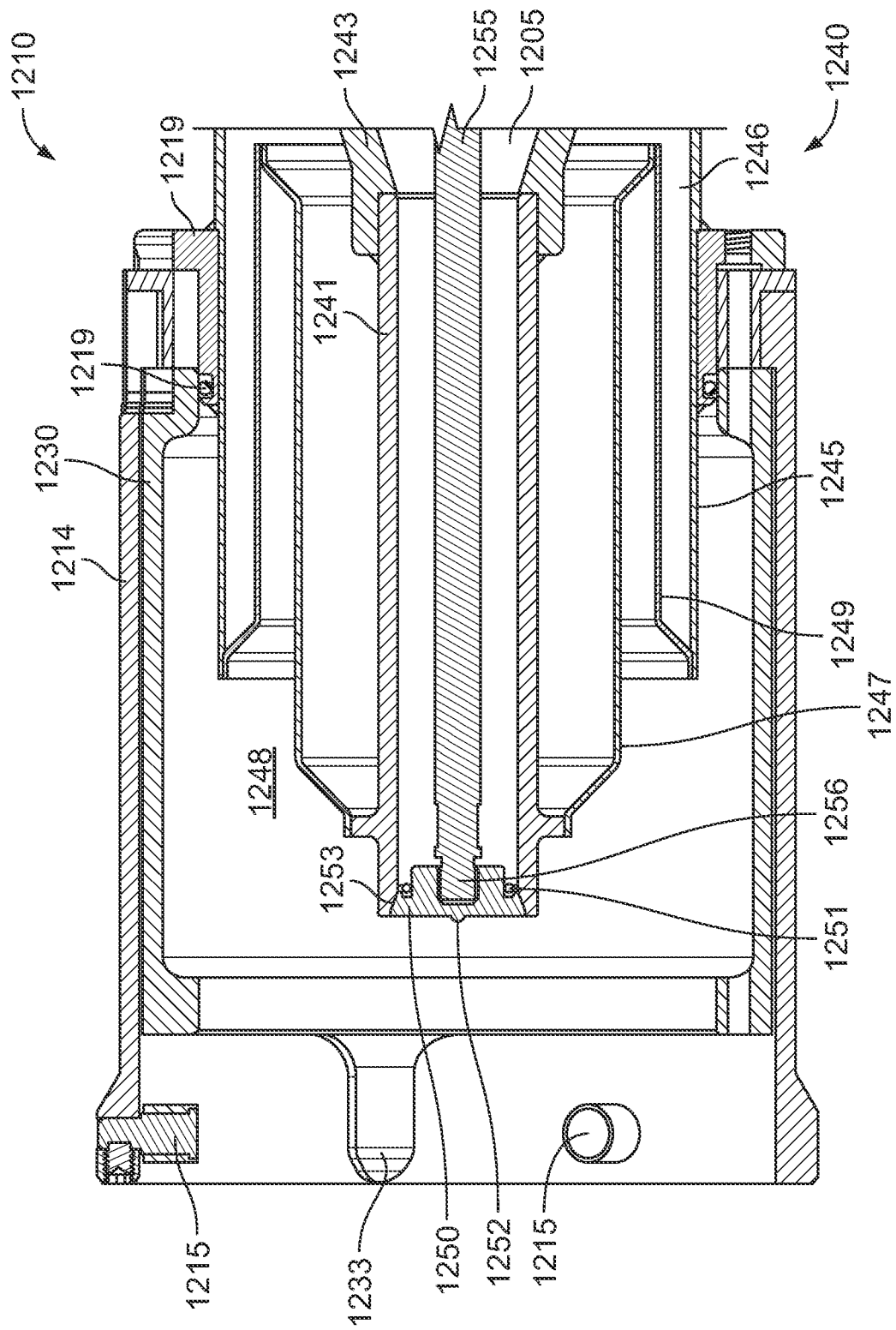
FIG. 63 is a magnified, cross-sectional view of a coupling end of the nozzle of FIG. 50.

As shown in FIG. 62, the proximal end 1212 of the locking assembly 1210 is coupled to the outer shell 1245 toward the front end of the body 1240, and the distal end 1211 extends longitudinally beyond the front end of the body 1240. The sleeve ring 1219 and the inner sleeve 1230 of the locking assembly 1210 are arranged such that respective inner surfaces of the sleeve ring 1219 and the inner sleeve 1230 engage an outer surface of the outer shell 1245. The sleeve ring 1219 is fixedly coupled to the outer shell 1245 (e.g., via welding). The sleeve ring 1219 and the inner sleeve are also arranged in a side-by-side manner longitudinally along the outer shell 1245. The inner sleeve 1230 is fixedly coupled to the outer shell 1245, for example, by fastening a proximal end 1232 of the inner sleeve 1230 to a front side of the sleeve ring 1219 (e.g., via fasteners). As shown in FIG. 63, the locking assembly 1210 includes a seal 1218 that forms a sealed connection between the sleeve ring 1219 and the inner sleeve 1230. Returning to FIG. 62, a distal end 1231 of the inner sleeve 1230 extends longitudinally beyond the front end of the outer shell 1245. The outer sleeve 1214 extends over and is rotatably coupled to the inner sleeve 1230 and the sleeve ring 1219. An inner surface of the outer sleeve 1214 rotatably engages portions of outer surfaces of the inner sleeve 1230 and/or the sleeve ring 1219. In the illustrated example, the outer sleeve 1214 includes an inner lip at its proximal end that is received by a groove defined by the sleeve ring 1219 and/or the proximal end 1232 of the inner sleeve 1230 to prevent axial movement of the outer sleeve 1214 relative to the inner sleeve 1230.

Returning to FIGS. 50-51, the locking teeth 1215 are fixedly positioned along an inner surface of the outer sleeve 1214 adjacent to a distal end of the outer sleeve 1014. Further, the locking teeth 1215 are spaced apart from the distal end 1231 of the inner sleeve 1230. As shown in FIG. 52, each of the locking teeth 1215 are coupled to the outer sleeve 1214 via one or more fasteners 1216. The locking teeth 1215 are configured to rotatably slide within the coupling slots 1195 of the receptacle 1100 to securely couple the nozzle 1200 to the receptacle 1100. In the illustrated example, the locking teeth 1215 are equidistantly spaced apart from each other circumferentially along the inner surface of the outer sleeve 1214. Further, in the illustrated example, the locking assembly 1210 includes three locking teeth 1215. In other examples, the locking assembly 1210 may include more or fewer locking teeth 1215.

Returning to FIG. 50, the handle 1220 is fixedly coupled to the proximal end of the outer sleeve 1214 to facilitate the operator 40 in rotating the outer sleeve 1214 relative to the inner sleeve 1230. In the illustrated example, the handle 1220 extends around a portion of the circumference of the outer sleeve 1214. For example, the handle 1220 is in the shape of a partial torus. One or more posts 1221 (also referred to as "support posts") extend radially between and securely couple the handle 1220 to the outer sleeve 1214. In the illustrated example, the locking assembly 1210 includes two posts 1221, each of which from a respective end of the handle 1220 and radially inward to the outer sleeve 1214. The locking assembly 1210 also includes a post 1222 that extends radially between the handle 1220 and the outer and inner sleeves 1214, 1230. In the illustrated example, the post 1222 is positioned circumferentially between the posts 1221. As shown in FIG. 52, the post 1222 (also referred to as a "redundant locking post" or a "hollow post") is hollow and houses the redundant locking mechanism 1223.

Turning to FIG. 51, the inner sleeve 1230 of the locking assembly 1210 includes the distal end 1231 and a proximal end 1232. The proximal end 1232 of the inner sleeve 1230 is positioned adjacent to the sleeve ring 1219 and the post 1222. The inner sleeve 1230 includes the guide extensions 1233 that are integrally formed with the cylindrical body of the inner sleeve 1230. The guide extensions 1233 extend longitudinally from the distal end 1231 of the inner sleeve 1230. As disclosed below in greater detail with respect to FIGS. 54-56, the guide extensions 1233 are configured to be slidably received by the guide slots 1190 of the receptacle 1100 to facilitate rotational alignment between the nozzle 1200 and the receptacle 1100. For example, the guide extensions 1233 extend longitudinally beyond the locking teeth 1215 to enable the guide extensions 1233 to be received by the guide slots 1190 before the locking teeth 1215 are received by the coupling slots 1195 and, thus, facilitate rotational alignment between the locking teeth 1215 and the coupling slots 1195. The guide extensions 1233 are equidistantly spaced apart from each other circumferentially along the body of the inner sleeve 1230. Further, in the illustrated example, the inner sleeve 1230 includes three guide extensions 1233. In other examples, the inner sleeve 1230 may include more or fewer guide extensions 1233.

The locking assembly 1210 is further depicted in FIG. 52. For example, the guide extensions 1233 extend from the distal end 1231 of the inner sleeve 1230. The locking teeth 1215 are coupled to the distal end of the outer sleeve 1214 via the fasteners 1216. The guide extensions 1233 are circumferentially spaced from the locking teeth 1215 by at least a distance that prevents the guide extensions 1233 from interfering with rotational movement of the locking teeth 1215.

Adjacent to the proximal end 1232 of the inner sleeve 1230, the inner sleeve 1230 defines grooves 1236, 1238 along its outer surface. As shown in FIG. 52, the grooves 1236, 1238 are proximate to the post 1222. The grooves 1236, 1238 are positioned circumferentially next to each other in a side-by-side manner. The grooves 1236, 1238 are spaced apart from each other with an intermediate portion of an outer surface of the inner sleeve 1230 located between the grooves 1236, 1238. The groove 1236 (also referred to as a "first groove" or an "unlocked groove") is associated with an unlocked position of the redundant locking mechanism 1223, and the groove 1238 (also referred to as a "second groove" or a "locked groove") is associated with a locked position of the redundant locking mechanism 1223. A ramp 1237 (also referred to as a "first ramp" or an "unlocked ramp") extends between the groove 1236 and the intermediate portion of the outer surface positioned between the grooves 1236, 1238. A ramp 1239 (also referred to as a "second ramp" or a "locked ramp") extends between the groove 1238 and the intermediate portion of the outer surface positioned between the grooves 1236, 1238.

The redundant locking mechanism 1223 is configured to further securely couple the nozzle 1200 to the receptacle 1100. The redundant locking mechanism 1223 is housed in the post 1222 that is located adjacent to the grooves 1236, 1238. As shown in FIGS. 52-53, the redundant locking mechanism 1223 includes a stem 1224, a wheel 1226, a spring 1227, and a cap 1228. The post 1222 includes a first opening adjacent to the handle 1220 and an opposing second opening adjacent to the outer and inner sleeves 1214, 1230. The cap 1228 couples (e.g., threadably) to and encloses the first opening to securely retain the redundant locking mechanism 1223 in the post 1222. The redundant locking mechanism 1223 also includes a washer 1229 to facilitate a secured connection. The spring 1227 engages and extends between the cap 1228 and a ledge 1225 of the stem 1224. The wheel 1226 is coupled to the stem 1224 adjacent to the second opening. The wheel 1226 extends at least partially from the second opening of the post 1222 and engages an outer surface of the inner sleeve 1230. The outer sleeve 1214 defines an opening adjacent to the second opening of the post 1222 through which the wheel 1226 extends to engage the inner sleeve 1230. As disclosed below in greater detail, the wheel 1226 is configured to roll along the outer surface of inner sleeve 1230 between the grooves 1236, 1238.

As shown in FIG. 53, the stem 1224 of the redundant locking mechanism 1223 includes a first end and a second end. The ledge 1225 of the stem 1224 is located between the first end and the second end of the stem 1224. In the illustrated example, the first end extends through a portion of the spring 1227. The first end is spaced apart from the cap 1228 to enable the spring 1227 to compress. In the illustrated example, the second end of the stem 1224 includes prongs. The wheel 1226 is coupled to and positioned between the prongs of the stem 1224.

FIGS. 54-60 depict a coupling sequence as the nozzle 1200 is securely coupled to the receptacle 1100 via the locking assembly 1210. FIG. 54 depicts the inner sleeve 1230 of the nozzle 1200 and the sleeve 1180 of the receptacle 1100 as the nozzle 1200 is positioned in front of the receptacle 900 for coupling purposes. To couple the nozzle 1200 to the receptacle 1100, the guide extensions 1233 of the inner sleeve 1230 are aligned axially with the guide slots 1190 of the sleeve 1180. The nozzle 1200 is moved toward the receptacle 1100 such that the guide extensions 1233 are slidably received by the guide slots 1190. That is, the guide slots 1190 of the receptacle 1100 and the guide extensions 1233 of the nozzle 1200 are configured to align the nozzle 1200 and the receptacle 1100 with respect to each other for the coupling sequence. As depicted in FIG. 54, the beveled corners 1193 adjacent to the openings of the respective guide slots 1190 and rounded corners 1234 of the respective guide extensions 1233 have rounded surfaces to further guide the guide extensions 1233 into the guide slots 1190.

FIG. 55 depicts the locking assembly 1210 of the nozzle 1200 and the sleeve 1180 of the receptacle 1100 as the guide extensions 1233 enter the respective guide slots 1190. As illustrated in FIG. 55, the locking teeth 1215 are aligned axially with the coupling slots 1195 of the receptacle 1100 when the guide extensions 1233 are received by the guide slots 1190. The locking teeth 1215 approach the openings of the respective coupling slots 1195 as the guide extensions 1233 are slid further into the respective guide slots 1190. The locking teeth 1215 of the illustrated example are roller bearings. The beveled corners 1198 adjacent to the openings of the respective coupling slots 1195 and the roller bearings have rounded surfaces to further guide the locking teeth 1215 into the coupling slots 1195.

FIGS. 55-56 depict one of the guide extensions 1233 of the inner sleeve 1230 of the nozzle 1200 entering a respective one of the guide slots 1190 of the sleeve 1180 of the receptacle 1100. The rounded inner surface 1235 of each of the guide extensions 1233 is configured to slidingly engage the beveled edge 1194 at the opening of each of the respective guide slots 1190 to facilitate radial alignment between the guide extensions 1233 and the guide slots 1190 as the guide extensions 1233 enter through the openings of the respective guide slots 1190. Additionally, an inner surface at a base of each of the respective guide extensions 1233 is configured to slidingly engage the front edge 1184 of the sleeve 1180 that is chamfered as the guide extensions 1233 enter the guide slots 1190 to further facilitate radial alignment between the guide extensions 1233 and the guide slots 1190.

Once the locking teeth 1215 are positioned at an opening of the respective openings of the respective coupling slots 1195, the nozzle 1200 is slid longitudinally further toward the receptacle 1100 to cause the locking teeth 1215 to slide a predetermined distance (e.g., about 0.25 inches) into the coupling slots 1195. The operator 40 then uses the handle 1220 to rotate the outer sleeve 1214 relative to the inner sleeve 1230 in a first rotational direction. Rotation of the outer sleeve 1214 causes the locking teeth 1215, which are fixedly coupled to the outer sleeve 1214, to also rotate. As the locking teeth 1215 rotate, the locking teeth 1215 travel within the bent, curled, and/or curved path of the respective coupling slots 1195. When the locking teeth 1215 rotate a predefined angle (e.g., about 15 degrees) within the coupling slots 1195, the inner surface at the base of each of the respective guide extensions 1233 engages the seal 1185 at the front end 1182 of the sleeve 1180 to form a sealed connection between the inner sleeve 1230 of the nozzle 1200 and the sleeve 1180 of the receptacle 1100.

Figure 65:
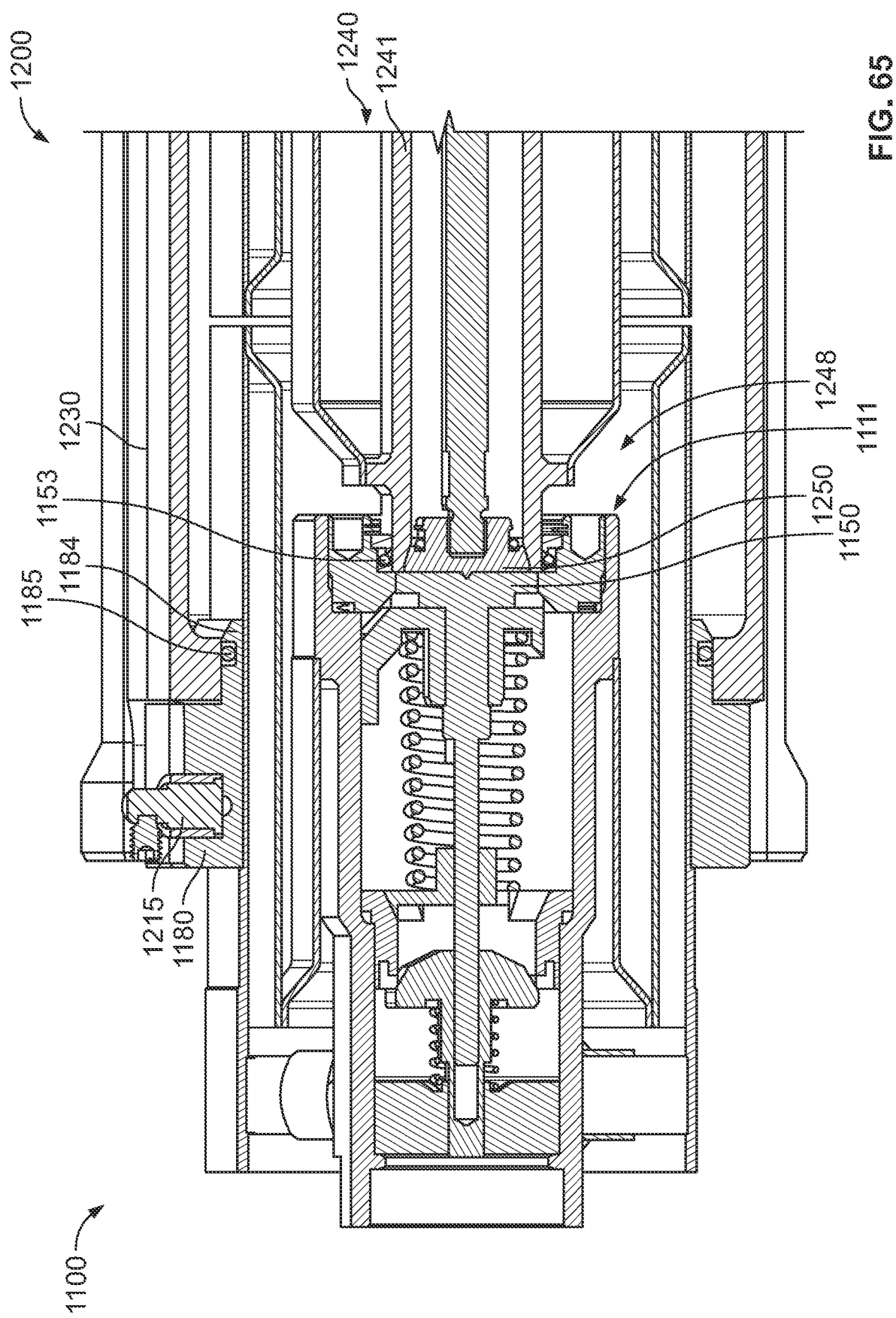
FIG. 65 is a magnified, cross-sectional view of a portion of the nozzle of FIG. 50 and a portion of the receptacle of FIG. 49 coupled together in a closed state with an outer sleeve of the locking assembly depicted as translucent for illustrative purposes.

Subsequently, the outer sleeve 1214 is further rotated (e.g., a total rotation of about 45 degrees) until each of the locking teeth 1215 reaches a locked position at an enclosed end of a respective one of the coupling slots 1195. That is, in the illustrated example, the coupling slots 1195 are configured to enable the locking teeth 1215 to rotate about 45 degrees within the coupling slots 1195. The locking teeth 1215 securely hold the nozzle 1200 to the receptacle 1100 in the locked position. When the locking teeth 1215 have been rotated to the locked position, a seat seal 1153 of the receptacle 1100 sealingly engages a front end of the body 1240 of the nozzle 1200 to form a sealed connection between the chamber 1130 of the receptacle 1100 and a chamber 1205 of the nozzle 1200 through which cryogenic fluid is to flow. FIG. 65 depicts the seal 1185 engaging the inner sleeve 1230 and the seat seal 1153 engaging the body segment 1241 of the body 1240 when the locking assembly is in the locked position. The seal 1185 (also referred to as a "vacuum seal") engages the inner sleeve 1230 before the seat seal 1153 engages the body 1240 to allow for the recovery of any trapped fluid (e.g., hydrogen) without being release to the atmosphere during subsequent disconnection between the nozzle 1200 and the receptacle 1100.

Additionally, rotation of the outer sleeve 1214 causes the redundant locking mechanism 1223 to transition from an unlocked position to a locked position. For example, rotation of the outer sleeve 1214 relative to the inner sleeve 1230 simultaneously causes both the locking teeth 1215 and the redundant locking mechanism 1223 to move into respective locked positions. FIGS. 57-60 depict the redundant locking mechanism 1223 transitioning from an unlocked position to the locked position. In the unlocked position, the wheel 1226 of the redundant locking mechanism 1223 securely rests in the groove 1236. The spring 1227 biases the stem 1224 and, in turn, the wheel 1226 in a direction toward the groove 1236 to retain the redundant locking mechanism 1223 in the unlocked position when the outer sleeve 1214 is not being rotated. To transition the redundant locking mechanism 1223 from the unlocked position to the locked position, the operator 40 uses the handle 1220 to rotate the outer sleeve 1214 relative to the inner sleeve 1230. Because the post 1222 is fixedly coupled to the handle 1220 and the redundant locking mechanism 1223 is housed in the post 1222, the redundant locking mechanism 1223 rotates about the inner sleeve 1230 as the operator 40 rotates the outer sleeve 1214 via the handle 1220.

As the operator 40 rotates the outer sleeve 1214, the applied rotational force causes the wheel 1226 to move in a direction toward the ramp 1237. Additionally, the applied force overcomes the biasing force of the spring 1227, which causes the stem 1224 to retract inward. The retraction of the stem 1224 and the continued application of the rotational force enables the wheel 1226 to roll onto the ramp 1237 in a first intermediate position shown in FIG. 57. That is, the wheel 1226 rolls along the ramp 1237 to leave the unlocked position.

Figure 58:
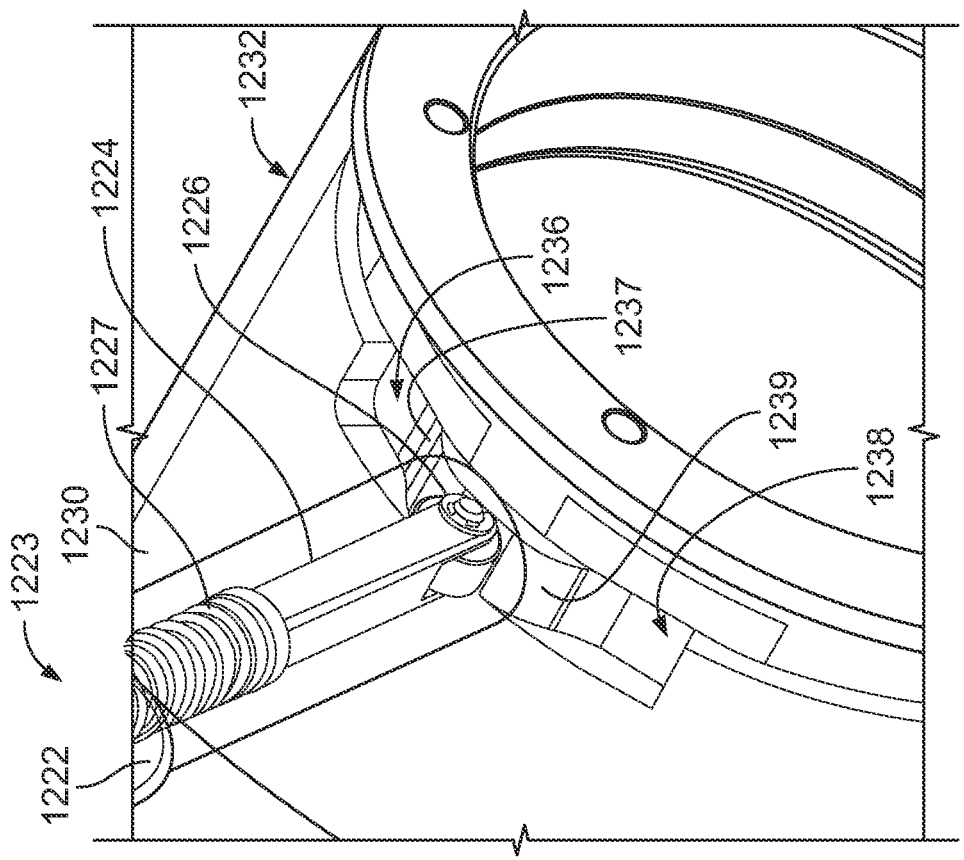
FIG. 58 depicts the redundant locking mechanism of FIG. 53 in a first intermediate state with an outer sleeve and a post of the locking assembly depicted as translucent for illustrative purposes.
Figure 57:
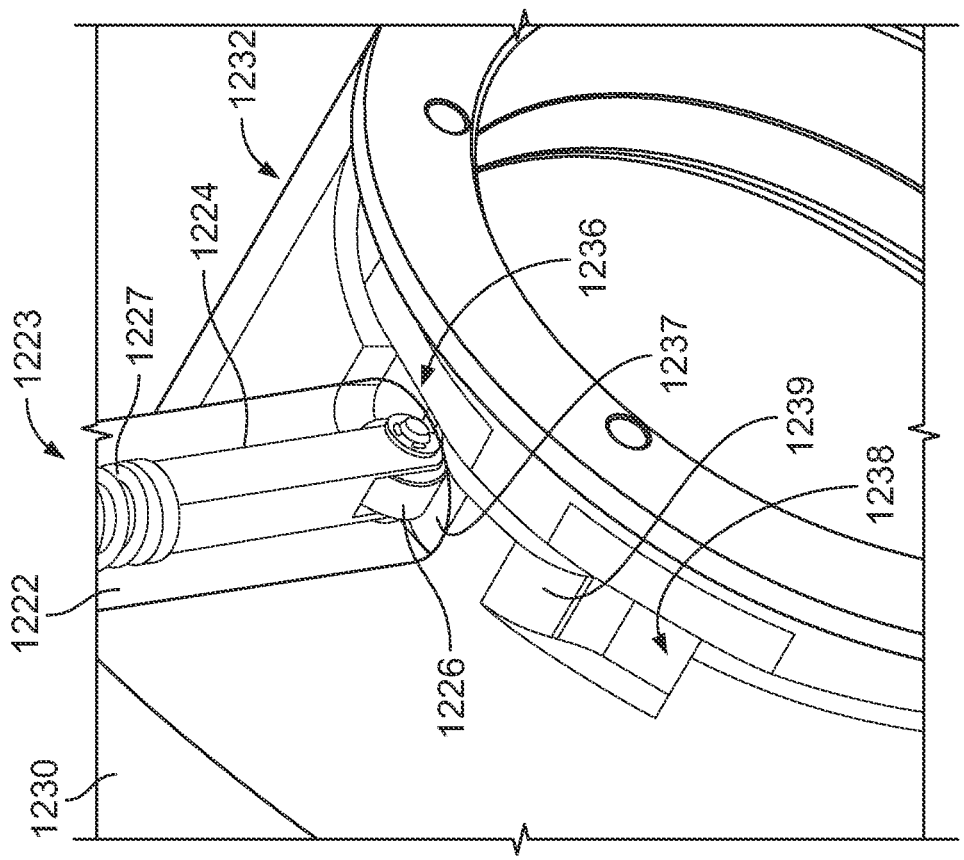
FIG. 57 depicts the redundant locking mechanism of FIG. 53 in an unlocked state with an outer sleeve and a post of the locking assembly depicted as translucent for illustrative purposes.
Figure 60:
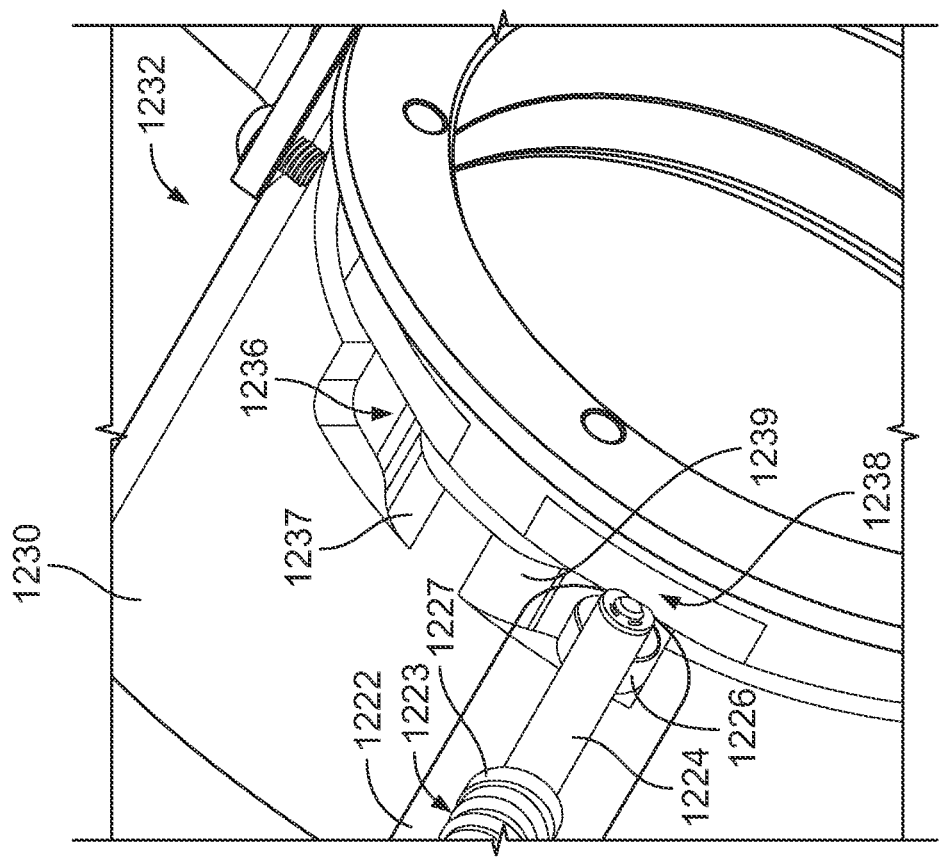
FIG. 60 depicts the redundant locking mechanism of FIG. 53 in a locked state with an outer sleeve and a post of the locking assembly depicted as translucent for illustrative purposes.
Figure 59:
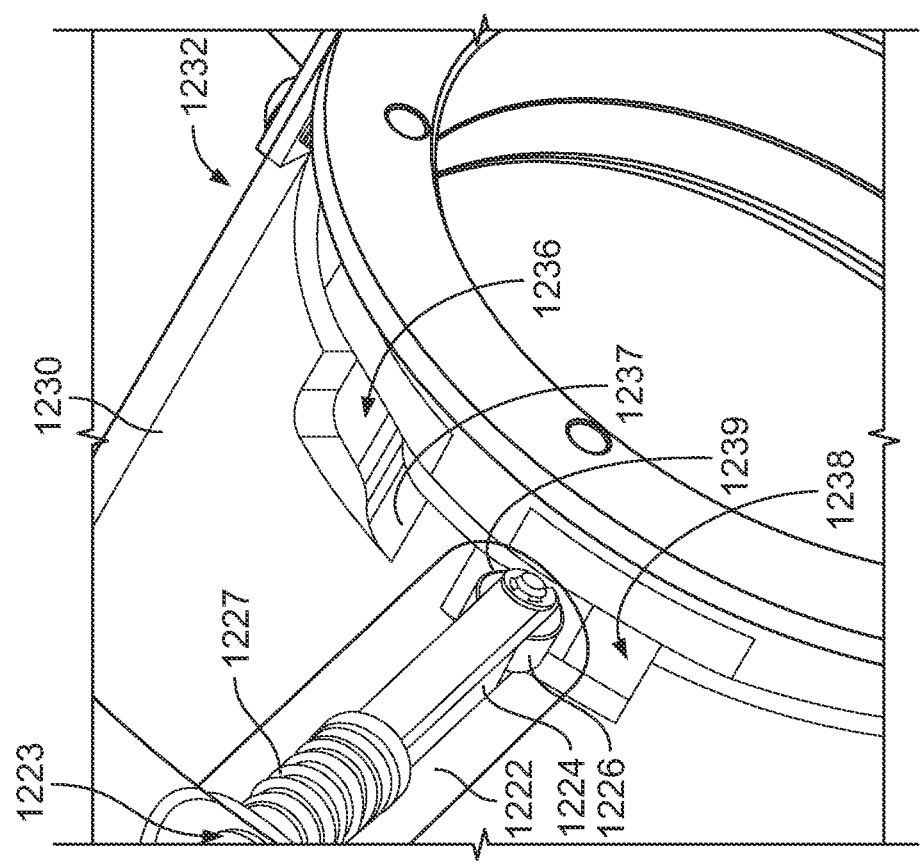
FIG. 59 depicts the redundant locking mechanism of FIG. 53 in a second intermediate state with an outer sleeve and a post of the locking assembly depicted as translucent for illustrative purposes.

The continued application of the rotational force causes the stem 1224 to further retract inward and the wheel 1226 to roll onto the portion of the outer surface of the inner sleeve 1230 that is located between the grooves 1236, 1238. FIG. 58 depicts the redundant locking mechanism 1223 at which the wheel 1226 engages the outer surface of the inner sleeve 1230. As the outer sleeve 1214 continues to rotate, the wheel 1226 rolls onto the ramp 1239 and into a third intermediate position shown in FIG. 59. The stem 1224 partially extends outward as the redundant locking mechanism 1223 transitions from the second intermediate position to the third intermediate position. Additionally, further rotation of the outer sleeve 1214 causes the wheel 1226 to roll into the groove 1238 and to the locked position shown in FIG. 60. In the locked position, the wheel 1226 of the redundant locking mechanism 1223 securely rests in the groove 1238. The spring 1227 biases the stem 1224 and, in turn, the wheel 1226 in a direction toward the groove 1238 to retain the redundant locking mechanism 1223 in the locked position when the outer sleeve 1214 is not being rotated. A wall opposite the groove 1238 prevents the wheel 1226 and, in turn, the redundant locking mechanism 1223 from traveling beyond the locked position. Similarly, a wall opposite the groove 1236 prevents the wheel 1226 and, in turn, the redundant locking mechanism 1223 from traveling beyond the unlocked position.

To decouple the nozzle 1200 from the receptacle 1100, the operator 40 rotates the outer sleeve 1014 in a second rotational direction opposite the first rotational direction so that (1) the locking teeth 1215 slide to the openings of the respective coupling slots 1195 and (2) the wheel 1226 of the redundant locking mechanism 1223 moves back into the groove 1236 associated with the respective unlocked position. Subsequently, the operator 40 pulls the nozzle 1200 away from the receptacle 900 until the guide extensions 1233 are removed from the guide slots 1190.

Figure 61:
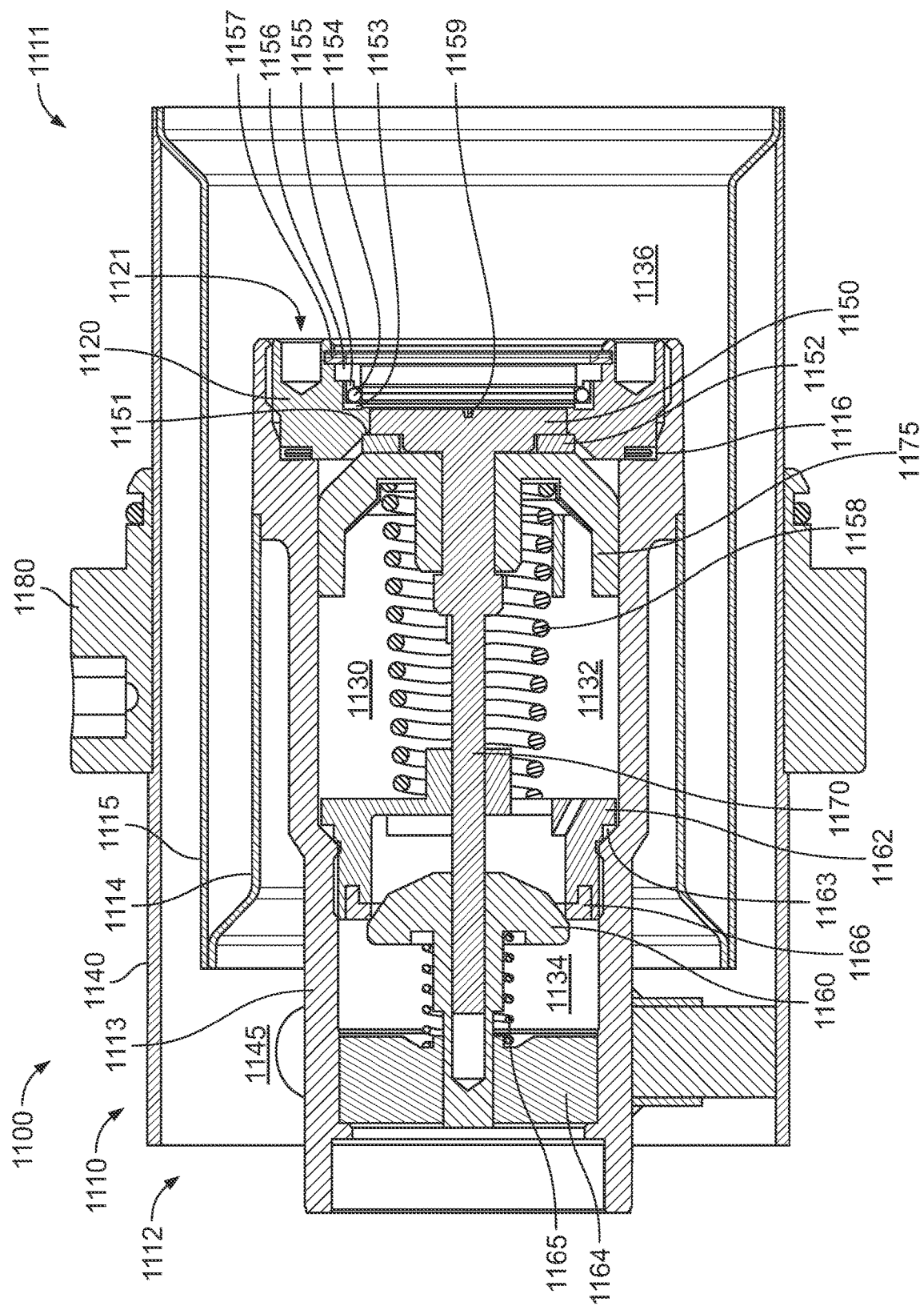
FIG. 61 is a cross-sectional view of the receptacle of FIG. 49.
Figure 64:
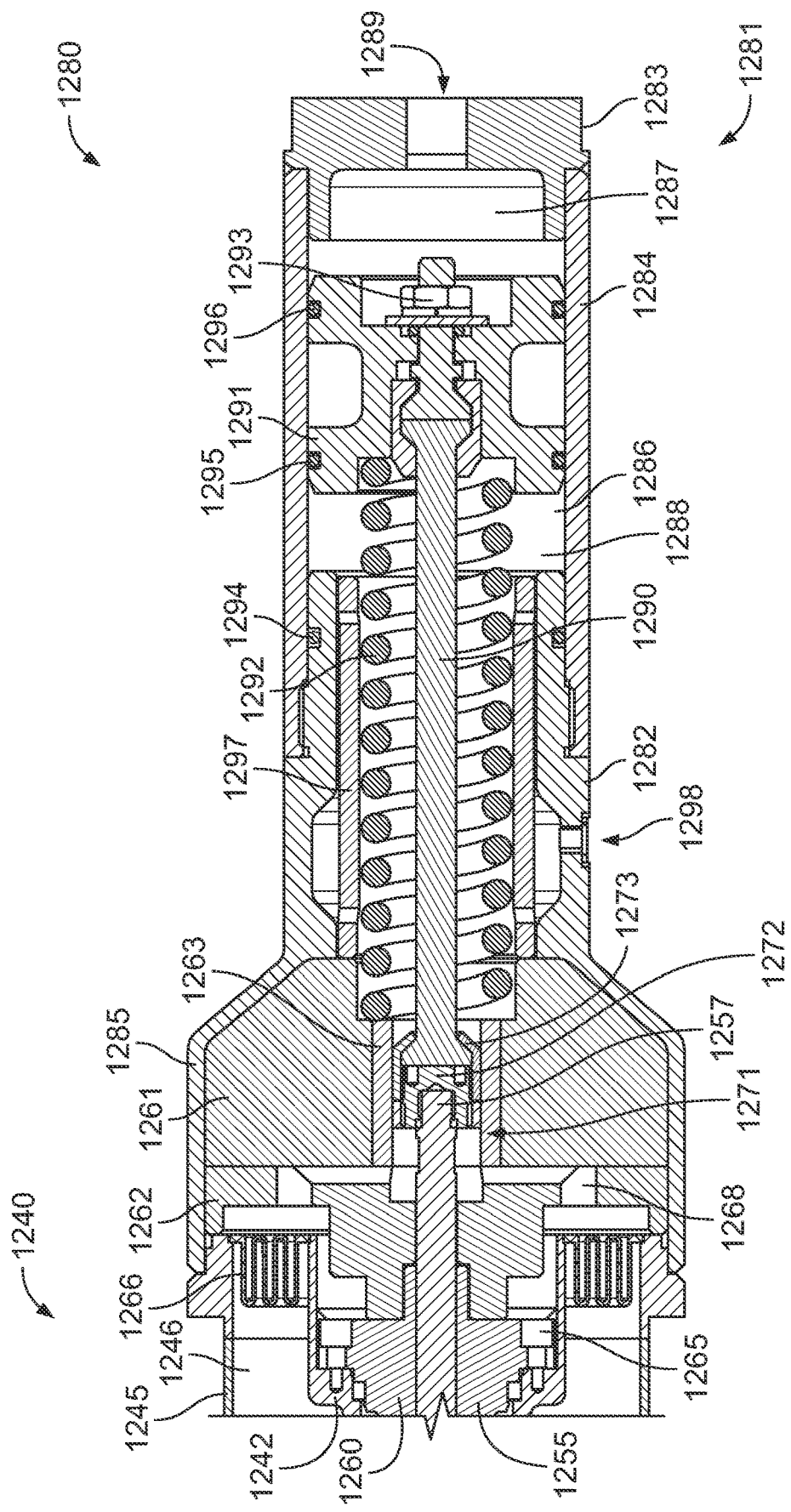
FIG. 64 is a magnified, cross-sectional view of an actuator of the nozzle of FIG. 50.
Figure 66:
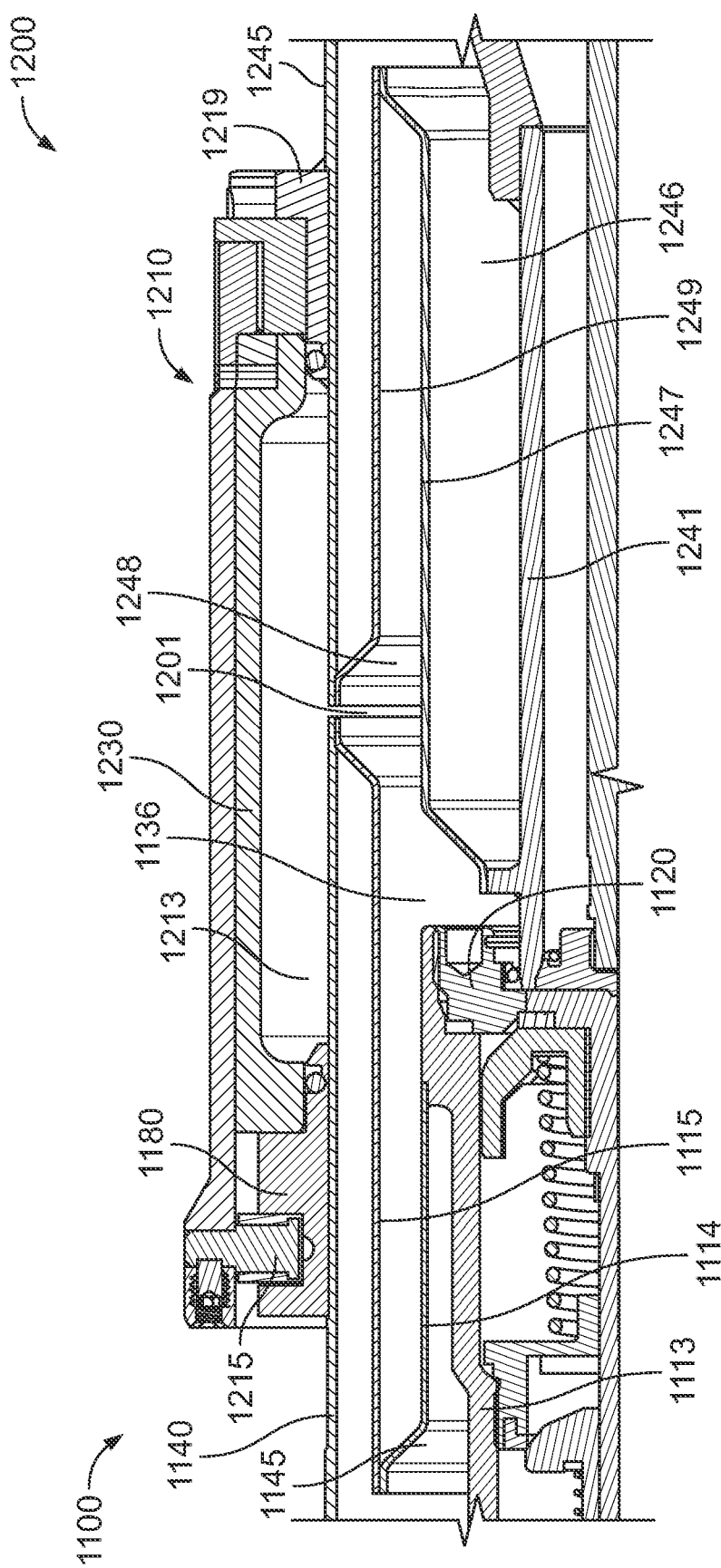
FIG. 66 is a further magnified, cross-sectional view of a portion of the nozzle of FIG. 50 and a portion of the receptacle of FIG. 49 coupled together in the closed state.

FIG. 61-66 depict the internal components of the nozzle 1200 and the receptacle 1100 for controlling the flow of cryogenic fluid between the storage tank 22 and the fill tank 32. More specifically, FIG. 61 illustrates the flow control components of the receptacle 1100, and FIGS. 62-64 illustrates the flow control components of the nozzle 1200. FIGS. 65-66 depict the portions of the nozzle 1200 and the receptacle 1100 when coupled together.

As illustrated in FIG. 61, the receptacle 1100 includes the body 1110 and a head 1120 (also referred to as a "bonnet"). The head 1120 is coupled to the interior wall 1113 adjacent to the distal end 1111. In the illustrated example, the head 1120 is offset from the distal end 1111 within a chamber 1130 of the receptacle 1100. The chamber 1130 is defined by one or more of the interior walls 1113, 1114, 1115 of the body 1110. A face seal 1116 is positioned between and sealingly engages the body 1110 and the head 1120. In some examples, a biasing spring engages the face seal 1116 to hold the face seal 1116 in place in place against the head 1120. In the illustrated example, the head 1120 defines one or more guide slots 1121, which are configured to receive one or more respective guide pins of the nozzle 1200 to facilitate rotational alignment between the receptacle 1100 and the nozzle 1200. Further, in the illustrated example, an outer surface of the head 1120 defines a centered recess 1159 (e.g., a conical recess) that is configured to receive a centered protrusion 1252 of a poppet 1250 of the nozzle 1200 to facilitate alignment and secure engagement between the poppet 1150 of the receptacle 1100 and the poppet 1250 of the nozzle 1200.

The body 1110 of the illustrated example includes the interior walls 1113, 1114, 1115 and the outer shell 1140. The interior wall 1113 (also referred to as an "inner interior wall") extends from the proximal end 1112 toward the distal end 1111 in a substantially longitudinal direction. As disclosed below in greater detail, the head 1120, a poppet 1150, a check 1160, and other fluid control components are housed within the interior wall 1113. The interior wall 1114 (also referred to as a "middle interior wall") extends from a front end of the interior wall 1113 and back toward the proximal end 1112 of the body 1110 of the receptacle 1100. The respective front ends of the interior walls 1113, 1114 are securely and sealingly coupled together, for example, via welding. The interior wall 1115 (also referred to as an "outer interior wall") extends from a back end of the interior wall 1114 and toward the distal end 1111 of the body 1110 of the receptacle 1100. The respective back ends of the interior walls 1114, 1115 are securely and sealingly coupled together, for example, via welding. A front end of the interior wall 1115 is securely and sealingly coupled to the outer shell 1140 (e.g., via welding) at the distal end 1111 of the body 1110 of the receptacle 1100. As shown in FIG. 61, the outer shell 1140 and the interior walls 1113, 1114, 1115 extend longitudinally back-and-forth to form a zig-zag pattern. The zig-zag path of the outer shell 1140 and the interior walls 1113, 1114, 1115 defines an elongated conduction path (e.g., of about 8 inches) from the exterior of the receptacle 1100 to the chamber 1130 that reduces any potential heat leak between the chamber 1130 and the exterior.

An insulation layer 1145 is located in a gap formed radially between the outer shell 1140 and the interior walls 1113, 1114, 1115. In some examples, the insulation layer 1145 extends longitudinally between the distal end 1111 of the body 1110 of the receptacle 1100 and a support bracket that is located adjacent to the proximal end 1112. The outer shell 1140, one or more of the interior walls 1113, 1114, 1115, and a support bracket form a sealed cavity in which the insulation layer 1145 is located. The insulation layer 1145 includes a vacuum and/or insulating material located in the sealed cavity to insulate the outer shell 1140 from the extremely cold temperature of cryogenic fluid flowing through the chamber 1130 of the receptacle 1100. In some examples, the receptacle 1100 may include an evacuation port and/or valve positioned along the outer shell 1140 to draw a vacuum within the gap.

As shown in FIG. 61, the chamber 1130 houses components of the receptacle 1100 that control the flow of the cryogenic fluid. The internal components of the receptacle 1100 include the poppet 1150, the check 1160, and a shaft 1170. The poppet 1150 is positioned toward the distal end 1111 of the body 1110. The check 1160 is positioned toward the proximal end 1112 of the body 1110. The poppet 1150 is fixedly coupled to the shaft 1170, and the check 1160 is slidably coupled to the shaft 1170. The shaft 1170 extends axially through the chamber 1130 of the receptacle 1100. In the illustrated example, the poppet 1150 is integrally formed with and extends from an end of the shaft 1170.

The poppet 1150 is configured to sealingly engage a poppet seat 1151 that is defined by the head 1120 adjacent to the distal end 1111. The check 1160 is configured to sealingly engage a check seat 1162 that is located toward the proximal end 1112. The check seat 1162 separates a chamber section 1132 (also referred to as a "first chamber section") and a chamber section 1134 (also referred to as a "second chamber section") of the chamber 1130. The chamber section 1134 extends between the check seat 1162 and the proximal end 1112 of the body 1110 such that the chamber section 1134 is adjacent to the proximal end 1112. The chamber section 1132 extends between the check seat 1162 and the poppet seat 1151. The head 1120 separates the chamber section 1132 and a chamber section 1136 (also referred to as a "third chamber section") of the chamber 1130 that is adjacent to the distal end 1111. The head 1120 is offset from the distal end 1111 such that the chamber section 1136 extends between the head 1120 and the distal end 1111 of the body 1110. In the illustrated example, the chamber sections 1132, 1134 are located within the interior wall 1113. The chamber section 1136 is located within a combination of the interior walls 1113, 1115.

FIG. 61 depicts a closed state of the receptacle 1100. In the closed state, the check 1160 is in a closed position at which the check 1160 engages the check seat 1162 that is securely positioned within the chamber 1130 between the chamber section 1132 and the chamber section 1134. For example, the check 1160 is configured to engage a seat seal 1166 of the check seat 1162 in the closed position to form a seal between the chamber section 1132 and the chamber section 1134. A check seal 1163 is positioned between and sealingly engages the check seat 1162 and the interior wall 1113 of the body 1110. Additionally, a check guide 1164 is securely positioned within the chamber section 1134 and adjacent to the proximal end 1112 of the body 1110. At least a portion of the shaft 1170 extends into and/or through the check guide 1164 to guide the shaft 1170 in sliding along an axis of the receptacle 1100 within the chamber 1130. A check spring 1165 is positioned between and engages the check guide 1164 and the check 1160. The check spring 1165 is configured to bias the check 1160 to remain engaged to the seat seal 1166 of the check seat 1162 in the closed position.

Also in the closed state, the poppet 1150 is in a closed position at which the poppet 1150 engages a poppet seat 1151 that is defined by a portion of the head 1120 adjacent to the distal end 1111 of the body 1110. The poppet 1150 includes a poppet seal 1152 that is configured to sealingly engage the poppet seat 1151 in the closed position.

The seat seal 1153 is positioned within the chamber section 1136 toward the distal end 1111 and engages the head 1120 adjacent to the poppet seat 1151. The seat seal 1153 is configured to sealingly engage a body 1240 of the nozzle 1000 when the receptacle 1100 securely receives the nozzle 1200. A biasing spring 1154, a support ring 1155, and a retainer 1156 engage the seat seal 1153 to bias the seat seal 1153 in place against the head 1120. Further, a retainer ring 1157 engages the retainer 1156 to hold the seat seal 1153, the biasing spring 1154, the support ring 1155, and the retainer 1156 in place.

A poppet guide 1175 is coupled to the shaft 1170 and/or a back side of the poppet 1150 behind the poppet 1150 within the chamber section 1132. An outer portion of the poppet guide 1175 engages and/or is adjacent to the interior wall 1113 of the body 1110. The outer portion of the poppet guide 1175 is configured to slide along the interior wall 1113 as the shaft 1170 slides along the axis of the receptacle 1100. A portion of the shaft 1170 extends through the poppet guide 1175 and to the poppet 1150. A poppet spring 1158 is positioned between and engages the check seat 1162 and the poppet guide 1175. The poppet spring 1158 is configured to bias the poppet 1150 to remain engaged to the poppet seat 1151 in the closed position.

Turning to FIG. 62, the nozzle 1200 includes the locking assembly 1210, the body 1240, the poppet 1250, and an actuator 1280. The poppet 1250 is positioned adjacent a front end of the body 1240, and the actuator 1280 is coupled to a back end of the body 1240.

In the illustrated example, the body 1240 of the nozzle 1200 includes a body segment 1241 (also referred to as a "front body segment" and a "first body segment"), a body segment 1242 (also referred to as a "rear body segment" and a "second body segment"), a body segment 1243 (also referred to as a "middle body segment," a "connecting body segment," and a "third body segment"), and a body segment 1244 (also referred to as a "body extension," a "hose-connection body segment," and a "fourth body segment"). The body segments 1241, 1242, 1243, 1244 are coupled together to form a chamber 1205 through which cryogenic fluid is permitted to flow and in which components are house to control the flow of the cryogenic fluid.

The body segment 1243 is coupled to and positioned between the other body segments 1241, 1242, 1244 of the body 1240. The body segment 1241 is positioned adjacent to the front end and is mechanically and fluidly coupled to an outlet port of the body segment 1243. The body segment 1244 is mechanically and fluidly coupled to an inlet port of the body segment 1243. The body segment 1244 also is configured to connect to the hose 24 to fluidly connect the nozzle 1200 to a tank, such as the storage tank 22. In the illustrated example, the body segment 1244 forms an extension that extends radially outward and back toward the back end of the body 1240. The body segment 1242 is mechanically and fluidly coupled to a third port of the body segment 1243. In the other examples, the body 1240 may be formed of more or fewer body segments. For example, two or more of the body segments 1241, 1242, 1243, 1244 may be integrally formed together. The body segments 1241, 1242, 1243, 1244 are arranged such that the cryogenic fluid is to flow through the body segment 1244, a portion of the body segment 1243, and the body segment 1241. The body segment 1241, the body segment 1242, and a portion of the body segment 1243 are coaxially aligned along a longitudinal axis of the nozzle 1200 to permit a shaft 1255 of the nozzle 1200 to extend and slide axially through the chamber 1205.

As shown in FIGS. 63-64, the body 1040 also includes the outer shell 1045 and interior walls 1247, 1249. The interior wall 1247 (also referred to as an "inner interior wall") extends from the front end of the body segment 1241 and toward the back end of the body 1240 in a substantially longitudinal direction. The interior wall 1249 (also referred to as an "outer interior wall") extends from a back end of the interior wall 1247 and toward the front end of the body 1240. A front end of the interior wall 1247 is securely and sealingly coupled to the body segment 1241, for example, via welding. The respective back ends of the interior walls 1247, 1249 are securely and sealingly coupled together, for example, via welding. A front end of the interior wall 1249 is securely and sealingly coupled to the outer shell 1245 (e.g., via welding) at the front end of the body 1240. The outer shell 1245 and the interior walls 1247, 1249 extend longitudinally back-and-forth in a zig-zag pattern. The zig-zag path of the outer shell 1245 and the interior walls 1247, 1249 defines an elongated conduction path from the exterior of the nozzle 1200 to the chamber 1205 that reduces any potential heat leak between the chamber 1205 and the exterior.

An insulation layer 1246 is located in a gap formed radially between the outer shell 1245 and the interior walls 1247, 1279. In turn, the insulation layer 1246 is located radially between the outer shell 1245 and the body segments 1241, 1242, 1243. In some examples, the insulation layer 1246 extends longitudinally between the front end and the back end of the body 1240 of the nozzle 1200. The outer shell 1245 and one or more of the interior walls 1247, 1249 form, at least partially, a sealed cavity in which the insulation layer 1246 is located. The insulation layer 1246 includes a vacuum and/or insulating material located in the sealed cavity to insulate the outer shell 1245 from the extremely cold temperature of cryogenic fluid flowing through the chamber 1205 of the nozzle 1200. In some examples, the nozzle 1200 may include an evacuation port and/or valve positioned along the outer shell 1245 to draw a vacuum within the gap.

The shaft 1255 extends through a portion of the chamber 1205. For example, the shaft 1255 extends through a portion of the chamber 1205 defined by the body segments 1241, 1242, 1243. The poppet 1250 is coupled to a first end 1256 of the shaft 1255 adjacent to the front end of body 1240. As disclosed below in greater detail with respect to FIG. 64, a second end 1257 of the shaft 1255 is coupled to a stem 1290 of the actuator 1280 adjacent to the back end of the body 1240. As the stem 1290 of the actuator 1280 is actuated from a rest position and to an extended position, the stem 1290 causes the shaft 1255 of the nozzle 1200 to slide in the same position. In turn, the poppet 1250 located at the first end 1256 of the shaft 1255 disengages from the poppet seat 1253 to permit cryogenic to flow from the chamber 1205 at the front end of the nozzle 1200.

As shown in FIG. 63, the poppet 1250 is coupled to the first end 1256 of the shaft 1255 adjacent to the front end of the nozzle 1200. In the illustrated example, the poppet 1250 is threadably coupled to the shaft 1255. The poppet 1250 is configured to engage the poppet seat 1253 in a closed position to prevent cryogenic fluid from flowing and is configured to be disengaged from the poppet seat 1253 in an open position to permit the flow of cryogenic fluid from the nozzle 1200. The poppet seat 1253 is defined by the body 1240 adjacent to the front end of the nozzle 1200. For example, the poppet seat 1253 is defined by an end of the body segment 1241 of the body 1240. Further, a seal 1251 (e.g., an O-ring) is coupled to the poppet 1250 to promote the formation of sealed connection between the poppet 1250 and the poppet seat 1253 when the poppet 1250 is in a closed position. In the illustrated example, the seal 1251 is securely positioned within a groove defined by a back surface of the poppet 1250. The body segment 1241; the interior walls 1247, 1249; and the inner sleeve 1230 are arranged to define a void 1248 (e.g., a toroid void) adjacent to the front end of the body 1240. The void 1248 (also referred to as a "clearance gap") is configured to sealingly receive the distal end 1111 of the body 1110 of the receptacle 1100 when the nozzle 1200 is coupled to receptacle 1100 via the locking assembly 1210.

Turning to FIGS. 62 and 64, the actuator 1280 is coupled to the back end of the body 1240. The nozzle 1200 includes a coupling assembly to connect the body 1240 and the actuator 1280. The coupling assembly includes insulating material to thermally isolate the chamber 1205 of the nozzle 1200 (through which cryogenic fluid flows) from the actuator 1280 and the exterior of the nozzle 1200.

The coupling assembly of the illustrated example includes thermal buffers 1261, 1262, 1263 that are composed of material with low thermal conductivity to thermally insulate the actuator 1280 from the body 1240 through which cryogenic fluid flows. For example, the material with low thermal conductivity may be a high-pressure fiberglass laminate, such as G-10, and/or other insulating material(s). The thermal buffers 1261, 1262, 1263 are housed, at least partially, within a chamber formed by an outer wall 1285 at a front end of the actuator 1280. For example, the front end of the actuator 1280 is hollow to reduce a weight of the nozzle 1200. The thermal buffer 1261 (also referred to as a "first thermal buffer") engages a portion of an inner surface of the outer wall 1285 and another inner surface of the actuator 1280 that extends perpendicular to the longitudinal axis of the actuator 1280. The thermal buffer 1262 engages another portion of the inner surface of the outer wall 1285 and a portion of the thermal buffer 1261. The thermal buffer 1263 is positioned in an opening defined by the thermal buffer 1261. The thermal buffer 1263 is a hollow cylinder that defines a chamber 1271 (also referred to as a "coupling chamber") in which the second end 1257 of the shaft 1255 is operatively coupled to the stem 1290 of the actuator 1280. In the illustrated example, the stem 1290 is composed of material with low thermal conductivity, such as a high-pressure fiberglass laminate (e.g., G-10) and/or other insulating material, to further thermally isolate components of the actuator 1280 from the extremely cold temperatures of cryogenic fluid. The thermal buffer 1262 also defines a vacuum path 1268 that fluid connects to the chamber 1271 of the thermal buffer 1263, which is fluidly connected to a chamber 1286 of the actuator 1280 to facilitate a quicker and/or otherwise improved pump down for the actuator 1280.

In the illustrated example, a portion of the front end of the thermal buffer 1262 extends into an opening defined by the body segment 1242 of the body 1240. Within the opening of the body 1240, the front end of the thermal buffer 1062 engages a back end of a shaft guide 1260. The shaft guide 1260 extends between the front end of the thermal buffer 1262 and a flange 1258 of the shaft 1255. The shaft guide 1260 of the illustrated example is coupled to the body segment 1242 of the body 1240 via one or more fasteners 1269. In other examples, the shaft guide 1260 may be welded to the body 1240.

As shown in FIGS. 62 and 64, the shaft 1255 extends through the body 1240 and the shaft guide 1260 and extends at least partially through the thermal buffers 1261, 1263 to operatively connect to the stem 1290 of the actuator 1280 within the chamber 1271 of the thermal buffer 1263. The coupling assembly includes a connector 1272 and a crimped fastener 1273 to couple the second end 1257 of the shaft 1255 to the stem 1290 of the actuator 1280 within the chamber 1271. In the illustrated example, the connector 1272 engages and is positioned axially between the shaft 1255 and the stem 1290. The connector 1272 also engages and is positioned radially between (i) the crimped fastener 1273 and (ii) the shaft 1255 and the stem 1290. The connector 1272 includes inner threads to threadably receive the second end 1257 of the shaft 1255 and outer threads to be threadably received by an uncrimped end of the crimped fastener 1273. A flared end of the stem 1290 engages the connector 1272. A crimped end of the crimped fastener 1273 is crimped around the flared end of the stem 1290 to securely fasten the second end 1257 of the shaft 1255 to the flared end of the stem 1290.

The coupling assembly includes one or more seals to further seal the chamber 1205 from the actuator 1280 and the exterior of the body 1240. For example, the seals deter a condensation path from forming between the chamber 1205 and the exterior of the body 1240. In the illustrated example, the coupling assembly includes one or more bellows seals. For example, a bellows 1264 (also referred to as a "bellows seal," a "first bellows" or a "first bellows seal") is coupled to and extends between the flange 1258 of the shaft 1255 and the shaft guide 1260 to form a seal between the shaft 1255 and the shaft guide 1260. A bellows 1266 (also referred to as a "bellows seal," a "second bellows" or a "second bellows seal") is coupled to and extends and forms a seal between the body segment 1242 of the body 1240 and the outer shell 1245.

FIG. 64 further depicts the actuator 1280 of the nozzle 1200. In the illustrated example, a body 1281 of the actuator 1280 is formed from a body segment 1282 (also referred to as a "first body segment" or a "front body segment"), a body segment 1283 (also referred to as a "second body segment," a "back body segment," or an "end cap"), and a body segment 1284 (also referred to as a "third body segment" or a "middle body segment"). The body segment 1282 includes the outer wall 1285 of the actuator 1280 in which the thermal buffers 1261, 1262, 1263 are at least partially housed. The body segments 1282, 1284 are threadably coupled together, and the body segments 1283, 1284 are threadably coupled together. In the illustrated example, the body 1281 of the actuator 1280 includes three body segments that are assembled together. In other examples, the body 1281 may be formed by more or fewer body segments.

The body 1281 of the actuator defines a chamber 1286 through which the stem 1290 of the actuator 1280 extends. In the illustrated example, the actuator 1280 also includes a piston 1291, a spring 1292, and a sleeve 1297 that are housed within the chamber 1286. An end of the stem 1290 is coupled to the piston 1291 via a fastener 1293 (e.g., a bolt). The sleeve 1297 is positioned toward the front end of the actuator 1280 such that a front end of the sleeve 1297 engages the thermal buffer 1261 of the coupling assembly. The inner sleeve 1230 is composed of material with low thermal conductivity, such as a high-pressure fiberglass laminate (e.g., G-10) and/or other insulating material, to provide thermal insulation to the actuator 1280. The spring 1292 extends through the sleeve 1297. The spring 1292 (also referred to as an "actuator spring") extends between and engages (1) the piston 1291 of the actuator 1280 and (2) the thermal buffer 1261 and/or the thermal buffer 1263 of the coupling assembly.

In the illustrated example, the piston 1291 divides the chamber 1286 into and separates a pressure chamber 1287 and a spring chamber 1288. The pressure chamber 1287 is configured to contain a vacuum or inert gas (e.g., nitrogen) provided by a solenoid. The pressure chamber 1287 receives the inert gas through an inlet port 1289 (e.g., also referred to as a "passageway") defined by the body segment 1283 of the body 1281. The spring 1292 engages the piston 1291 and is configured to bias the piston 1291 in a direction away from the body 1240 of the nozzle 1200.

The body 1281 of the actuator 1280 defines a plurality of ports fluidly connected to the chamber 1286. For example, The body segment 1283 defines the inlet port 1289 for the pressure chamber 1287. The body segment 1282 defines a vacuum port 1298 that is fluidly connected to the spring chamber 1288 and is configured to provide further insulation from the cryogenic temperature of portions of the body 1240 of the nozzle 1200. In some examples, an evacuation port and/or valve may be located along a portion of the body 1281 to facilitate adjustment (e.g., increasing or decreasing) of the pressure of the inert gas within the pressure chamber 1287.

The actuator 1280 of the illustrated example includes one or more seals to seal the pressure chamber 1287 and the spring chamber 1288 from each other and/or from an exterior of the actuator 1280. For example, a seal 1294 engages and is positioned between the body segments 1282, 1284 adjacent to threads that couple the body segments 1282, 1284 together. The seal 1294 (e.g., an O-ring) fluidly separates the spring chamber 1288 from the threads. In the illustrated example, the seal 1294 is housed in a groove defined by the body segment 1282. Seals 1295, 1296 are located at opposing ends of the piston 1291 and each is positioned between and engages the piston 1291 and the body segment 1284. Each of the seals 1295, 1296 (e.g., O-rings) is positioned within a respective groove defined by the piston 1291. The seal 1295 is positioned to form a sealed connection between the piston 1291 and the body 1281 adjacent to the spring chamber 1088. The seal 1296 is positioned to form a sealed connection between the piston 1291 and the body 1281 adjacent to the pressure chamber 1087. The piston 1291 is composed of, for example, aluminum and/or another lightweight metallic material.

The actuator 1280 and the coupling assembly of the illustrated example include components made of lightweight material to minimize a weight of the nozzle 1200. Further, the actuator 1280 includes a limited number of external seals and to increase the ease of assembly. Further, all of the sealing surfaces of the illustrated example are formed between metal components that generate improved sealing surfaces.

FIG. 65 depicts the nozzle 1200 securely coupled to the receptacle 1100 via the locking assembly 1210 with the nozzle 1200 and the receptacle 1100 in respective closed states. When closed, the poppet 1250 of the nozzle 1200 engages the poppet 1150 of the receptacle 1100 to prevent cryogenic fluid from flowing through the nozzle 1200 and the receptacle 1100. The void 1248 is configured to securely and sealingly receive the distal end 1111 of the body 1110 of the receptacle 1100 to minimize potential conductive paths and, in turn, reduce heat leaks between the chamber 1205 and the exterior of the nozzle 1200. For example, the geometries of the body 1110 of the receptacle 1100 and the body 1240 of the nozzle 1000 are complementary of each other to deter any potential heat leak between the chamber 1205 and the exterior of the nozzle 1200. To further limit potential leaks, the seal 1185 engages the inner sleeve 1230 and the seat seal 1153 engages the body 1240.

The receptacle 1100 and the nozzle 1200 are configured to (1) to deter atmospheric air and/or debris from becoming trapped before the poppet 1250 is opened to extend into the receptacle 1100 and (2) to deter cryogenic fluid from escaping from the nozzle 1200 and/or the receptacle 1100 into the atmosphere during the coupling and/or decoupling process. For example, the void 1248 of the nozzle 1200 and the distal end 1111 of the body 1110 of the receptacle 1100 are shaped to be complimentary with each other to reduce the amount of cryogenic fluid that may become trapped and subsequently emitted during the coupling and/or decoupling process. The poppet 1250 is configured to be flush with the poppet 1150 when the nozzle 1200 couples to the receptacle 1100 to further deter any material from becoming trapped and subsequently emitted. The seat seal 1153 and the seal 1185 of the receptacle 1100 also are positioned to reduce emissions of cryogenic fluid during the coupling and decoupling process. Additionally, the locking assembly 1210 is configured to keep the nozzle 1200 securely coupled to the receptacle 1100, thereby reducing emissions that may otherwise result from an unintended decoupling.

FIG. 66 further depicts the nozzle 1200 and the receptacle 1100 securely locked together in respective closed states. When the nozzle 1200 and the receptacle 1100 are coupled together, overlapping insulation layers to insulate the exterior of the nozzle 1200 and the receptacle 1100 from the cryogenic fluid. For example, the insulation layer 1145 is formed between the outer shell 1140 and the interior walls 1113, 1114, 1115 of the receptacle 1100. The insulation layer 1246 is formed between outer shell 1245; the interior walls 1247, 1249; and the body segments 1241, 1242, 1243 of the nozzle 1200. The nozzle 1200 and receptacle 1100 form another insulation layer 1201 that extends over portions of the insulation layers 1145, 1246. The insulation layer 1201 is a vacuum that is formed when the nozzle 1200 is securely and sealingly coupled to the receptacle 1100. The insulation layer 1201 is formed within a sealed portion of the chamber section 1136 of the receptacle 1100, a sealed portion of the void 1248 of the nozzle 1200, and a sealed void 1213 of the locking assembly 1210. In the illustrated example, the sealed void 1213 is formed by the outer shell 1140, the sleeve 1180, the sleeve ring 1219, the inner sleeve 1230, and the outer shell 1245 when the locking assembly 1210 is securely locked to the receptacle 1100. Another portion of the insulation layer 1201 is formed by the head 1120 and the interior walls 1113, 1114, 1115 of the receptacle 1100. Another portion of the portion of the insulation layer 1201 is formed by the interior walls 1247, 129 and the body segment 1241 of the nozzle 1200.

In some examples, the insulation layer 1201 can further operate as a safety check by preventing the nozzle 1200 from engaging until a vacuum is pulled within the space of the insulation layer 1201. A vacuum may start to be repulled into the space of the insulation layer 1201 as the nozzle 1200 is disconnected from the to reclaim any fluid (e.g., hydrogen) trapped between the nozzle 1200 and the receptacle 1100. For example, the insulation layer 1201 is located in space that is open to both chamber section 1136 of the receptacle 1100, the void 1248 of the nozzle 1200, and the sealed void 1213. A vacuum can only be pulled into these areas only if the nozzle 1200 and the receptacle 1100 are securely and sealingly connected, thereby forming a safety check for the coupling between the nozzle 1200 and the receptacle 1100.

If the nozzle 1200 and is not properly coupled to the receptacle 1100, a vacuum cannot be pulled into these spaces and, in turn, a fueling process will not start.

To initiate the fill sequence (e.g., remotely), the operator 40 presses the button 28 at the filling station 20. Inert gas (e.g., nitrogen) is supplied to the pressure chamber 1287 of the actuator 1280 when the button 28 is pressed. Once enough air is supplied to the pressure chamber 1287, the pressure within the pressure chamber 1287 overcomes the biasing forces of the spring 1292 of the actuator 1280 and the poppet spring 1158 of the poppet 150 and causes the piston 1291 of the actuator 1280 to actuate linearly toward the body 1240 of the nozzle 1200. In turn, the stem 1290 that is coupled to the piston 1291 linearly actuates in the same direction, which causes the shaft 1255 that is operatively connected to the stem 1290 to actuate in the same direction. The actuation of the shaft 1255 causes the poppet 1250 of the nozzle 1200 to disengage from the poppet seat 1253 and move to an open position, which causes the poppet 1150 to disengage from the poppet seat 1151 and move to an open position. Such actuation enables the nozzle 1200 to dispense cryogenic fluid that flows through the chamber 1205 of the nozzle 1200 into the chamber section 1132 of the receptacle 1100. The check 1160 remains closed due to a pressure difference.

Once the pressure is equalized between the chamber 1205 of the nozzle 1200 and the chamber section 1132 of the receptacle 1100, the actuator 1280 is able to overcome the biasing force applied by the check spring 1165 of the check 1160 and push the check 1160 to disengage from the seat seal 1166 of the check seat 1162 and into an open position. When the check 1160 is in the open position, cryogenic fluid is capable of flowing from the storage tank 22, through the chamber 1205 of the nozzle 1200, through both the chamber section 1132 and the chamber section 1134 of the chamber 1130 of the receptacle 1100, and into the fill tank 32.

Figure 67:
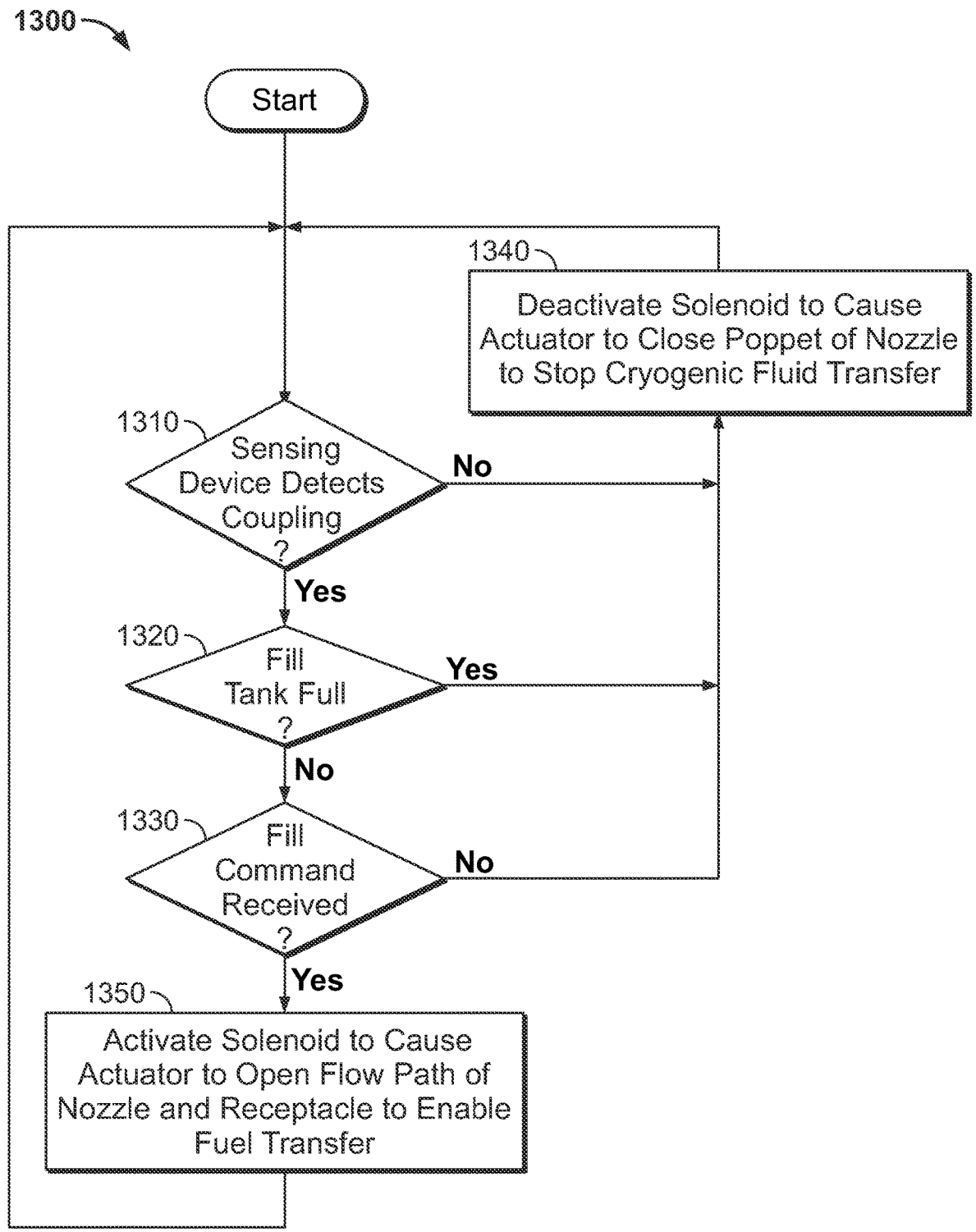
FIG. 67 is a flowchart for operating the cryogenic-fluid filling system of FIG. 1 in accordance with the teachings herein.

FIG. 67 is a flowchart for a method 1300 of operating a system (e.g., the system 10) to safely and securely transfer cryogenic fluid from a storage tank (e.g., the storage tank 22) to a fill tank (e.g., the fill tank 32) using a nozzle (e.g., the nozzle 200, the nozzle 300, the nozzle 400, the nozzle 500, the nozzle 600, the nozzle 700, the nozzle 800, the nozzle 1000, the nozzle 1200) and a receptacle (e.g., the receptacle 100, the receptacle 900, the receptacle 1100) in accordance with the teachings herein.

At block 1310, the controller 26 of the filling station 20 determines whether the sensing device (e.g., the sensing device 280, the sensing device 1008) of the nozzle (e.g., the nozzle 200, the nozzle 300, the nozzle 400, the nozzle 500, the nozzle 600, the nozzle 700, the nozzle 800, the nozzle 1000, the nozzle 1200) detects the presence of the sensing device (e.g., sensing device 180, the sensing device 908) of the receptacle (e.g., the receptacle 100, the receptacle 900, the receptacle 1100). The sensing device of the nozzle detects the presence of the sensing device of the receptacle when the nozzle is coupled to the receptacle and in the secured position after the operator 40 has rotatably fastened the nozzle to the receptacle. The sensing device does not detect the presence of the sensing device when the nozzle is not in the secured position.

In response to the controller 26 determining that the sensing device of the nozzle does not detect the presence of the sensing device receptacle, the method 1300 proceeds to block 1340 at which the controller 26 sends a signal to deactivate a solenoid of the actuator of the nozzle (e.g., the actuator 230, the actuator 1080, the actuator 1280). The controller 26 deactivates the solenoid to cause the actuator to close the poppet of the nozzle (e.g., the poppet 240, the poppet 1050, the poppet 1250) and, in turn, prevent the nozzle from discharging cryogenic fluid. Otherwise, in response to the controller 26 determining that the sensing device of the nozzle detects the presence of the sensing device of the receptacle, the method 1300 proceeds to block 1320. For example, when the sensing device of the nozzle detects the presence of the sensing device of the receptacle, the sensing device of the nozzle sends current to a button circuit to subsequently allow activation of the fill sequence via the button 28.

At block 1320, the controller 26 determines whether the fill tank 32 is full. For example, the controller 26 receives a signal from a tank level sensor that indicates whether the fill tank 32 is full. In other examples, the controller 26 determines whether the fill tank 32 is full only after the solenoid of the actuator is activated to enable cryogenic fluid to flow, as disclosed below in greater detail with respect to block 1350. That is, in other examples, block 1320 is performed after block 1350.

Returning to FIG. 66, in response to the controller 26 determining that the fill tank 32 is full, the method 1300 proceeds to block 1340 at which the controller 26 deactivates a solenoid of the actuator to close the nozzle. Otherwise, in response to the controller 26 determining that the fill tank 32 is not full, the method 1300 proceeds to block 1330.

At block 1330, the controller 26 determines whether the operator 40 a fill command is received to initiate cryogenic fluid transfer between the storage tank 22 and the fill tank 32. For example, the operator 40 engages the button 28 of the filling station 20 to send the fill command. In some examples, the button 28 is a momentary pushbutton that (1) sends the fill command when engaged by the operator 40 and (2) does not send the fill command when not engaged by the operator 40. In other examples, the button 28 is a latching pushbutton that continues to send the fill command after the operator 40 presses the button 28 a first time and stops sending the fill command after the operator 40 subsequently presses the button 28 a second time. Further, in other examples, the filling station 20 includes two buttons, a start button (e.g., the button 28) dedicated for sending the fill command and a stop button dedicated for stopping the fill command.

In response to the controller 26 determining that the fill command is not received, the method 1300 proceeds to block 1340 at which the controller 26 deactivates a solenoid of the actuator to close the nozzle. Otherwise, in response to the controller 26 determining that the fill command is received, the method 1300 proceeds to block 1350 at which the controller 26 sends a signal to activate the solenoid of the actuator. The controller 26 activates the solenoid to cause the actuator to open the poppet of the nozzle and, in turn, enable cryogenic fluid to transfer from the storage tank 22, through the nozzle, through the receptacle, and into the fill tank 32.

An example system for transferring cryogenic fluid comprises a receptacle is disclosed herein. The receptacle comprises a receptacle body that comprises a receptacle outer shell and defines a receptacle chamber through which the cryogenic fluid is to flow. The receptacle comprises a sleeve extending over a portion of and coupled to the receptacle outer shell. The sleeve includes a front end, a back end, and an outer surface that extends between the front end and the back end. The sleeve defines one or more coupling slots that extend from the front end and bend or curl along the outer surface of the sleeve. The sleeve defines one or more guide slots extending linearly along the outer surface of the sleeve. The system comprises a nozzle that is configured to securely couple and transfer cryogenic fluid to the receptacle. The nozzle comprises a nozzle body that defines a nozzle chamber through which the cryogenic fluid is to flow. The nozzle body comprises a nozzle outer shell that includes an outer surface and a front end. The nozzle comprises a locking assembly configured to securely couple the nozzle to the receptacle. The locking assembly comprises an inner sleeve that includes a distal end and one or more guide extensions extending longitudinally from the distal end. The inner sleeve is fixedly coupled to the outer surface of the nozzle outer shell. The distal end extends longitudinally beyond the front end of the nozzle outer shell. The locking assembly comprises an outer sleeve extending over and rotatably coupled to the inner sleeve. The locking assembly comprises one or more locking teeth fixedly positioned along an inner surface of the outer sleeve and adjacent to the distal end of the inner sleeve. The one or more locking teeth are configured to be slidably received by the one or more coupling slots of the receptacle. The one or more guide extensions are configured to be slidably received by the one or more guide slots of the receptacle to rotationally align the one or more locking teeth with the one or more coupling slots. The outer sleeve is configured to rotate relative to the inner sleeve to cause the one or more locking teeth to rotatably slide within the one or more coupling slots to securely couple the nozzle to the receptacle.

In some examples, the nozzle further comprises a redundant locking mechanism that is configured to transition between an unlocked state and a locked state as the outer sleeve rotates relative to the inner sleeve to further secure the nozzle to the receptacle.

An example receptacle for coupling to and receiving cryogenic fluid from a nozzle is disclosed herein. The receptacle comprises a body. The body comprises an outer shell and defines a chamber through which the cryogenic fluid is to flow. The receptacle comprises a sleeve that extends over a portion of and is coupled to the outer shell. The sleeve includes a front end, a back end, and an outer surface that extends between the front end and the back end. The sleeve defines one or more coupling slots that extend from the front end and bend or curl along the outer surface. The one or more coupling slots are configured to slidingly receive a respective one or more locking teeth of the nozzle to couple the receptacle and the nozzle together. The sleeve defines one or more guide slots that extend linearly along the outer surface. The one or more guide slots are configured to slidingly receive a respective one or more guide extensions of the nozzle to rotationally align the one or more coupling slots with the respective one or more locking teeth of the nozzle.

In some examples, the body includes a proximal end and a distal end, and wherein the sleeve is positioned between and offset from the distal end of the body.

In some examples, each of the one or more guide slots are circumferentially spaced apart from each of the one or more coupling slots along the outer surface of the sleeve. In some such examples, the one or more coupling slots are equidistantly spaced apart from each other circumferentially along the outer surface of the sleeve. In some such examples, the one or more coupling slots are equidistantly spaced apart from each other circumferentially along the outer surface of the sleeve.

Some examples further comprise an insulation layer located radially between the chamber and the outer shell.

In some examples, the sleeve includes a front-facing surface that is located toward the front end of the sleeve. Each of the one or more guide slots and the one or more coupling slots includes a respective opening located along the front-facing surface. In some such examples, each of the one or more guide slots is defined by a recessed surface and one or more side surfaces. The recessed surface is recessed relative to the outer surface of the sleeve. The one or more side surfaces extend between the recessed surface and the outer surface. Further, in some such examples, for each of the one or more guide slots, the one or more side surfaces and the front-facing surface define beveled corners at the respective opening to facilitate receiving a respective one of the one or more guide extensions of the nozzle through the respective opening. Further, in some such examples, for each of the one or more guide slots, a beveled edge is located adjacent to the recessed surface at a base of the respective opening to facilitate radial alignment with a respective one of the one or more guide extensions. In some such examples, each of the one or more coupling slots is defined by a recessed surface and one or more side surfaces. The recessed surface is recessed relative to the outer surface of the sleeve. The one or more side surfaces extend between the recessed surface and the outer surface. Further, in some such examples, for each of the one or more coupling slots, the one or more side surfaces and the front-facing surface define beveled corners at the respective opening to facilitate receiving a respective one of the one or more locking teeth of the nozzle through the respective opening.

In some examples, the coupling slots are configured to enable the one or more locking teeth to rotate about 45 degrees within the one or more coupling slots at which a locked position is reached. Some such examples further comprise a seat seal positioned within the chamber toward a distal end of the body. The seat seal is configured to sealingly engage the nozzle in the locked position to form a sealed connection between the chamber of the receptacle and a nozzle chamber. In some such examples, the sleeve includes a front edge at the front end. A vacuum seal is positioned adjacent to the front edge and is configured to sealingly engage a base of each of the one or more guide extensions of the nozzle when the one or more locking teeth have been rotated about 15 degrees to form a sealed connection between the sleeve and the nozzle.

An example nozzle for coupling to and providing cryogenic fluid to a receptacle is disclosed herein. The nozzle comprises a body that defines a chamber through which the cryogenic fluid is to flow. The body comprises an outer shell that includes an outer surface and a front end. The nozzle comprises a locking assembly configured to securely couple the nozzle to the receptacle. The locking assembly comprises an inner sleeve that includes a distal end and one or more guide extensions extending longitudinally from the distal end. The inner sleeve is fixedly coupled to the outer surface of the outer shell. The distal end extends longitudinally beyond the front end of the outer shell. The locking assembly comprises an outer sleeve that extends over and rotatably coupled to the inner sleeve. The locking assembly comprises one or more locking teeth that are fixedly positioned along an inner surface of the outer sleeve and adjacent to the distal end of the inner sleeve. The one or more locking teeth are configured to be slidably received by respective one or more coupling slots of the receptacle. The one or more guide extensions are configured to be slidably received by respective one or more guide slots of the receptacle to rotationally align the one or more locking teeth with the respective one or more coupling slots. The outer sleeve is configured to rotate relative to the inner sleeve to cause the one or more locking teeth to rotatably slide within the respective one or more coupling slots to securely couple the nozzle to the receptacle.

Some examples comprise an insulation layer located radially between the chamber and the outer shell.

In some examples, to facilitate rotational alignment between the one or more locking teeth and the respective one or more coupling teeth, the one or more guide extensions extend longitudinally beyond the one or more locking teeth to enable the one or more guide extensions to be received by the respective one or more guide slots of the receptacle before the one or more locking teeth are received by the respective one or more coupling slots of the receptacle.

In some examples, each of the one or more locking teeth is a roller bearing with rounded surfaces to facilitate guiding the one or more locking teeth into the respective one or more coupling slots of the receptacle.

In some examples, each of the one or more guide extensions includes rounded corners to facilitate guiding the guide extensions into the respective one or more guide slots of the receptacle. In some such examples, each of the one or more guide extensions includes a rounded inner surface to facilitate radial alignment between the one or more guide extensions and the respective one or more guide slots of the receptacle.

In some examples, the locking assembly further comprises a sleeve ring that is fixedly coupled to the outer shell. A proximal end of the inner sleeve is fixedly coupled to the sleeve ring to fixedly couple the inner sleeve to the outer shell. In some such examples, the sleeve ring and the proximal end of the inner sleeve define a groove. The outer sleeve includes an inner lip that is received by the groove to prevent axial movement of the outer sleeve relative to the inner sleeve.

In some examples, each of the one or more guide extensions are circumferentially spaced from the one or more locking teeth by at least a distance that prevents the one or more guide extensions from interfering with rotational movement of the one or more locking teeth. In some such examples, the one or more guide extensions are equidistantly spaced apart from each other circumferentially along the inner sleeve. In some such examples, the one or more locking teeth are equidistantly spaced apart from each other circumferentially along the inner surface of the outer sleeve.

In some examples, the locking assembly further comprises a handle fixedly coupled to the outer sleeve to facilitate rotation of the outer sleeve relative to the inner sleeve. In some such examples, the locking assembly further comprises one or more posts to couple the handle to the outer sleeve.

In some examples, the locking assembly further comprises a redundant locking mechanism configured to further securely couple the nozzle to the receptacle. The redundant locking mechanism is configured to transition between an unlocked state and a locked state as the outer sleeve rotates relative to inner sleeve.

In some such examples, the redundant locking mechanism comprises a stem that includes a first end, a second end, and a ledge located between the first end and the second end. The redundant locking mechanism comprises a spring that engages the ledge and through which the first end of the stem partially extends. The redundant locking mechanism comprises a wheel coupled to the second end of the stem.

An example nozzle for coupling to and providing cryogenic fluid to a receptacle is disclosed herein. The nozzle comprises a body that defines a chamber through which the cryogenic fluid is to flow. The body comprises an outer shell that includes an outer shell surface and a front end. The nozzle comprises a locking assembly configured to securely couple the nozzle to the receptacle. The locking assembly comprises an inner sleeve fixedly coupled to the outer shell surface of the outer shell, an outer sleeve extending over and rotatably coupled to the inner sleeve, and one or more locking teeth. The one or more locking teeth are fixedly coupled to the outer sleeve and configured to be slidably received by respective one or more coupling slots of the receptacle to securely couple the nozzle to the receptacle. The one or more locking teeth are configured to rotatably slide within the respective one or more coupling slots to couple the nozzle to the receptacle as the outer sleeve rotates relative to the inner sleeve. The locking assembly comprises a redundant locking mechanism configured to transition between an unlocked state and a locked state as the outer sleeve rotates relative to the inner sleeve to further secure the nozzle to the receptacle.

In some examples, the redundant locking mechanism comprises a stem that includes a first end, a second end, and a ledge located between the first end and the second end. The redundant locking mechanism comprises a spring that engages the ledge and through which the first end of the stem partially extends. The redundant locking mechanism comprises a wheel coupled to the second end of the stem. In some such examples, the locking assembly further comprises a handle fixedly coupled to the outer sleeve to facilitate rotation of the outer sleeve relative to the inner sleeve. Further, in some such examples, the locking assembly further comprises one or more support posts that extend between and securely couple the handle to the outer sleeve. Further, in some such examples, the locking assembly further comprises a hollow post that is coupled to the handle and extends toward the inner sleeve. The redundant locking mechanism is housed within the hollow post. Also, in some such examples, the redundant locking mechanism further comprises a cap. The cap is configured to couple to a first opening of the hollow post that is adjacent to the handle. The cap is coupled to the first opening to enclose and securely retain the redundant locking mechanism in the hollow post. Additionally, in some such examples, the spring extends between and engages the cap and the ledge of the stem. Additionally, in some such examples, the wheel extends at least partially from a second opening of the hollow post and is configured to engage the inner sleeve. Moreover, in some such examples, the outer sleeve defines an opening adjacent to the second opening of the hollow post. The wheel extends from the second opening of the hollow post and through the opening of the outer sleeve to engage the inner sleeve. Also, in some such examples, the inner sleeve defines a first groove associated with the unlocked state of the redundant locking mechanism, a second groove associated with the locked state of the redundant locking mechanism, an intermediate portion of an outer surface of the inner sleeve positioned between the first groove and the second groove, a first ramp extending between the first groove and the intermediate portion of the outer surface, and a second ramp extending between the second groove and the intermediate portion of the outer surface. Additionally, in some such examples, to transition between the unlocked state and the locked state, the wheel is configured to roll between the first groove and the second groove and along the first ramp, the intermediate portion of the outer surface, and the second ramp as the outer sleeve is rotated relative to the inner sleeve. Additionally, in some such examples, the spring is configured to bias the wheel toward the inner sleeve to retain the wheel in the first groove or the second groove when the outer sleeve is not being rotated relative to the inner sleeve.

In some examples, the redundant locking mechanism is configured to be in the unlocked state when the one or more locking teeth enter the respective one or more coupling slots of the receptacle. In some such examples, the redundant locking mechanism is configured to be in the locked state when the one or more locking teeth have been slidably rotated to a locked position at enclosed ends of the respective one or more coupling slots of the receptacle.

In some examples, the inner sleeve includes one or more guide extensions that are configured to be slidably received by respective one or more guide slots of the receptacle to rotationally align the one or more locking teeth with the respective one or more coupling slots.

An example system for transferring cryogenic fluid is disclosed herein. The system comprises a nozzle. The nozzle comprises a nozzle body that includes a front end, a back end, a nozzle outer shell, and one or more body segments. The one or more body segments define a nozzle chamber through which the cryogenic fluid is to flow. The nozzle comprises a nozzle insulation layer located radially between the nozzle chamber and the nozzle outer shell. The nozzle comprises a nozzle shaft having a first end and a second end. The nozzle shaft is housed within and slidably extending through the nozzle chamber. The nozzle comprises a nozzle poppet seat positioned adjacent to the front end of the nozzle body and a nozzle poppet coupled to the first end of the nozzle shaft. The nozzle poppet is configured to engage the nozzle poppet seat in a closed position and be disengaged from the nozzle poppet seat in an open position. The nozzle comprises an actuator that comprises a stem operatively coupled to the nozzle shaft. The stem is configured to linearly actuate to cause the nozzle poppet coupled to the nozzle shaft to actuate between the closed position and the open position. The nozzle comprises a coupling assembly configured to couple the actuator to the back end of the nozzle body. The coupling assembly includes insulating material to thermally isolate the actuator from the nozzle chamber through which the cryogenic fluid is to flow. The system comprises a receptacle. The receptacle comprises a receptacle body that includes a proximal end, a distal end, a receptacle outer shell, and one or more receptacle interior walls defining a receptacle chamber through which the cryogenic fluid is to flow. The receptacle chamber includes a first chamber section and a second chamber section. The receptacle comprises a receptacle insulation layer located radially between the receptacle chamber and the receptacle outer shell. The receptacle comprises a receptacle shaft housed within and slidably extending through the receptacle chamber. The receptacle comprises a receptacle poppet seat positioned within the receptacle chamber adjacent to the proximal end and a receptacle poppet coupled to the receptacle shaft. The receptacle poppet is configured to engage the nozzle poppet when the receptacle is coupled to the nozzle. The receptacle poppet is configured to engage the receptacle poppet seat in a closed position. The receptacle poppet is configured to disengage from the receptacle poppet seat when pushed by the nozzle poppet.

In some examples, the receptacle further comprises a check seat positioned within the receptacle chamber toward the distal end and a check slidably coupled to the receptacle shaft and configured to engage the check seat in the closed position. In some such examples, the check seat separates the first chamber section and the second chamber section. The first chamber section extends between the check seat and the proximal end of the receptacle body. The second chamber section extends between the receptacle poppet seat and the check seat. Further, in some such examples, the check is configured to disengage from the check seat to permit the cryogenic fluid to flow through the receptacle chamber when pressure within the first chamber section is equalized with that of the nozzle chamber.

In some examples, the receptacle insulation layer is formed between the receptacle outer shell and the one or more receptacle interior walls. In some such examples, the nozzle further comprises one or more nozzle interior walls. The nozzle insulation layer is formed between the nozzle outer shell, the one or more nozzle interior walls, and the one or more body segments. Further, in some such examples, the nozzle and the receptacle are configured to form a third insulation layer that extends over portions of the nozzle insulation layer and the receptacle insulation layer. Further, in some such examples, the third insulation layer is a vacuum that is formed when the nozzle is coupled to the receptacle. Also, in some such examples, the third insulation layer is partially formed within a sealed void of a locking assembly of the nozzle that is formed when the nozzle is coupled to the receptacle. Additionally, in some such examples, the sealed void is formed by the receptacle outer shell, a sleeve of the receptacle, and a locking assembly of the nozzle. Additionally, in some such examples, the third insulation layer is partially formed within a first sealed portion of a third chamber section of the receptacle. The first sealed portion is defined by the one or more receptacle interior walls and a bonnet of the receptacle. Moreover, in some such examples, the third insulation layer is partially formed within a second sealed portion of a toroid void of the nozzle. The second sealed portion is defined by at least one of the one or more body segments and one or more nozzle interior walls of the nozzle.

In some examples, the distal end of the receptacle body is configured to be received by a void of the nozzle when the nozzle and the receptacle are coupled together. The void of the nozzle and the distal end of the receptacle body are shaped to be complimentary with each other to limit the amount of the cryogenic fluid trapped between the nozzle and the receptacle and subsequently emitted during coupling or decoupling. In some examples, the nozzle poppet is configured to be flush with the receptacle poppet when the nozzle is coupled to the receptacle to deter material from becoming trapped and subsequently emitted. In some examples, the receptacle further comprises a seat seal and another seal that are positioned to reduce emissions of the cryogenic fluid during coupling and decoupling of the receptacle and the nozzle. In some examples, the nozzle further comprises a locking assembly that is configured to keep the nozzle securely coupled to the receptacle to deter an unintended decoupling and corresponding emissions.

An example receptacle for coupling to and receiving cryogenic fluid from a nozzle is disclosed herein. The receptacle comprises a body that includes a proximal end and a distal end. The body comprises an outer shell and one or more interior walls defining a chamber through which the cryogenic fluid is to flow. The chamber includes a first chamber section and a second chamber section. The receptacle comprises an insulation layer located radially between the chamber and the outer shell, a shaft housed within and slidably extending through the chamber, a poppet seat positioned within the chamber adjacent to the proximal end, and a poppet coupled to the shaft. The poppet is configured to engage a nozzle poppet when the receptacle is coupled to the nozzle. The poppet is configured to engage the poppet seat in a closed position. The poppet is configured to disengage from the poppet seat when pushed by the nozzle poppet. The receptacle comprises a check seat positioned within the chamber toward the distal end. The check seat separates the first chamber section and the second chamber section. The first chamber section extends between the check seat and the proximal end of the body. The second chamber section extends between the poppet seat and the check seat. The receptacle comprises a check slidably coupled to the shaft and configured to engage the check seat in the closed position. The check is configured to disengage from the check seat to permit cryogenic fluid to flow through the receptacle when pressure within the first chamber section is equalized with that of a nozzle chamber.

Some examples further comprise a check guide securely positioned within the chamber adjacent to the proximal end of the body. Some such examples further comprise a check spring extending between and engaging the check guide and the check. The check spring is configured to bias the check to engage the check seat in the closed position.

Some examples further comprise a poppet guide coupled to a back side of the poppet and slidably engaging one of the one or more interior walls. Some such examples further comprise a poppet spring extending between and engaging the poppet guide and the check seat. The poppet spring is configured to bias the poppet to engage the poppet seat in the closed position.

Some examples further comprise a bonnet housed within the chamber and coupled to one of the one or more interior walls adjacent to the distal end of the body. In some such examples, the bonnet defines the poppet seat. Further, some such examples further comprise a seat seal that is positioned to engage the bonnet adjacent to the poppet seat. Also, in some such examples, the seat seal is configured to sealingly engage a nozzle body of the nozzle when the receptacle is securely coupled to the nozzle to form a sealed connection between the chamber of the receptacle and the nozzle chamber of the nozzle. Also, some such examples further comprise a biasing spring, a support ring, a retainer, and a retainer ring configured to hold the seat seal in place against the bonnet.

In some examples, the one or more interior walls includes an inner interior wall in which the poppet and the check are housed. The inner interior wall extends from the proximal end toward the distal end in a substantially longitudinal direction. In some such examples, the one or more interior walls includes a middle interior wall that extends from a front end of the inner interior wall and back toward the proximal end of the body. A front end of the middle interior wall is securely and sealingly coupled to the front end of the inner interior wall. Further, in some such examples, the one or more interior walls includes an outer interior wall that extends from a back end of the middle interior wall and toward the distal end of the body. A back end of the outer interior wall is securely and sealingly coupled to the back end of the middle interior wall. A front end of the outer interior wall is securely and sealingly coupled to the outer shell at the distal end of the body.

In some examples, the outer shell and the one or more interior walls extend longitudinally back-and-forth in a zig-zag pattern that defines an elongated conduction path from an exterior of the receptacle to the chamber to impede a heat leak between the chamber and the exterior.

In some examples, the insulation layer is a vacuum formed in a sealed cavity between the outer shell, the one or more interior walls, and a support bracket that is adjacent to the proximal end of the body.

In some examples, the distal end of the body is configured to be received by a void of the nozzle when the receptacle is coupled to the nozzle. The distal end of the body is shaped to be complimentary of the void to limit the amount of the cryogenic fluid trapped between the receptacle and the nozzle and subsequently emitted during coupling or decoupling. In some examples, the poppet is configured to be flush with the nozzle poppet when the receptacle is coupled to the nozzle to deter material from becoming trapped and subsequently emitted. Some examples further comprise a seat seal and another seal that are positioned to reduce emissions of the cryogenic fluid during coupling and decoupling of the receptacle and the nozzle.

An example nozzle for coupling to and providing cryogenic fluid to a receptacle is disclosed herein. The nozzle comprises a body including a front end and a back end. The body comprises an outer shell and one or more body segments defining a chamber through which the cryogenic fluid is to flow to the receptacle. The nozzle comprises an insulation layer located radially between the chamber and the outer shell and a shaft having a first end and a second end. The shaft is housed within and slidably extending through the chamber. The nozzle comprises a poppet seat positioned adjacent to the front end of the body and a poppet coupled to the first end of the shaft. The poppet is configured to engage a receptacle poppet when the receptacle is coupled to the nozzle. The poppet is configured to engage the poppet seat in a closed position and be disengaged from the poppet seat in an open position. The nozzle comprises an actuator. The actuator comprises a stem that is operatively coupled to the shaft. The stem is configured to linearly actuate to cause the poppet coupled to the shaft to actuate between the closed position and the open position. The nozzle comprises a coupling assembly configured to couple the actuator to the back end of the body. The coupling assembly includes insulating material to thermally isolate the actuator from the chamber through which the cryogenic fluid is to flow.

In some examples, one of the one or more body segments defines the poppet seat.

Some examples further comprise a plurality of interior walls that include an inner interior wall and an outer interior wall. The inner interior wall extends from one of the one or more body segments at the front end and back toward the back end of the body in a substantially longitudinal direction. The outer interior wall extends from a back end of the inner interior wall and to the outer shell adjacent to the front end of the body. In some such examples, one of the one or more body segments and the plurality of interior walls partially define a toroid void adjacent to the front end of the body that is configured to sealingly receive a distal end of a receptacle body when the nozzle is coupled to the receptacle. In some such examples, the outer shell and the plurality of interior walls are sealingly coupled together and extend longitudinally back-and-forth in a zig-zag pattern that defines an elongated conduction path from an exterior of the nozzle to the chamber to impede a heat leak between the chamber and the exterior. In some such examples, the insulation layer is a vacuum formed in a sealed cavity between the outer shell, the plurality of interior walls, and the one or more body segment.

In some examples, the coupling assembly includes a shaft guide coupled to one of the one or more body segments of the body and a first bellows seal coupled to and extending between a flange of the shaft and the shaft guide to form a seal between the shaft and the shaft guide.

In some examples, the coupling assembly includes a second bellow seal coupled to and extending between one of the one or more body segments and the outer shell to form a seal between the one or more body segments and the outer shell.

In some examples, the coupling assembly includes a first thermal buffer that engages one or more inner surfaces of the actuator and defines an opening. In some such examples, the coupling assembly further includes a second thermal buffer. The second thermal buffer is housed in the opening of the first thermal buffer. The second thermal buffer is a hollow cylinder that defines a coupling chamber. Further, in some such examples, the coupling assembly further includes a connector and a crimped fastener housed within the coupling chamber and configured. The connector receives the second end of the shaft and an uncrimped end of the crimped fastener receives the connector. A crimped end of the crimped fastener is crimped around a flared end of the stem to couple the second end of the shaft to the stem of the actuator. Further, in some such examples, the coupling assembly further includes a third thermal buffer engages a portion of the first thermal buffer and defines a vacuum path that fluid connects to the coupling chamber that is fluidly connected to an actuator chamber to facilitate a quicker pump down for the actuator. Also, in some such examples, the first thermal buffer, the second thermal buffer, and the third thermal buffer are composed of material with low thermal conductivity to thermally isolate the actuator from the chamber through which the cryogenic fluid is to flow. Also, in some such examples, the actuator includes an outer wall at a front end of the actuator in which the first thermal buffer, the second thermal buffer, and the third thermal buffer are at least partially housed.

In some examples, the stem of the actuator is composed of material with low thermal conductivity to thermally isolate the actuator from the chamber through which the cryogenic fluid is to flow.

In some examples, the nozzle defines a void that is configured to receive a distal end of a receptacle body when the nozzle and the receptacle are coupled together. The void is shaped to be complimentary with the distal end of the receptacle body to limit the amount of the cryogenic fluid trapped between the nozzle and the receptacle and subsequently emitted during coupling or decoupling. In some examples, the poppet is configured to be flush with the receptacle poppet when the nozzle is coupled to the receptacle to deter material from becoming trapped and subsequently emitted. In some examples, the locking assembly is configured to keep the nozzle securely coupled to the receptacle to deter an unintended decoupling and corresponding emissions.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A nozzle for coupling to and providing cryogenic fluid to a receptacle, the nozzle comprising:
   a body defining a chamber through which the cryogenic fluid is to flow, wherein the body comprises an outer shell that includes an outer shell surface and a front end; and
   a locking assembly configured to securely couple the nozzle to the receptacle, the locking assembly comprising:
      an inner sleeve fixedly coupled to the outer shell surface of the outer shell;
      an outer sleeve extending over and rotatably coupled to the inner sleeve;
      one or more locking teeth fixedly coupled to the outer sleeve and configured to be slidably received by respective one or more coupling slots of the receptacle to securely couple the nozzle to the receptacle, wherein the one or more locking teeth are configured to rotatably slide within the respective one or more coupling slots to couple the nozzle to the receptacle as the outer sleeve rotates relative to the inner sleeve; and
      a redundant locking mechanism configured to transition between an unlocked state and a locked state as the outer sleeve rotates relative to the inner sleeve to further secure the nozzle to the receptacle.

2. The nozzle of claim 1, wherein the redundant locking mechanism comprises:
   a stem that includes a first end, a second end, and a ledge located between the first end and the second end;
   a spring that engages the ledge and through which the first end of the stem partially extends; and
   a wheel coupled to the second end of the stem.

3. The nozzle of claim 2, wherein the locking assembly further comprises a handle fixedly coupled to the outer sleeve to facilitate rotation of the outer sleeve relative to the inner sleeve.

4. The nozzle of claim 3, wherein the locking assembly further comprises a hollow post that is coupled to the handle and extends toward the inner sleeve, wherein the redundant locking mechanism is housed within the hollow post.

5. The nozzle of claim 4, wherein the redundant locking mechanism further comprises a cap, wherein the cap is configured to couple to a first opening of the hollow post that is adjacent to the handle, wherein the cap is coupled to the first opening to enclose and securely retain the redundant locking mechanism in the hollow post.

6. The nozzle of claim 5, wherein the spring extends between and engages the cap and the ledge of the stem.

7. The nozzle of claim 5, wherein the wheel extends at least partially from a second opening of the hollow post and is configured to engage the inner sleeve.

8. The nozzle of claim 7, wherein the outer sleeve defines an opening adjacent to the second opening of the hollow post, wherein the wheel extends from the second opening of the hollow post and through the opening of the outer sleeve to engage the inner sleeve.

9. The nozzle of claim 4, wherein the inner sleeve defines:
   a first groove associated with the unlocked state of the redundant locking mechanism;
   a second groove associated with the locked state of the redundant locking mechanism;

an intermediate portion of an outer surface of the inner sleeve positioned between the first groove and the second groove;

a first ramp extending between the first groove and the intermediate portion of the outer surface; and a second ramp extending between the second groove and the intermediate portion of the outer surface.

10. The nozzle of claim 9, wherein, to transition between the unlocked state and the locked state, the wheel is configured to roll between the first groove and the second groove and along the first ramp, the intermediate portion of the outer surface, and the second ramp as the outer sleeve is rotated relative to the inner sleeve.

11. The nozzle of claim 9, wherein the spring is configured to bias the wheel toward the inner sleeve to retain the wheel in the first groove or the second groove when the outer sleeve is not being rotated relative to the inner sleeve.

12. The nozzle of claim 1, wherein the redundant locking mechanism is configured to be in the unlocked state when the one or more locking teeth enter the respective one or more coupling slots of the receptacle, and wherein the redundant locking mechanism is configured to be in the locked state when the one or more locking teeth have been slidably rotated to a locked position at enclosed ends of the respective one or more coupling slots of the receptacle.

13. The nozzle of claim 1, wherein the inner sleeve includes one or more guide extensions that are configured to be slidably received by respective one or more guide slots of the receptacle to rotationally align the one or more locking teeth with the respective one or more coupling slots.

14. A nozzle for coupling to and providing cryogenic fluid to a receptacle, the nozzle comprising:

a body defining a chamber through which the cryogenic fluid is to flow, wherein the body comprises an outer shell that includes an outer surface and a front end; and a locking assembly configured to securely couple the nozzle to the receptacle, the locking assembly comprising:

an inner sleeve including a distal end and one or more guide extensions extending longitudinally from the distal end, wherein the inner sleeve is fixedly coupled to the outer surface of the outer shell, and wherein the distal end extends longitudinally beyond the front end of the outer shell;

an outer sleeve extending over and rotatably coupled to the inner sleeve; and one or more locking teeth fixedly positioned along an inner surface of the outer sleeve and adjacent to the distal end of the inner sleeve, wherein the one or more locking teeth are configured to be slidably received by respective one or more coupling slots of the receptacle;

wherein the one or more guide extensions are configured to be slidably received by respective one or more guide slots of the receptacle to rotationally align the one or more locking teeth with the respective one or more coupling slots, and wherein the outer sleeve is configured to rotate relative to the inner sleeve to cause the one or more locking teeth to rotatably slide within the respective one or more coupling slots to securely couple the nozzle to the receptacle.

15. The nozzle of claim 14, wherein, to facilitate rotational alignment between the one or more locking teeth and the respective one or more coupling teeth, the one or more guide extensions extend longitudinally beyond the one or more locking teeth to enable the one or more guide extensions to be received by the respective one or more guide slots of the receptacle before the one or more locking teeth are received by the respective one or more coupling slots of the receptacle.

16. The nozzle of claim 14, wherein each of the one or more locking teeth is a roller bearing with rounded surfaces to facilitate guiding the one or more locking teeth into the respective one or more coupling slots of the receptacle.

17. The nozzle of claim 14, wherein each of the one or more guide extensions includes rounded corners to facilitate guiding the guide extensions into the respective one or more guide slots of the receptacle.

18. The nozzle of claim 17, wherein each of the one or more guide extensions includes a rounded inner surface to facilitate radial alignment between the one or more guide extensions and the respective one or more guide slots of the receptacle.

19. The nozzle of claim 14, wherein the locking assembly further comprises a sleeve ring that is fixedly coupled to the outer shell, wherein a proximal end of the inner sleeve is fixedly coupled to the sleeve ring to fixedly couple the inner sleeve to the outer shell.

20. The nozzle of claim 19, wherein the sleeve ring and the proximal end of the inner sleeve define a groove, and wherein the outer sleeve includes an inner lip that is received by the groove to prevent axial movement of the outer sleeve relative to the inner sleeve.

21. The nozzle of claim 14, wherein each of the one or more guide extensions are circumferentially spaced from the one or more locking teeth by at least a distance that prevents the one or more guide extensions from interfering with rotational movement of the one or more locking teeth.

22. The nozzle of claim 21, wherein the one or more guide extensions are equidistantly spaced apart from each other circumferentially along the inner sleeve, and wherein the one or more locking teeth are equidistantly spaced apart from each other circumferentially along the inner surface of the outer sleeve.

23. The nozzle of claim 14, wherein the locking assembly further comprises a handle fixedly coupled to the outer sleeve to facilitate rotation of the outer sleeve relative to the inner sleeve.

24. The nozzle of claim 14, wherein the locking assembly further comprises a redundant locking mechanism configured to further securely couple the nozzle to the receptacle, wherein the redundant locking mechanism is configured to transition between an unlocked state and a locked state as the outer sleeve rotates relative to the inner sleeve.

25. The nozzle of claim 24, wherein the redundant locking mechanism comprises:

a stem that includes a first end, a second end, and a ledge located between the first end and the second end;

a spring that engages the ledge and through which the first end of the stem partially extends; and a wheel coupled to the second end of the stem.

* * * * *

UNITED STATES PATENT AND TRADEMARK OFFICE
CERTIFICATE OF CORRECTION

| | |
|---|---|
| PATENT NO. | : 11,821,557 B2 |
| APPLICATION NO. | : 17/804484 |
| DATED | : November 21, 2023 |
| INVENTOR(S) | : Kevin Jordan et al. |

Page 1 of 1

It is certified that error appears in the above-identified patent and that said Letters Patent is hereby corrected as shown below:

In the Specification

Column 47, Line 8, "coupling teeth" should be changed to --coupling slots--.

In the Claims

Column 56, Line 1, Claim 15, "coupling teeth" should be changed to --coupling slots--.

Signed and Sealed this
Twenty-fourth Day of September, 2024

Katherine Kelly Vidal
*Director of the United States Patent and Trademark Office*